(12) United States Patent
Suleman

(10) Patent No.: US 10,966,369 B2
(45) Date of Patent: Apr. 6, 2021

(54) SYSTEM AND METHOD FOR CALIBRATING ALIGNMENT OF WORK VEHICLES

(71) Applicant: CNH Industrial America LLC, New Holland, PA (US)

(72) Inventor: Yaseen Suleman, Glendale Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 167 days.

(21) Appl. No.: 16/176,571

(22) Filed: Oct. 31, 2018

(65) Prior Publication Data

US 2020/0128739 A1    Apr. 30, 2020

(51) Int. Cl.
| | |
|---|---|
| *A01D 41/127* | (2006.01) |
| *A01D 61/02* | (2006.01) |
| *B65G 67/24* | (2006.01) |
| *A01D 90/10* | (2006.01) |
| *A01D 57/06* | (2006.01) |

(52) U.S. Cl.
CPC ......... *A01D 41/1278* (2013.01); *A01D 57/06* (2013.01); *A01D 61/02* (2013.01); *A01D 90/10* (2013.01); *B65G 67/24* (2013.01)

(58) Field of Classification Search
None
See application file for complete search history.

(56) References Cited

U.S. PATENT DOCUMENTS

| | | | | |
|---|---|---|---|---|
| 3,305,113 | A * | 2/1967 | Gardner | A01D 46/20 414/508 |
| 3,469,691 | A * | 9/1969 | Boyce | A01D 45/006 209/133 |
| 3,505,801 | A * | 4/1970 | Nye | A01D 46/26 56/329 |
| 5,210,999 | A * | 5/1993 | Cosimati | A01D 45/00 171/129 |
| 5,375,403 | A * | 12/1994 | Collins | A01D 46/00 56/330 |

(Continued)

OTHER PUBLICATIONS

U.S. Appl. No. 16/176,488, filed Oct. 31, 2018, Suleman.

(Continued)

*Primary Examiner* — Shelley Chen
(74) *Attorney, Agent, or Firm* — Rickard K. DeMille; Rebecca L. Henkel

(57) ABSTRACT

A control system for a work vehicle includes a controller configured to determine a position of a conveyor outlet relative to a storage compartment, and to select a target unloading area from a set of candidate target unloading areas. The set of candidate target unloading areas includes a target circle having a center at an unloading point and a radius corresponding to a threshold range from the unloading point, a bounding shape within the storage compartment, and a selected zone of a set of non-overlapping zones within the bounding shape. In addition, the controller is configured to engage product flow from the conveyor outlet to the storage compartment while the position of the conveyor outlet is within the target unloading area, and to terminate product flow from the conveyor outlet to the storage compartment while the position of the conveyor outlet is outside of the target unloading area.

15 Claims, 14 Drawing Sheets

(56) References Cited

U.S. PATENT DOCUMENTS

| | | | |
|---|---|---|---|
| 6,587,772 B2 | 7/2003 | Behnke | |
| 6,668,223 B2 | 12/2003 | Blackmore et al. | |
| 6,932,554 B2 | 8/2005 | Isfort et al. | |
| 7,555,888 B1* | 7/2009 | Boese | A01D 45/00 |
| | | | 56/327.1 |
| 8,366,372 B2 | 2/2013 | Yoder et al. | |
| 8,437,901 B2 | 5/2013 | Anderson | |
| 8,451,139 B2 | 5/2013 | Morselli et al. | |
| 8,499,537 B2 | 8/2013 | Correns et al. | |
| 8,606,454 B2 | 12/2013 | Wang et al. | |
| 8,626,406 B2 | 1/2014 | Schleicher et al. | |
| 8,649,940 B2 | 2/2014 | Bonefas | |
| 8,755,976 B2 | 6/2014 | Peters et al. | |
| 8,909,389 B2 | 12/2014 | Meyer | |
| 9,002,591 B2 | 4/2015 | Wang et al. | |
| 9,301,447 B2 | 4/2016 | Kormann | |
| 9,326,444 B2 | 5/2016 | Bonefas | |
| 9,462,748 B2 | 10/2016 | Dollinger et al. | |
| 9,497,898 B2 | 11/2016 | Dillon | |
| 9,532,504 B2 | 1/2017 | Herman et al. | |
| 9,545,048 B2 | 1/2017 | Pickett et al. | |
| 9,675,008 B1 | 6/2017 | Rusciolelli et al. | |
| 9,807,934 B2 | 11/2017 | Rusciolelli et al. | |
| 2009/0044505 A1 | 2/2009 | Huster et al. | |
| 2011/0164952 A1 | 7/2011 | Hollenberg | |
| 2012/0189413 A1* | 7/2012 | Richiger | A01F 25/20 |
| | | | 414/310 |
| 2014/0095032 A1 | 4/2014 | Mulder et al. | |
| 2015/0272002 A1* | 10/2015 | Honey | A01D 57/02 |
| | | | 56/153 |
| 2017/0316692 A1 | 11/2017 | Rusciolelli et al. | |

OTHER PUBLICATIONS

U.S. Appl. No. 16/176,816, filed Oct. 31, 2018, Suleman.
U.S. Appl. No. 16/176,757, filed Oct. 31, 2018, Suleman.
U.S. Appl. No. 16/203,936, filed Nov. 29, 2018, Suleman.
U.S. Appl. No. 15/905,466, filed Feb. 26, 2018, McClelland.

* cited by examiner

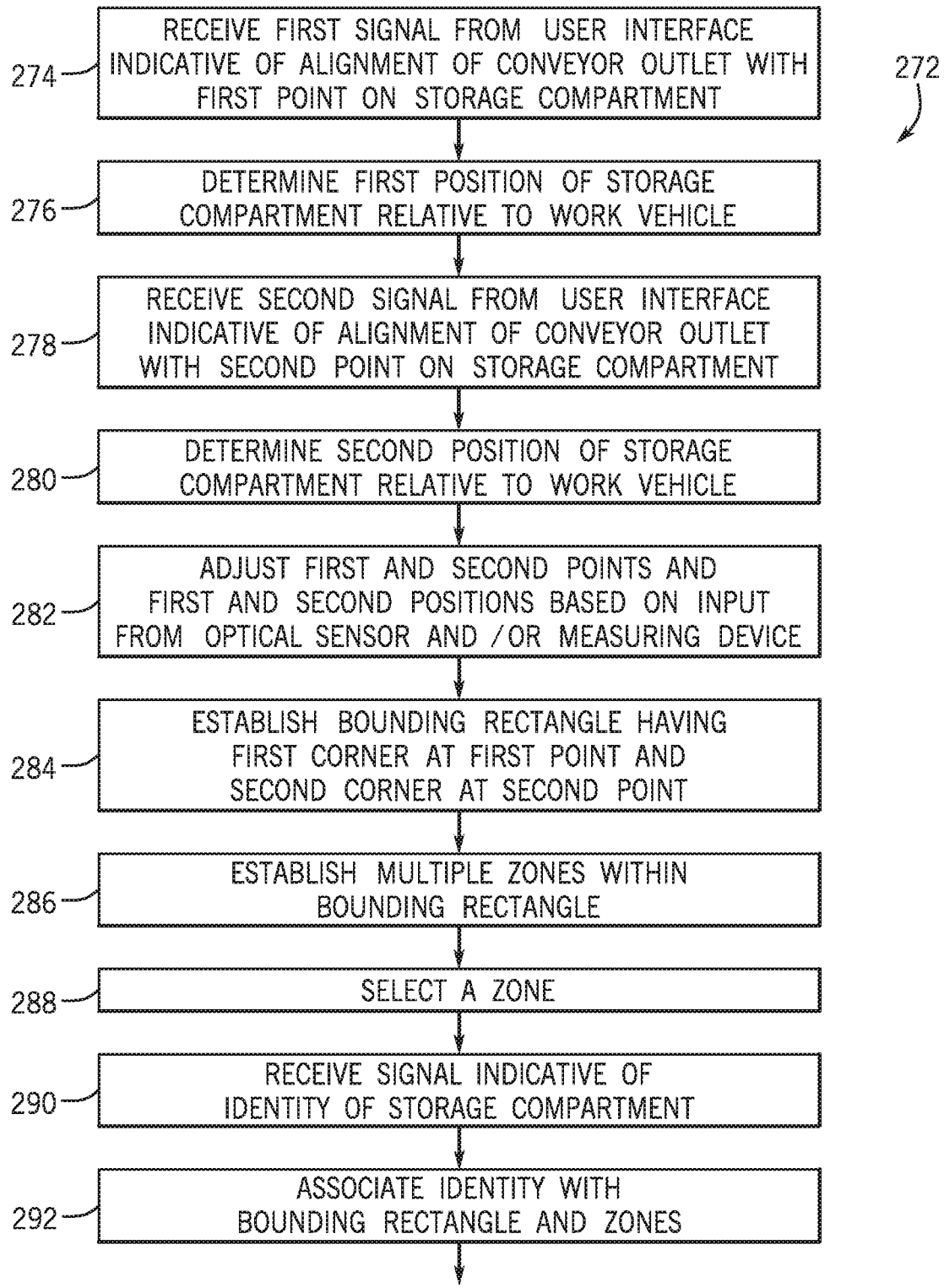

SYSTEM AND METHOD FOR CALIBRATING ALIGNMENT OF WORK VEHICLES

BACKGROUND

The present disclosure relates generally to a system and method for calibrating alignment of work vehicles.

A harvester may be used to harvest agricultural crops, such as cotton, wheat, flax, or other crops. Generally, components (e.g., drums, spindles, blades, etc.) of the harvester remove portions of the agricultural crop from the ground. The harvester then conveys the removed portions of the agricultural crop (e.g., agricultural products) to an internal storage compartment, either directly or via a processing device configured to remove undesirable portions of the agricultural products.

As the harvester traverses a field, the volume of agricultural product stored within the internal storage compartment increases. Accordingly, the internal storage compartment is typically unloaded multiple times during the harvesting process. One method of unloading the internal storage compartment, generally known as unloading on-the-go, involves periodically transferring the agricultural product to a mobile storage compartment while the harvester is in motion. The mobile storage compartment is towed by a haul vehicle to a position proximate to the harvester to facilitate unloading. For example, certain haul vehicles include a control system configured to automatically direct the haul vehicle to a position that aligns the storage compartment with a conveyor outlet of the harvester. Once aligned, the agricultural product may be transferred from the harvester to the mobile storage compartment via the conveyor outlet, thereby unloading the internal storage compartment of the harvester.

To facilitate automatic control of the haul vehicle, a calibration process may be performed to calibrate alignment of the conveyor outlet with the storage compartment. For example, the storage compartment may be manually moved to a position that aligns the storage compartment with the conveyor outlet, and the position of the storage compartment relative to the harvester may be stored. The stored position may be used during automatic control of the haul vehicle to facilitate alignment of the storage compartment with the conveyor outlet. Unfortunately, such a calibration process may cause agricultural product to be unevenly distributed throughout the storage compartment during the unloading process and/or may increase the possibility of agricultural product being lost due to misalignment between the storage compartment and the conveyor outlet.

BRIEF DESCRIPTION

In certain embodiments, a control system for a work vehicle includes a controller having a memory and a processor. The controller is configured to determine a position of a conveyor outlet relative to a storage compartment, and to select a target unloading area from a set of candidate target unloading areas. The set of candidate target unloading areas includes a target circle having a center at an unloading point and a radius corresponding to a threshold range from the unloading point, a bounding shape within the storage compartment, and a selected zone of a set of non-overlapping zones within the bounding shape. In addition, the controller is configured to engage product flow from the conveyor outlet to the storage compartment while the position of the conveyor outlet is within the target unloading area, and to terminate product flow from the conveyor outlet to the storage compartment while the position of the conveyor outlet is outside of the target unloading area.

DRAWINGS

These and other features, aspects, and advantages of the present disclosure will become better understood when the following detailed description is read with reference to the accompanying drawings in which like characters represent like parts throughout the drawings, wherein:

FIGS. 7A and 7B are flow diagrams of an embodiment of a method for calibrating alignment of a conveyor outlet of an agricultural harvester with a storage compartment of an agricultural product transportation system;

Figure 14:
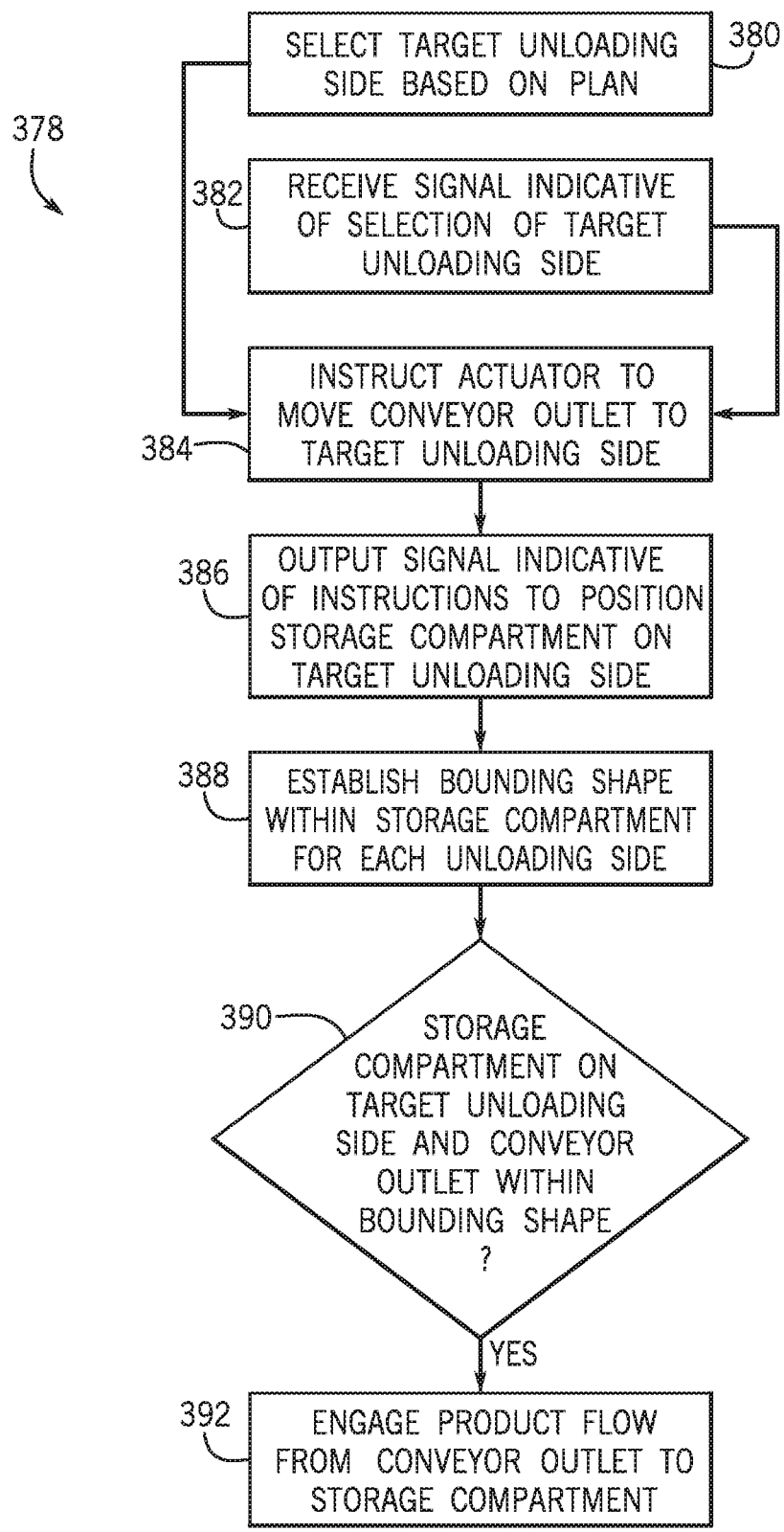
Figure 15:
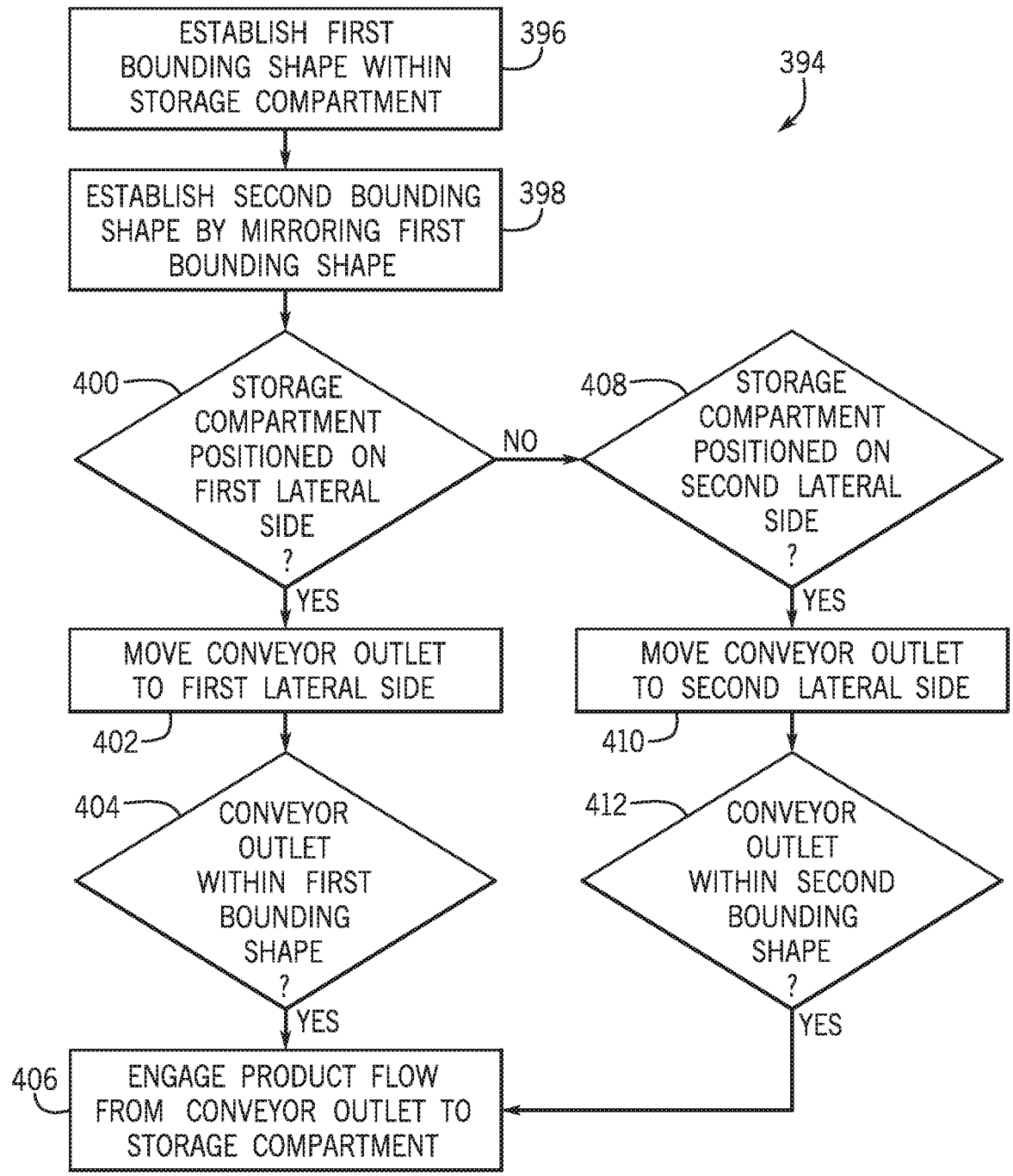

FIG. 14 is a flow diagram of an embodiment of a method for controlling product flow from a conveyor outlet of an agricultural harvester to a storage compartment of an agricultural product transportation system by automatically or manually selecting an unloading side; and FIG. 15 is a flow diagram of another embodiment of a method for controlling product flow from a conveyor outlet of an agricultural harvester to a storage compartment of an agricultural product transportation system by mirroring a bounding shape of a calibrated unloading side on an uncalibrated unloading side.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
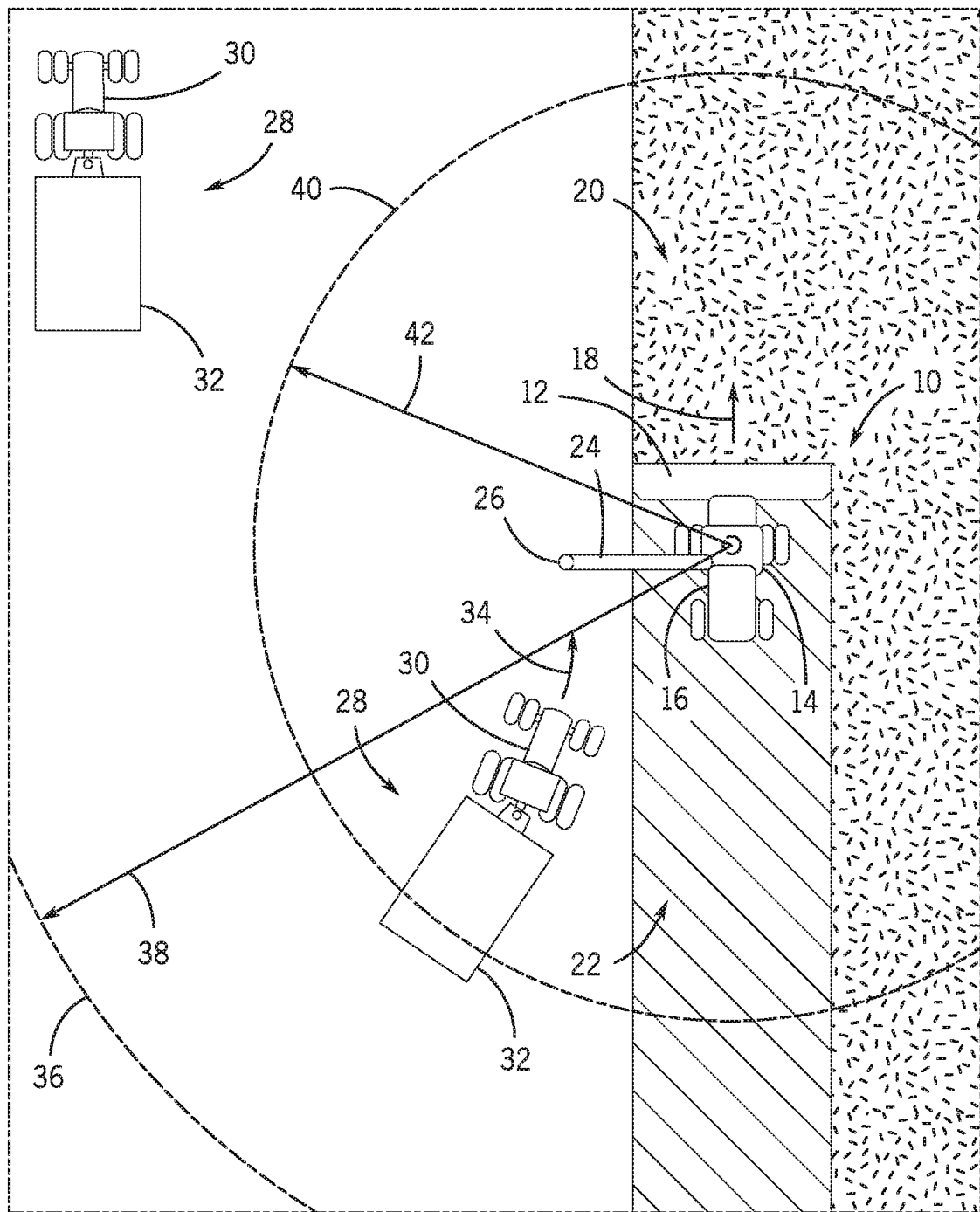
FIG. 1 is a top view of an embodiment of an agricultural harvester and an agricultural product transportation system, in which the agricultural product transportation system is configured to automatically dock with the agricultural harvester.

FIG. 1 is a top view of an embodiment of an agricultural harvester and an agricultural product transportation system, in which the agricultural product transportation system is configured to automatically dock with the agricultural harvester. In the illustrated embodiment, the agricultural harvester 10 includes a row of harvesting units 12 (e.g., header) positioned on a front end of a chassis 14 and an internal storage compartment 16 coupled to the chassis 14. As the agricultural harvester 10 traverses a field in a direction of travel 18, the harvesting units 12 engage unharvested plants 20 and extract various agricultural products (e.g., corn, wheat, cotton, etc.) from the plants. These agricultural products are transferred to the internal storage compartment 16, either directly or via a processing device configured to remove undesirable portions of the agricultural products. The remaining portions of the plants remain in the field as agricultural residue 22.

As the harvester 10 traverses the field, the volume of agricultural product stored within the internal storage compartment 16 increases. Accordingly, the harvester 10 includes a conveyor 24 configured to transfer the agricultural product to a mobile storage compartment while the harvester is in motion. The conveyor 24 may include an auger, a conveyor belt, or other suitable device configured to transfer the agricultural product from the internal storage compartment 16 to an outlet 26. As discussed in detail below, the mobile storage compartment may be automatically aligned with the conveyor outlet 26, thereby enhancing the efficiency of the harvester unloading process. While the illustrated agricultural harvester 10 is a self-propelled vehicle, in certain embodiments the agricultural harvester may be towed behind a tractor or other work vehicle. In addition, while the illustrated agricultural harvester 10 includes an internal storage compartment 16, the internal storage compartment may be omitted in certain harvester configurations. In such configurations, the harvester may continuously transfer agricultural product to the mobile storage compartment as the harvester extracts and processes the agricultural products.

In the illustrated embodiment, an agricultural product transportation system 28 is configured to receive the agricultural product from the harvester 10. As illustrated, the agricultural product transportation system 28 includes a haul vehicle 30, such as the illustrated tractor, and a mobile storage compartment 32 (e.g., grain cart). As discussed in detail below, the haul vehicle 30 includes a controller configured to automatically direct the storage compartment along a route 34 to a target position adjacent to the harvester 10. For example, the controller may automatically control the haul vehicle 30 during a docking process, thereby positioning the storage compartment in a location that enhances the transfer efficiency of the agricultural product from the harvester to the storage compartment. In certain embodiments, the controller is configured to determine a target position and a target velocity of the haul vehicle based at least in part on a determined position and a determined velocity of the harvester 10. The controller is also configured to control a steering control system and a speed control system to direct the haul vehicle toward the target position. Once the haul vehicle substantially reaches the target position, the controller is configured to control the steering control system and the speed control system to substantially maintain the target position and the target velocity.

In certain embodiments, the target position corresponds to a position that substantially aligns the conveyor outlet 26 with an unloading point on the storage compartment 32. Accordingly, with the haul vehicle located at the target position, the agricultural product may be transferred from the harvester 10 to the storage compartment 32 while the vehicles are in motion. Because the controller automatically maintains the position of the storage compartment relative to the conveyor outlet during the unloading process, the possibility of agricultural product loss is substantially reduced or eliminated, thereby increasing the efficiency of the harvesting process.

By way of example, when the haul vehicle 30 enters an area of communication 36, communication is automatically established between a first transceiver on the haul vehicle 30 and a second transceiver on the harvester 10. That is, the controller of the haul vehicle detects the harvester upon receiving a signal from the harvester transceiver, and the controller of the harvester detects the haul vehicle upon receiving a signal from the haul vehicle transceiver. A range 38 of the area of communication 36 may be dependent on the broadcast power of the transceivers, the sensitivity of the transceivers, and/or the communication frequency, among other factors. In certain embodiments, each transceiver is configured to transmit data at a fixed interval (e.g., 50 Hz, 20 Hz, 10 Hz, 5 Hz, 1 Hz, 0.5 Hz, 0.1 Hz, etc.). The data may include a position of the haul vehicle/harvester, a velocity of the haul vehicle/harvester, a steering angle of the haul vehicle/harvester, an orientation of the haul vehicle/harvester, an identity of the haul vehicle/harvester, other parameter(s), or a combination thereof. In addition, each transceiver may be configured to retransmit data received from another transceiver. For example, the haul vehicle closer to the harvester may receive a signal from the harvester, and then retransmit the signal to the haul vehicle farther from the harvester, thereby effectively extending the communication range of each transceiver.

To initiate the docking process, an operator of the haul vehicle provides input to a user interface, thereby instructing the controller to enable automatic control of the haul vehicle. If the haul vehicle is within an area of engagement 40 (e.g., a distance between the harvester and the haul vehicle is less than an engagement distance 42), the controller controls the steering control system and the speed control system to direct the haul vehicle toward the target position. For example, if the harvester is positioned in front of the haul vehicle, the speed control system may increase the speed of the haul vehicle. Conversely, if the harvester is positioned behind the haul vehicle, the speed control system may slow or stop the haul vehicle until the harvester reaches a docking position. In addition, the steering control system may adjust wheel angles, for example, to steer the haul vehicle toward the harvester. Once the haul vehicle substantially reaches the target position, the controller controls the steering control system and the speed control system to substantially maintain the target position and the target velocity, thereby facilitating transfer of agricultural product from the harvester to the storage compartment.

In certain embodiments, a control system of the harvester is configured to calibrate alignment of the conveyor outlet of the harvester with the storage compartment of the agricultural product transportation system (e.g., prior to initiation of the harvesting/unloading process). In such embodiments, a controller of the control system is configured to receive a first signal from a user interface indicative of alignment of the conveyor outlet with a first point on the storage compartment, and to determine a first position of the storage compartment relative to the harvester upon receiving the first signal. The controller is also configured to receive a second signal from the user interface indicative of alignment of the conveyor outlet with a second point on the storage compartment, diagonally opposite the first point, and to determine a second position of the storage compartment relative to the harvester upon receiving the second signal. In addition, the controller is configured to establish a bounding rectangle having a first corner at the first point and a second corner at the second point based on the first position and the second position. The controller is also configured to establish multiple zones within the bounding rectangle, in which the zones do not overlap one another. Furthermore, the controller is configured to output a zone signal indicative of a selected zone (e.g., a position and dimensions of the selected zone). For example, the controller may be configured to determine the selected zone based on a signal from the user interface indicative of selection of a zone. In certain embodiments, the controller is configured to engage product flow from the conveyor outlet to the storage compartment while (e.g., only while) the conveyor outlet is within a selected zone. By controlling the selected zone, the level of agricultural product within the storage compartment may be balanced, thereby enhancing the usable storage capacity of the storage compartment.

In certain embodiments, the controller is configured to determine an orientation of the storage compartment relative to a ground plane. In such embodiments, the controller may select a zone based on the orientation, such that the selected zone has the highest vertical position of the zones. Furthermore, the controller may engage product flow from the conveyor outlet to the storage compartment while (e.g., only while) the conveyor outlet is within the selected zone. By delivering agricultural product to the highest zone of the storage compartment, the agricultural product may flow from the highest zone to the lower zone(s), thereby enhancing the usable storage capacity of the storage compartment.

Furthermore, in certain embodiments, the controller is configured to automatically engage and terminate product flow from the conveyor outlet to the storage compartment based on a position of the conveyor outlet relative to a target unloading area. For example, the controller may determine a position of the conveyor outlet relative to the storage compartment. The controller may then select a target unloading area from a set of candidate target unloading area (e.g., in response to operator input). The set of candidate target unloading areas may include a target circle having a center at an unloading point and a radius corresponding to a threshold range from the unloading point, a bounding shape (e.g., bounding rectangle) within the storage compartment, and a selected zone of multiple non-overlapping zones within the bounding shape, as discussed above. After the target unloading area is selected, the controller may engage product flow from the conveyor outlet to the storage compartment while the position of the conveyor outlet is within the target unloading area, and the controller may terminate product flow from the conveyor outlet to the storage compartment while the position of the conveyor outlet is outside of the target area. Automatically controlling engagement and termination of the product flow may enable an operator of the work vehicle to focus on other tasks associated with agricultural operations. In addition, the quantity of product delivered to an undesirable area (e.g., the agricultural field, a different zone, etc.) may be substantially reduced.

In certain embodiments, the controller is configured to terminate product flow before the conveyor outlet moves out of the target unloading area. For example, the controller may determine a first position of the conveyor outlet relative to the storage compartment at a current time, and the controller may determine a second position of the conveyor outlet relative to the storage compartment at a future time (e.g., based on the velocity of the work vehicle, the acceleration of the work vehicle, the velocity of the storage compartment, the acceleration of the storage compartment, etc.). The future time corresponds to the current time plus a duration sufficient to terminate product flow from the conveyor outlet after a product delivery system receives instructions to terminate product flow. The control may instruct the product delivery system to engage product flow from the conveyor outlet to the storage compartment while the first position of the conveyor outlet is within the target unloading area, and the controller may instruct the product delivery system to terminate product flow from the conveyor outlet to the storage compartment while the second position to the conveyor outlet is outside of the target unloading area. By terminating product flow before the conveyor outlet moves outside of the target unloading area, the possibility of product being delivered to an undesirable area (e.g., the agricultural field, a different zone, etc.) may be substantially reduced or eliminated.

Figure 2:
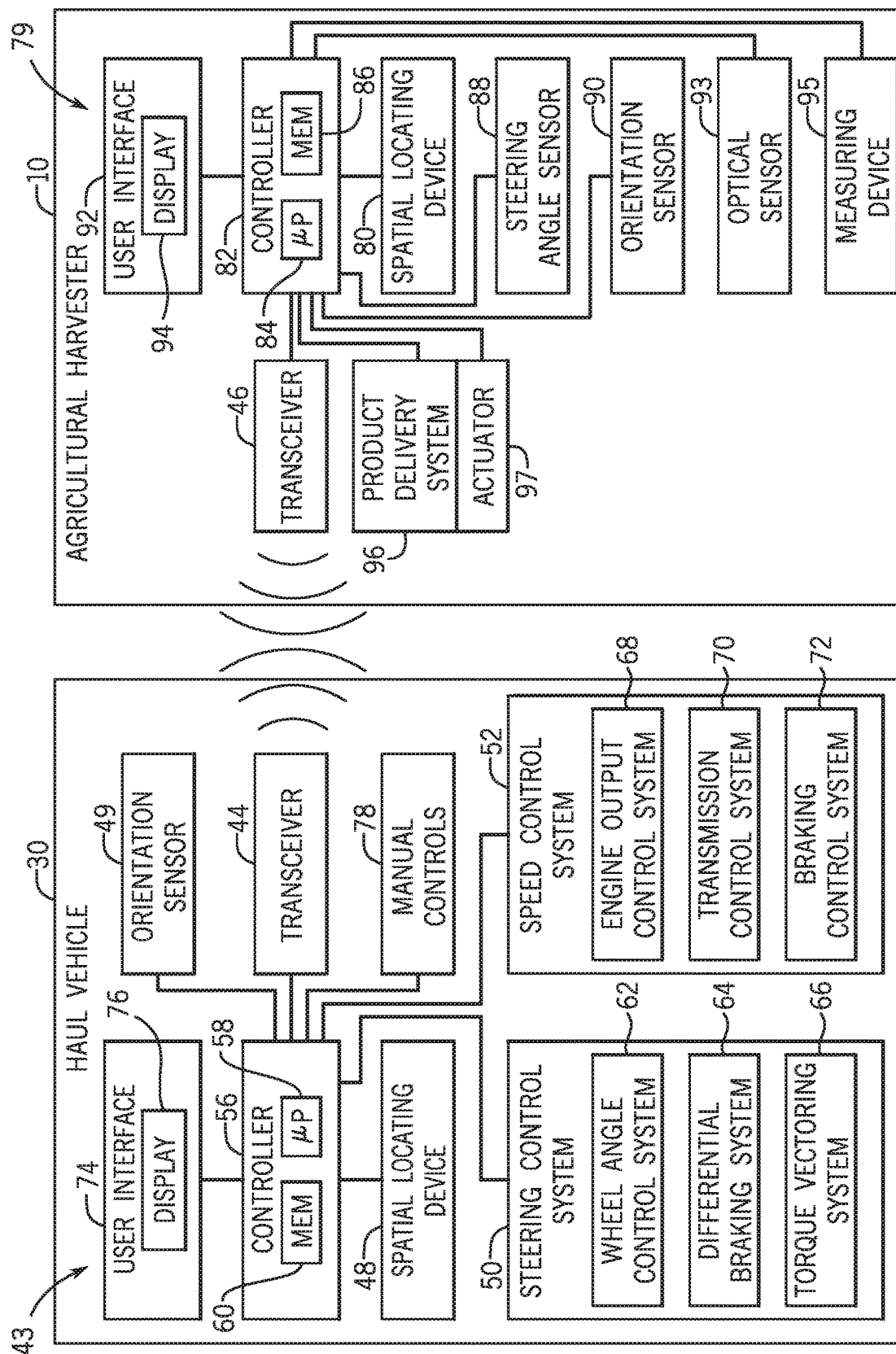
FIG. 2 is a schematic diagram of an embodiment of an agricultural harvester and a haul vehicle, which may be employed within the agricultural product transportation system of FIG. 1.

FIG. 2 is a schematic diagram of an embodiment of an agricultural harvester 10 and a haul vehicle 30, which may be employed within the agricultural product transportation system of FIG. 1. In the illustrated embodiment, the haul vehicle 30 includes a control system 43 having a first transceiver 44 configured to receive a first signal from a second transceiver 46 of a target vehicle, such as the illustrated agricultural harvester 10. The first signal is indicative of a first determined position (e.g., three-dimensional position vector) and a first determined velocity (e.g., three-dimensional velocity vector) of the harvester 10. The first and second transceivers may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, cellular, etc.) or a proprietary protocol.

As used herein, "position" (e.g., determined position, target position, etc.) refers to a position vector, such as a one, two, or three-dimensional position vector. For example, a two-dimensional position vector may include latitude and longitude, and a three-dimensional position vector may include latitude, longitude, and altitude/elevation (e.g., above a ground plane). The position vector may be represented in a rectangular, polar, cylindrical, or spherical coordinate system, among other suitable coordinate systems. In addition, as used herein, "velocity" (e.g., determined velocity, target velocity, etc.) refers to a velocity vector, such as a one, two, or three-dimensional velocity vector. For example, a one-dimensional velocity vector may include speed (e.g., ground speed), a two-dimensional velocity vector may include speed (e.g., ground speed) and heading within a plane (e.g., along a ground plane), and a three-dimensional velocity vector may include speed and heading within a three-dimensional space. The velocity vector may be represented in a rectangular, polar, cylindrical, or spherical coordinate system, among other suitable coordinate systems. In certain embodiments, the velocity may be represented as a unit/normalized vector, i.e., a vector having a unit magnitude. In such embodiments, the magnitude (e.g., speed) is not included in the velocity vector. For example, a two-dimensional velocity unit vector may be representative of heading within a plane (e.g., along a ground plane), and a three-dimensional velocity unit vector may be representative of heading within a three-dimensional space.

The haul vehicle control system 43 also includes a spatial locating device 48, which is mounted to the haul vehicle 30 and configured to determine a second determined position and a second determined velocity of the haul vehicle 30. The spatial locating device may include any suitable system configured to measure the position, and in certain embodiments velocity, of the haul vehicle, such as a global positioning system (GPS), for example. In certain embodiments, the spatial locating device 48 may be configured to measure the position and velocity of the haul vehicle relative to a fixed point within a field (e.g., via a fixed radio transceiver). Accordingly, the spatial locating device 48 may be configured to measure the position and velocity of the haul vehicle relative to a fixed global coordinate system (e.g., via the GPS) or a fixed local coordinate system. In certain embodiments, the first transceiver 44 is configured to broadcast a second signal indicative of the second determined position and/or the second determined velocity to other vehicles within the area of communication. The second signal from each haul vehicle may be utilized to determine which vehicle is closest to the harvester, thereby enabling the closest haul vehicle to dock with the harvester while the remaining vehicles wait for a subsequently unloading cycle.

In addition, the haul vehicle control system 43 includes an orientation sensor 49 configured to determine a pitch angle, a yaw angle, a roll angle, or a combination thereof, of the haul vehicle. For example, the orientation senor 49 may include a gyroscope or other sensor configured to monitor the orientation of the haul vehicle 30. In certain embodiments, the orientation sensor 49 is also configured to determine a pitch rate, a yaw rate, a roll rate, or a combination thereof. Furthermore, in certain embodiments, the haul vehicle control system 43 is configured to compare the orientation (e.g., pitch angle, yaw angle, roll angle) of the haul vehicle 30 to a measured orientation (e.g., pitch angle, yaw angle, roll angle) of the harvester 10 to establish a relative orientation that may be utilized to enhance the accuracy of the docking process.

In the illustrated embodiment, the control system 43 includes a steering control system 50 configured to control a direction of movement of the haul vehicle 30, and a speed control system 52 configured to control a speed of the haul vehicle 30. In addition, the control system 43 includes a controller 56 communicatively coupled to the first transceiver 44, to the spatial locating device 48, to the steering control system 50, and to the speed control system 52. The controller 56 is configured to automatically control the haul vehicle 30 during docking and while docked with the harvester, thereby enhancing transfer efficiency of the agricultural product to the storage compartment. In certain embodiments, the controller 56 is configured to determine a target position and a target velocity of the haul vehicle based at least in part on the first determined position and the first determined velocity of the harvester. The controller 56 is also configured to determine a route to the target position based at least in part on the target position, the second determined position of the haul vehicle, and the second determined velocity of the haul vehicle. Once the route is determined, the controller is configured to control the steering control system and the speed control system to direct the haul vehicle toward the target position along the route. Upon substantially reaching the target position, the controller is configured to control the steering control system and the speed control system to substantially maintain the target position and the target velocity.

The haul vehicle control system may utilize the determined velocity of the harvester to determine an expected position of the harvester at the time of docking. Accordingly, the target position and the route to the target position may be determined based on the expected position instead of the instantaneous position. As a result, the efficiency of the docking process may be enhanced, thereby reducing the duration and costs associated with harvesting operations. The steering angle of the harvester, orientation of the harvester, heading of the harvester, and/or acceleration of the harvester may also be utilized to determine the target position and the route to the target position, thereby further enhancing the efficiency of the docking process.

In certain embodiments, the target position is laterally and/or longitudinally offset relative to the harvester from the first determined position. For example, an unloading point may be established on the storage compartment (e.g., within a selected zone of the storage compartment). In such embodiments, the haul vehicle controller 56 may determine a target position that substantially aligns the unloading point with the conveyor outlet of the harvester, thereby facilitating efficient transfer of agricultural product from the harvester to the storage compartment. The target position may be determined before or during the docking process between the haul vehicle and the harvester.

In certain embodiments, the controller 56 is also configured to determine a distance between the haul vehicle and the harvester based on the first determined position of the harvester and the second determined position of the haul vehicle. If the distance is less than or equal to the engagement distance, the controller 56 is configured to enable automatic control of the haul vehicle. Otherwise, the automatic control is disabled. In certain embodiments, upon detection of a separation distance less than or equal to the engagement distance, the controller 56 is configured to instruct a user interface to present an indication to an operator that automatic control is enabled. The operator may then initiate automatic control (e.g., via the user interface), thereby instructing the controller to direct the haul vehicle toward the target position.

In certain embodiments, the controller 56 is an electronic controller having electrical circuitry configured to process data from the transceiver 44, the spatial locating device 48, and/or other components of the control system 43. In the illustrated embodiment, the controller 56 include a processor, such as the illustrated microprocessor 58, and a memory device 60. The controller 56 may also include one or more storage devices and/or other suitable components. The processor 58 may be used to execute software, such as software for controlling the haul vehicle 30, and so forth. Moreover, the processor 58 may include multiple microprocessors, one or more "general-purpose" microprocessors, one or more special-purpose microprocessors, and/or one or more application specific integrated circuits (ASICS), or some combination thereof. For example, the processor 58 may include one or more reduced instruction set (RISC) processors.

The memory device 60 may include a volatile memory, such as random access memory (RAM), and/or a nonvolatile memory, such as read-only memory (ROM). The memory device 60 may store a variety of information and may be used for various purposes. For example, the memory device 60 may store processor-executable instructions (e.g., firmware or software) for the processor 58 to execute, such as instructions for controlling the haul vehicle 30. The storage device(s) (e.g., nonvolatile storage) may include ROM, flash memory, a hard drive, or any other suitable optical, magnetic, or solid-state storage medium, or a combination thereof. The storage device(s) may store data (e.g., position data, identification data, etc.), instructions (e.g., software or firmware for controlling the haul vehicle, etc.), and any other suitable data.

In the illustrated embodiment, the steering control system 50 includes a wheel angle control system 62, a differential braking system 64, and a torque vectoring system 66. The wheel angle control system 62 may automatically rotate one or more wheels and/or tracks of the haul vehicle (e.g., via hydraulic actuators) to steer the haul vehicle along a target route. By way of example, the wheel angle control system 62 may rotate front wheels/tracks, rear wheels/tracks, intermediate wheels/tracks, or a combination thereof, of the haul vehicle (e.g., either individually or in groups). The differential braking system 64 may independently vary the braking force on each lateral side of the haul vehicle to direct the haul vehicle along a target route. In addition, the torque vectoring system 66 may differentially apply torque from an engine to wheel(s) and/or track(s) on each lateral side of the haul vehicle, thereby directing the haul vehicle along a target route. While the illustrated steering control system 50 includes the wheel angle control system 62, the differential braking system 64, and the torque vectoring system 66, alternative embodiments may include one or two of these systems, in any suitable combination. In further embodiments, the steering control system may include other and/or additional systems to facilitate directing the haul vehicle along a target route.

In the illustrated embodiment, the speed control system 52 includes an engine output control system 68, a transmission control system 70, and a braking control system 72. The engine output control system 68 is configured to vary the output of the engine to control the speed of the haul vehicle. For example, the engine output control system 68 may vary a throttle setting of the engine, a fuel/air mixture of the engine, a timing of the engine, other suitable engine parameters, or a combination thereof, to control engine output. In addition, the transmission control system 70 may adjust a gear ratio within a transmission (e.g., by adjusting gear selection in a transmission with discrete gears, by controlling a continuously variable transmission (CVT), etc.) to control the speed of the haul vehicle. Furthermore, the braking control system 72 may adjust braking force, thereby controlling the speed of the haul vehicle 30. While the illustrated speed control system 52 includes the engine output control system 68, the transmission control system 70, and the braking control system 72, alternative embodiments may include one or two of these systems, in any suitable combination. In further embodiments, the speed control system may include other and/or additional systems to facilitate adjusting the speed of the haul vehicle.

In the illustrated embodiment, the haul vehicle control system 43 includes a user interface 74 communicatively coupled to the controller 56. The user interface 74 is configured to selectively instruct the controller 56 to automatically control the haul vehicle based on operator input. For example, the operator may position the haul vehicle within the area of engagement, and then activate the automatic docking process via input to the user interface 74. In certain embodiments, the user interface includes a display 76 configured to present information to the operator, such as whether the haul vehicle is within the area of communication, whether the haul vehicle is within the area of engagement, and whether conditions for automatic docking have been satisfied, among other parameters. In addition, as discussed in detail below, the user interface 74 may enable the operator to adjust the selected zone and, in certain embodiments, the unloading point while the haul vehicle is docked with the harvester.

As illustrated, the haul vehicle 30 includes manual controls 78 configured to enable an operator to control the haul vehicle while the automatic control system is disengaged. The manual controls 78 may include manual steering control, manual transmission control, manual braking control, other suitable controls, or a combination thereof. In the illustrated embodiment, the manual controls 78 are communicatively coupled to the controller 56. The controller 56 is configured to disengage automatic control of the haul vehicle upon receiving a signal indicative of manual control of the haul vehicle. Accordingly, if an operator controls the haul vehicle manually, the automatic docking/docked process terminates, thereby restoring control of the haul vehicle to the operator.

In the illustrated embodiment, the harvester 10 includes a control system 79 having a spatial locating device 80, which is mounted to the harvester 10 and configured to determine the first determined position and the first determined velocity of the agricultural harvester 10. The harvester spatial locating device 80 may include any suitable system configured to measure the position, and in certain embodiments the velocity, of the harvester, such as a global positioning system (GPS), for example. In certain embodiments, the spatial locating device 80 may be configured to measure the position and velocity of the harvester relative to a fixed point within a field (e.g., via a fixed radio transceiver). Accordingly, the spatial locating device 80 may be configured to measure the position and velocity of the harvester relative to a fixed global coordinate system (e.g., via the GPS) or a fixed local coordinate system. As illustrated, the spatial locating device 80 is communicatively coupled to a controller 82 of the harvester control system 79. The harvester controller 82 includes a processor, such as the illustrated microprocessor 84, and a memory device 86. The controller 82 is communicatively coupled to the second transceiver 46 and configured to output position and velocity information from the spatial locating device 80 to the transceiver 46, thereby generating the first signal indicative of the first determined position and the first determined velocity of the agricultural harvester 10.

In the illustrated embodiment, the harvester control system 79 also includes a steering angle sensor 88 and an orientation sensor 90. The steering angle sensor 88 is configured to output a signal indicative of a measured and/or determined steering angle. For example, the steering angle sensor 88 may be configured to measure an angle of certain wheels/tracks (e.g., front wheels/tracks, rear wheels/tracks, etc.) relative to the chassis of the harvester. The steering angle sensor 88 may also be configured to measure differential braking forces (e.g., the braking force applied to each lateral side of the harvester). In addition, the steering angle sensor 88 may be configured to measure torque applied to each lateral side of the harvester (e.g., torque applied to a left wheel/track and torque applied to a right wheel/track). As illustrated, the steering angle sensor 88 is communicatively coupled to the controller 82. The controller 82 is configured to receive the signal indicative of steering angle from the sensor 88, and to output the signal to the transceiver 46. The transceiver 46, in turn, is configured to incorporate the steering angle information into the first signal to the haul vehicle. The steering angle information may enable the haul vehicle control system to more accurately predict the expected position of the harvester, thereby enhancing the efficiency of the docking process. The steering angle information may also enable the haul vehicle control system to more accurately position the haul vehicle at the target position while the haul vehicle is docked with the harvester.

Furthermore, the orientation sensor 90 is configured to output a signal indicative of a measured pitch angle, a measured yaw angle, a measured roll angle, or a combination thereof, of the harvester. For example, the orientation senor 90 may include a gyroscope or other sensor configured to monitor the orientation of the harvester 10. In certain embodiments, the orientation sensor 90 is also configured to determine a pitch rate, a yaw rate, a roll rate, or a combination thereof. As illustrated, the orientation sensor 90 is communicatively coupled to the controller 82. The controller 82 is configured to receive the signal indicative of the orientation measurements from the orientation sensor 90, and to output the signal to the transceiver 46. The transceiver 46, in turn, is configured to incorporate the orientation information into the first signal to the haul vehicle. The orientation information may enable the haul vehicle control system to more accurately predict the expected position of the harvester, thereby enhancing the efficiency of the docking process. The orientation information may also enable the haul vehicle control system to more accurately position the haul vehicle at the target position while the haul vehicle is docked with the harvester.

While the illustrated harvester control system includes a steering angle sensor 88 and an orientation sensor 90, one or both of these sensors may be omitted in certain embodiments. In addition, the harvester may include additional sensors configured to measure other parameters associated with operation of the harvester. For example, in certain embodiments, the harvester control system may include an electronic compass configured to output a signal indicative of heading. In further embodiments, the harvester control system may include an accelerometer configured to output a signal indicative of acceleration (e.g., three-dimensional acceleration) of the harvester. The output from such sensors may be incorporated within the first signal to the haul vehicle. For example, in certain embodiments, the heading information may be incorporated within the first determined velocity. The heading and/or acceleration information may enable the haul vehicle control system to more accurately predict the expected position of the harvester, thereby enhancing the efficiency of the docking process. The heading and/or acceleration information may also enable the haul vehicle control system to more accurately position the haul vehicle at the target position while the haul vehicle is docked with the harvester. While an electronic compass and an accelerometer are described above, in further embodiments the harvester control system may include other and/or additional suitable sensors.

In the illustrated embodiment, the harvester control system 79 includes a user interface 92 configured to receive input from an operator of the agricultural harvester. The user interface 92 includes a display 94 configured to present information to the harvester operator and/or to receive input from the operator. As illustrated, the user interface 92 is communicatively coupled to the controller 82. In certain embodiments, the controller 82 is configured to calibrate alignment of the conveyor outlet of the harvester with a storage compartment coupled to the haul vehicle. In such embodiments, the controller 82 is configured to receive a first signal from the user interface 92 indicative of alignment of the conveyor outlet with a first point on the storage compartment, and to determine a first position of the storage compartment relative to the agricultural harvester upon receiving the first signal. The controller 82 is also configured to receive a second signal from the user interface 92 indicative of alignment of the conveyor outlet with a second point on the storage compartment, diagonally opposite the first point, and to determine a second position of the storage compartment relative to the agricultural harvester upon receiving the second signal. In addition, the controller 82 is configured to establish a bounding rectangle having a first corner at the first point and a second corner at the second point based on the first and second positions. In certain embodiments, the controller 82 is also configured to establish multiple zones within the bounding rectangle, in which the zones do not overlap one another. As discussed in detail below, the zones may facilitate even loading of the storage compartment, thereby increasing the effective capacity of the storage compartment.

In the illustrated embodiment, the harvester control system 79 includes an optical sensor 93 and/or a measuring device 95 (e.g., a three-dimensional measuring device), each communicatively coupled to the controller 82. In certain embodiments, the optical sensor 93 (e.g., camera, infrared sensor, etc.) and/or the measuring device 95 are coupled to the conveyor (e.g., at the outlet) and configured to be directed toward the storage compartment. The measuring device 95 may include a light detection and ranging (LIDAR) system, a radio detection and ranging (RADAR) system, an ultrasonic measuring system, any other suitable system configured to determine a position and/or an orientation of at least one element of the storage compartment relative to the measuring device, or a combination thereof. In certain embodiments, the optical sensor 93 is configured to output a signal to the controller 82 indicative of an image or series of images of the storage compartment. The controller 82, in turn, is configured to output a corresponding signal to the user interface 92, which directs the display 94 to present one or more visual images of the storage compartment to the operator. The optical sensor 93 may be communicatively coupled directly to the user interface 92 in alternative embodiments. The visual image(s) presented by the display 94 may assist the operator in identifying alignment of the conveyor outlet with the first and second points on the storage compartment. As a result, the accuracy of the alignment calibration process may be enhanced.

In certain embodiments, the controller 82 may be configured to generate one or more images based on the signal output by the measuring device 95. For example, the controller 82 may be configured to establish a three-dimensional model of a portion of the storage compartment based on the signal, and to output a signal to the user interface 92 indicative of one or more views (e.g., top view, perspective view, etc.) of the three-dimensional model. The display 94 of the user interface 92, in turn, may present the views to the operator, thereby assisting the operator in indentifying alignment of the conveyor outlet with the first and second points on the storage compartment.

In certain embodiments, the controller 82 is configured to adjust the first and second points and the corresponding first and second positions of the storage compartment relative to the agricultural harvester based on input from the measuring device 95 and/or the optical sensor 93. For example, the controller 82 may be configured to identify corners of the storage compartment based on input from the measuring device 95 and/or the optical sensor 93. If the first point selected by the operator is remote from a first corner of the storage compartment (e.g., toward the center of the storage compartment, etc.) and/or outside the storage compartment, the controller 82 may adjust the first point and the corresponding first position of the storage compartment relative to the agricultural harvester, such that the first point is closer to the first corner of the storage compartment and within the storage compartment. In addition, if the second point selected by the operator is remote from a second corner of the storage compartment and/or outside the storage compartment, the controller 82 may adjust the second point and the corresponding second position of the storage compartment relative to the agricultural harvester, such that the second point is closer to the second corner of the storage compartment and within the storage compartment. The controller 82 may then establish a bounding rectangle having a first corner at the first point and a second corner at the second point based on the first and second positions, and the controller 82 may establish multiple zones within the bounding rectangle. By positioning the first and second points closer to the corners of the storage compartment, the accuracy of the alignment calibration process may be enhanced. While the illustrated embodiment includes an optical sensor 93 and a measuring device 95, in alternative embodiments, the optical sensor and/or the measuring device may be omitted.

In certain embodiments, the controller 82 is configured to select a zone within the bounding rectangle (e.g., based on input from the user interface 92, the optical sensor 93, the measuring device 95, the orientation sensor 49, or a combination thereof). In such embodiments, the controller 82 is configured to output a signal to the second transceiver 46 indicative of the selected zone. The transceiver 46, in turn, is configured to incorporate data indicative of the selected zone into the signal transmitted to the first transceiver 44. In certain embodiments, the signal is indicative of the position and dimensions of the selected zone. In such embodiments, the haul vehicle control system 43 may utilize the position and the dimensions of the selected zone, in addition to the position and velocity of the harvester, to determine the target position and/or the target velocity of the haul vehicle. For example, the haul vehicle control system 43 may determine a target position that substantially aligns the selected zone with the conveyor outlet of the harvester. Furthermore, in certain embodiments, the haul vehicle control system 43 may also be configured to establish the zones within the bounding rectangle (e.g., using the same technique as the harvester control system 79). In such embodiments, the harvester control system 79 may output a signal to the haul vehicle control system 43 indicative of the position and the dimensions of the bounding rectangle and the selected zone. The haul vehicle control system 43 may establish the zones within the bounding rectangle and select the zone identified in the signal from the harvester control system 79. The haul vehicle control system 43 may then determine the target position and/or the target velocity of the haul vehicle based on the selected zone and the position and velocity of the harvester. For example, the haul vehicle control system 43 may determine a target position that substantially aligns the selected zone with the conveyor outlet of the harvester. Because the controller 82 outputs a signal indicative of the selected zone (e.g., the position and dimensions of the selected zone) upon completion of the calibration process, the haul vehicle control system 43 may detect a successful calibration upon receiving the signal. In certain embodiments, the haul vehicle control system 43 may not initiate the docking process until a successful calibration is detected.

As previously discussed, the controller 82 is configured to select a zone within the bounding rectangle (e.g., based on input from the user interface 92, the optical sensor 93, the measuring device 95, the orientation sensor 49, or a combination thereof). For example, an operator of the harvester may periodically select different zones (e.g., based on an image provided by the optical sensor 93) during the unloading process, thereby establishing a substantially even distribution of agricultural product within the storage compartment. In addition, the controller 82 may automatically select the zone based on input from the optical sensor 93 and/or the measuring device 95. For example, if the controller 82 receives a signal from the optical sensor 93 and/or the measuring device 95 indicative of a level of agricultural product within the selected zone exceeding a threshold level (e.g., approaching the top of the storage compartment), the controller 82 may select a different zone such that the conveyor outlet is positioned over a portion of the storage compartment having a lower product level. Upon selection of a different zone, a signal indicative of the selected zone (e.g., the position and dimensions of the selected zone) is transmitted to the haul vehicle control system 43 (e.g., via the transceiver 46). Upon receiving the signal indicative of the selected zone, the haul vehicle control system 43 may adjust the target position such that the conveyor outlet is aligned with the selected zone (e.g., a lateral and/or longitudinal center point of the selected zone). In certain embodiments, the operator of the haul vehicle may also adjust the selected zone via the user interface 74 (e.g., in embodiments in which the harvester controller outputs a listing of zones and/or the position and dimensions of each zone to the haul vehicle control system 43 via the transceiver 46, and in embodiments in which the haul vehicle controller determines the zones based the position and dimensions of the bounding rectangle). In such embodiments, the haul vehicle control system 43 may output a signal indicative of the selected zone to the harvester control system 79.

In certain embodiments, the orientation sensor 49 of the haul vehicle control system 43 is configured to output a signal indicative of a roll angle (e.g., orientation of the storage compartment about a longitudinal axis of the storage compartment relative to a ground plane) and/or a pitch angle (e.g., orientation of the storage compartment about a lateral axis of the storage compartment relative to the ground plane). In such embodiments, the signal indicative of the roll angle and/or the pitch angle may be transmitted to the controller 82 of the harvester control system 79 via the first and second transceivers. The controller 82 may determine the roll angle and/or the pitch angle of the storage compartment based on the signal and select a zone based on the roll angle and/or the pitch angle. For example, in certain embodiments, the zones are arranged along a lateral axis of the storage compartment. While the storage compartment is positioned on an incline (e.g., hill) that orients the storage compartment at a non-zero roll angle, one zone is positioned above the other zone(s) relative to a ground plane. In certain embodiments, the controller 82 is configured to select the highest zone and output a signal indicative of the position and dimensions of the selected zone. The haul vehicle control system 43 may utilize the position and the dimensions of the selected zone, in addition to the position and velocity of the harvester, to determine the target position and/or the target velocity of the haul vehicle. For example, the haul vehicle control system 43 may determine a target position that substantially aligns the selected zone with the conveyor outlet of the harvester. By delivering agricultural product to the highest zone, the agricultural product may flow (e.g., laterally, longitudinally, etc.) across the storage compartment, thereby enhancing the usable storage capacity of the storage compartment.

In the illustrated embodiment, the agricultural harvester 10 includes a product deliver system 96 configured to transfer agricultural product from the harvester to the storage compartment. As illustrated, the product deliver system 96 is communicatively coupled to the controller 82. In certain embodiments, the controller 82 is configured to engage product flow from the conveyor outlet to the storage compartment (e.g., via activation of the product deliver system 96) while (e.g., only while) the conveyor outlet is within the selected zone. In further embodiments, the controller 82 is configured to engage product flow from the conveyor outlet to the storage compartment (e.g., via activation of the product delivery system 96) while (e.g., only while) the conveyor outlet is within a threshold range of an unloading point within the selected zone. Furthermore, in certain embodiments, the controller 82 is configured to engage product flow from the conveyor outlet to the storage compartment (e.g., via activation of the product delivery system 96) while (e.g., only while) the conveyor outlet is within a bounding shape (e.g., the bounding rectangle) within the storage compartment.

In certain embodiments, the controller 82 is configured to determine a position of the conveyor outlet relative to the storage compartment (e.g., based the position of the conveyor outlet relative to the agricultural harvester, the position of the agricultural harvester, and the position of the storage). In addition, the controller 82 is configured to select a target unloading area from a set of candidate target unloading areas. The set of candidate target unloading areas may include a target circle having a center at an unloading point and a radius corresponding to a threshold range from the unloading point a bounding shape (e.g., the bounding rectangle disclosed above), and a selected zone of the multiple zones established within the bounding shape. For example, the controller 82 may instruct the user interface 92 to present a list of the candidate target unloading areas. The agricultural harvester operator may select a desired zone from the list (e.g., via interaction with a touch screen display of the user interface 92). The user interface 92 may then output a signal to the controller indicative of the selected target unloading area. The controller 82, in turn, may select the target unloading area from the set of candidate target unloading areas based on the signal. Once the target unloading area is selected, the controller 82 may engage product flow from the conveyor outlet to the storage compartment (e.g., via activation of the product delivery system 96) while the position of the conveyor outlet is within the target unloading area. In addition, the controller 82 may terminate product flow from the conveyor outlet to the storage compartment (e.g., via deactivation of the product delivery system 96) while the position of the conveyor outlet is outside of the target unloading area.

In certain embodiments, the operator of the agricultural harvester may override the automatic control of the product flow. For example, user interface 92 may include/present a product flow engagement input (e.g., button, switch, etc.) and a product flow termination input (e.g., button, switch, etc.). Engaging the product flow engagement input (e.g., depressing a product flow engagement button) causes the user interface 92 to output a signal to the controller 82 indicative of product flow engagement. The controller 82, in turn, may engage product flow from the conveyor outlet to the storage compartment in response to receiving the signal, even though the position of the conveyor outlet is outside of the target unloading area. In addition, engaging the product flow termination input (e.g., depressing a product flow termination button) causes the user interface 92 to output a signal to the controller 82 indicative of product flow termination. The controller 82, in turn, may terminate product flow from the conveyor outlet to the storage compartment in response to the receiving the signal, even though the position of the conveyor outlet is within the target unloading area.

Furthermore, in certain embodiments, the controller 82 is configured to output a signal to the user interface 92 indicative of conveyor outlet misalignment in response to the position of the conveyor outlet moving outside the target unloading area. For example, the user interface 92 may present a visual (e.g., via the display 94) and/or an audible notification that the conveyor outlet has moved outside of the target unloading area, thereby informing the operator of the misalignment. Upon receiving such a notification, the operator may manually adjust the path of the agricultural harvester and/or adjust the position of the target unloading area to correct the misalignment.

In certain embodiments, the controller 82 is configured to control terminate the product flow based on an expected position of the conveyor outlet relative to the storage compartment. For example, the controller 82 may determine a first position of the conveyor outlet relative to the storage compartment at a current time and determine a second position of the conveyor outlet relative to the storage compartment at a future time. The future time corresponding to the current time plus a duration sufficient to terminate product flow into the storage compartment after the product delivery system 96 receives instructions to terminate product flow. For example, upon receiving instructions to terminate product flow, the product delivery system 96 may deactivate conveyor(s) and/or auger(s) configured to transfer the product from the internal storage compartment to the conveyor outlet. The duration sufficient to terminate product flow may include a lag within the control system, the time associated with stopping the conveyor(s)/auger(s), the time associated with product flow from the conveyor outlet under the influence of gravity, other delays associated with termination product flow, or a combination thereof. For example, the duration sufficient to terminate product flow may be about 1 second, about 2 seconds, about 3 seconds, about 4 seconds, or about 5 seconds. By way of further example, the duration sufficient to terminate product flow may be between about 0.5 seconds and about 10 seconds, between about 1 second and about 8 seconds, between about 2 seconds and about 6 seconds, or between about 3 seconds and about 5 seconds. Upon determine the first and second positions of the conveyor outlet, the controller 82 may instruct the product delivery system 96 to engage product flow from the conveyor outlet to the storage compartment while the first position of the conveyor outlet is within the target unloading area, and the controller 82 may instruct the product delivery system to terminate product flow from the conveyor outlet to the storage compartment while the second position of the conveyor outlet is outside of the target unloading area. By terminating product flow before the conveyor outlet moves outside of the target unloading area, the possibility of product being delivered to an undesirable area (e.g., the agricultural field, a different zone, etc.) may be substantially reduced or eliminated.

Furthermore, in certain embodiments, the conveyor of the product delivery system 96 is movable between a first position on the left side of the agricultural harvester 10, a second position on the right side of the agricultural harvester 10, and a third position on a rearward side of the agricultural harvester 10. In the illustrated embodiment, the agricultural harvester 10 includes an actuator 97 configured to drive the conveyor to move between the first, second, and third positions. The actuator 97 may include an electric motor, a linear actuator, a hydraulic cylinder, a pneumatic cylinder, a hydraulic motor, a pneumatic motor, another suitable type of actuator, or a combination thereof. The moveable conveyor enables the product delivery system 96 to selectively unload agricultural product to a storage compartment position on the left side of the agricultural harvester, on the right side of the agricultural harvester, and on the rearward side of the agricultural harvester.

In the illustrated embodiment, the actuator 97 is communicatively coupled to the harvester controller 82. In certain embodiments, the controller 82 is configured to select a target unloading side from a list of candidate target unloading sides based on a plan, in which the plan includes a route of the agricultural harvester through a field. In other embodiments, the controller 82 is configured to receive a signal indicative of selection the target unloading side from the list of candidate unloading sides. The signal may be received from the user interface 92 of the agricultural harvester 10 and/or the user interface 74 of the haul vehicle 30. The list of candidate target unloading sides may include left side of the agricultural harvester and the right side of the agricultural harvester, and in certain embodiments, the rearward side of the agricultural harvester. In response to selecting the target unloading side, the controller 82 may instruct the actuator 97 to move the conveyor outlet of the product delivery system 96 to the target unloading side. The controller 82 may also output a signal indicative of instructions to position the storage compartment on the target unloading side. The signal may be output to the transceiver 46, which outputs a corresponding signal to the transceiver 44 of the haul vehicle 30, which outputs a corresponding signal to the haul vehicle controller 56. The haul vehicle controller 56, in turn, may direct the haul vehicle 30 to the target side unloading side of the agricultural harvester.

In certain embodiments, the bounding shape for the storage compartment may vary based on the side on which the storage compartment is positioned. For example, a first bounding shape may be associated with the storage compartment position on the left side of the agricultural harvester, a second bounding shape may be associated with the storage compartment positioned on the right side of the agricultural harvester, and a third bounding shape may be associated with the storage compartment position on the rearward side of the agricultural harvester. In certain embodiments, the controller 82 may determine the bounding shape associated with the storage compartment being positioned on one lateral side (e.g., the right side) of the agricultural harvester by mirroring the bounding shape associated with the storage compartment being position on the other lateral side (e.g., the left side) of the agricultural harvester along a lateral centerline of the agricultural harvester. As a result, the duration associated with determining both bounding shapes may be substantially reduced (e.g., as compared to utilizing the manual process described above to determine both bounding shapes).

Figure 3:
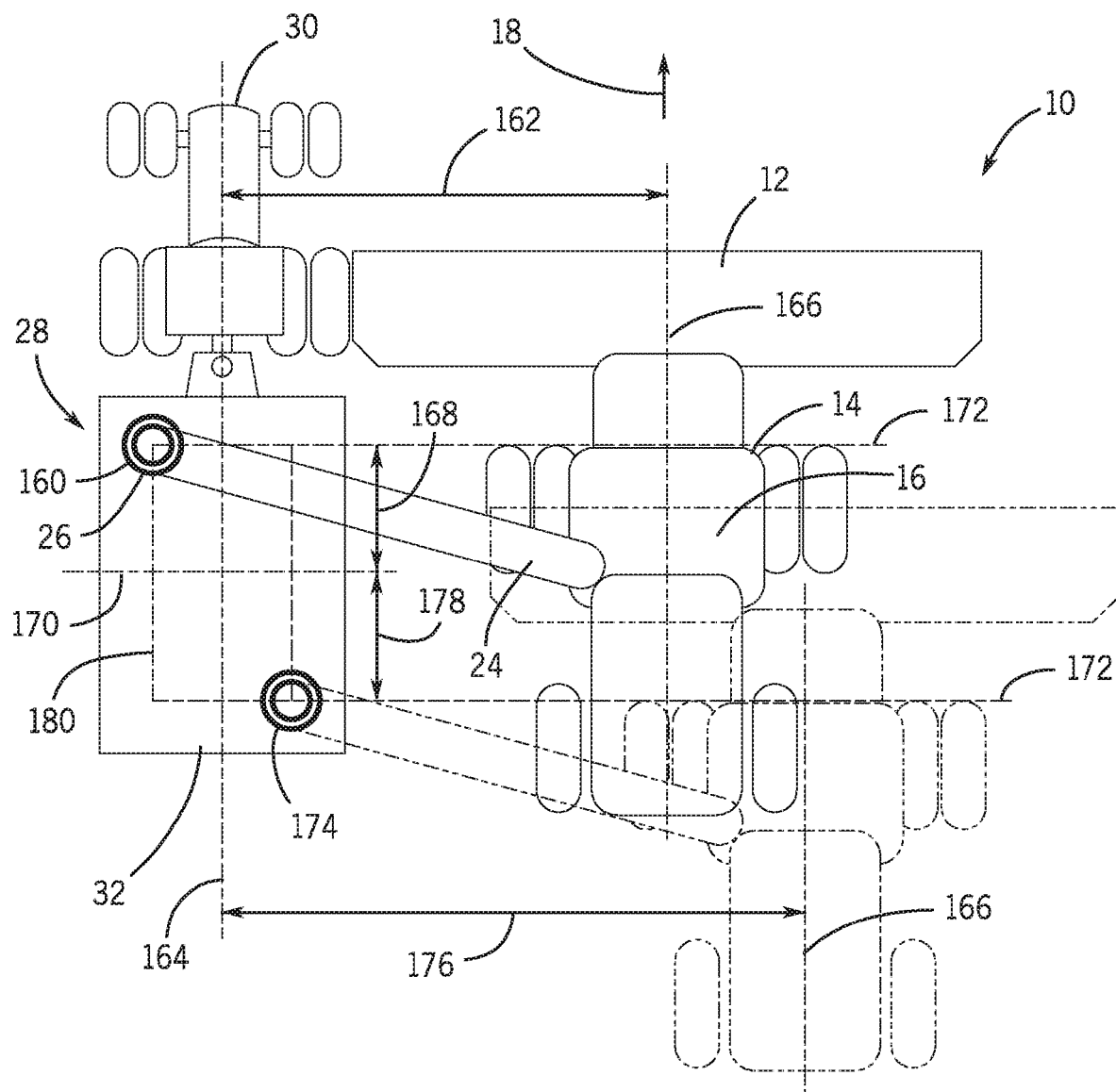
FIG. 3 is a schematic diagram of an embodiment of an agricultural harvester with an extended conveyor and an agricultural product transportation system having a storage compartment.

FIG. 3 is a schematic diagram of an embodiment of an agricultural harvester 10 with an extended conveyor 24 and an agricultural product transportation system 28 having a storage compartment 32. In certain embodiments, the harvester controller is configured to calibrate alignment of the conveyor outlet 26 with the storage compartment 32, thereby enabling the haul vehicle controller to establish a target position that facilitates efficient transfer of the agricultural product from the harvester to the storage compartment. In such embodiments, the harvester controller is configured to receive a first signal from a user interface indicative of alignment of the conveyor outlet 26 with a first point 160 on the storage compartment 32. For example, an operator of the haul vehicle 30 may position the storage compartment 32 (e.g., via manual control of the haul vehicle) such that the conveyor outlet 26 is aligned with the first point 160 at a front left portion of the storage compartment 32, as illustrated by the harvester 10 in solid lines. Alternatively, an operator of the harvester 10 may position the harvester 10 (e.g., via manual control of the harvester) such that the conveyor outlet 26 is aligned with the first point 160. Once aligned, the operator of the harvester 10 or the operator of the haul vehicle 30 depresses a button on the user interface that outputs the first signal indicative of alignment to the harvester controller.

Upon receiving the first signal, the harvester controller determines a first position of the storage compartment 32 relative to the harvester 10. In the illustrated embodiment, the first position includes a lateral distance 162 that extends between a lateral centerline 164 of the storage compartment 32 and a lateral centerline 166 of the harvester 10. The first position also includes a longitudinal distance 168 that extends between a longitudinal centerline 170 of the storage compartment 32 and a reference line 172 of the harvester 10. However, the position of the storage compartment 32 relative to the harvester 10 may include lateral and longitudinal distances based on other suitable reference lines.

The harvester controller is also configured to receive a second signal from the user interface indicative of alignment of the conveyor outlet 26 with a second point 174 on the storage compartment 32, diagonally opposite the first point 160. For example, an operator of the haul vehicle 30 may position the storage compartment 32 (e.g., via manual control of the haul vehicle) such that the conveyor outlet 26 is aligned with the second point 174 at a rear right portion of the storage compartment 32, as illustrated by the harvester 10 in phantom lines. Alternatively, an operator of the harvester 10 may position the harvester 10 (e.g., via manual control of the harvester) such that the conveyor outlet 26 is aligned with the second point 174. Once aligned, the operator of the harvester 10 or the operator of the haul vehicle 30 depresses a button on the user interface that outputs the second signal indicative of alignment to the harvester controller.

Upon receiving the second signal, the harvester controller determines a second position of the storage compartment 32 relative to the harvester 10. In the illustrated embodiment, the second position includes a lateral distance 176 that extends between the lateral centerline 164 of the storage compartment 32 and the lateral centerline 166 of the harvester 10. The second position also includes a longitudinal distance 178 that extends between the longitudinal centerline 170 of the storage compartment 32 and the reference line 172 of the harvester 10. As noted above, the position of the storage compartment 32 relative to the harvester 10 may include lateral and longitudinal distances based on other suitable reference lines. However, the first and second positions utilize the same reference lines/coordinate system. In certain embodiments, the harvester controller is configured to adjust the first and second points and the corresponding first and second positions of the storage compartment relative to the harvester based on input from the optical sensor and/or the measuring device, thereby enhancing the accuracy of the alignment calibration process.

The harvester controller is also configured to establish a bounding rectangle 180 having a first corner at the first point 160 and a second corner at the second point 174 based on the first position and the second position of the storage compartment 32 relative to the harvester 10. While the illustrated bounding rectangle 180 is established based on the front left point and the rear right point, the bounding rectangle may also be established based on a front right point and a rear left point. Once the bounding rectangle is established, the harvester controller may establish multiple zones within the bounding rectangle, in which the zones do not overlap one another. One of the zones may be selected (e.g., manually via the user interface or automatically), and the haul vehicle control system may determine a target position that substantially aligns the selected zone with the conveyor outlet of the harvester.

In certain embodiments, the harvester controller is configured to store data indicative of the bounding rectangle and the zones (e.g., within the memory device of the controller) to facilitate subsequent alignment of the conveyor outlet 26 with the storage compartment 32. For example, the harvester controller may receive a signal indicative of an identity of the storage compartment 32 (e.g., a unique identification number). Upon receiving such a signal, the harvester controller associates the identity of the storage compartment with the bounding rectangle and the zones. The harvester controller then stores the identity and data indicative of the bounding rectangle (e.g., the positions of the first and second corners of the bounding rectangle) and the zones (e.g., the position and dimensions of each zone), thereby facilitating subsequent alignment of the conveyor outlet 26 with the storage compartment 32.

In certain embodiments, the harvester controller is configured to determine whether the dimensions of the bounding rectangle 180 are within a threshold range prior to completing the calibration process and/or storing the identity and the data indicative of the bounding rectangle and the zones. For example, if the bounding rectangle is smaller than a minimum expected size or larger than a maximum expected size, the controller may instruct the operator (e.g., via the user interface) to recalibrate the alignment of the conveyor outlet and the storage compartment. In addition, the harvester controller may be configured to determine whether the first position and the second position of the storage compartment relative to the harvester are within a threshold range prior to completing the calibration process and/or storing the identity and the data indicative of the bounding rectangle and the zones. For example, if the storage compartment is closer than a minimum threshold separation distance or farther than a maximum threshold separation distance, the controller may instruct the operator (e.g., via the user interface) to recalibrate the alignment of the conveyor outlet and the storage compartment. Once the calibration process is complete, the harvester control system may output a signal to the haul vehicle control system indicative of a successful calibration, thereby enabling the haul vehicle control system to initiate docking with the harvester. The harvester control system may also output a signal to the haul vehicle control system indicative of the position and dimensions of the bounding rectangle and the zones, thereby enabling an operator of the haul vehicle to select a zone and/or verify that the haul vehicle is positioned at the target position. In certain embodiments, the haul vehicle control system may also be configured to establish the zones within the bounding rectangle (e.g., using the same technique as the harvester control system). In such embodiments, the harvester control system may output a signal to the haul vehicle control system indicative of the position and the dimensions of the bounding rectangle, and the haul vehicle control system may establish the zones within the bounding rectangle, thereby enabling the operator of the haul vehicle to select a zone.

Figure 4:
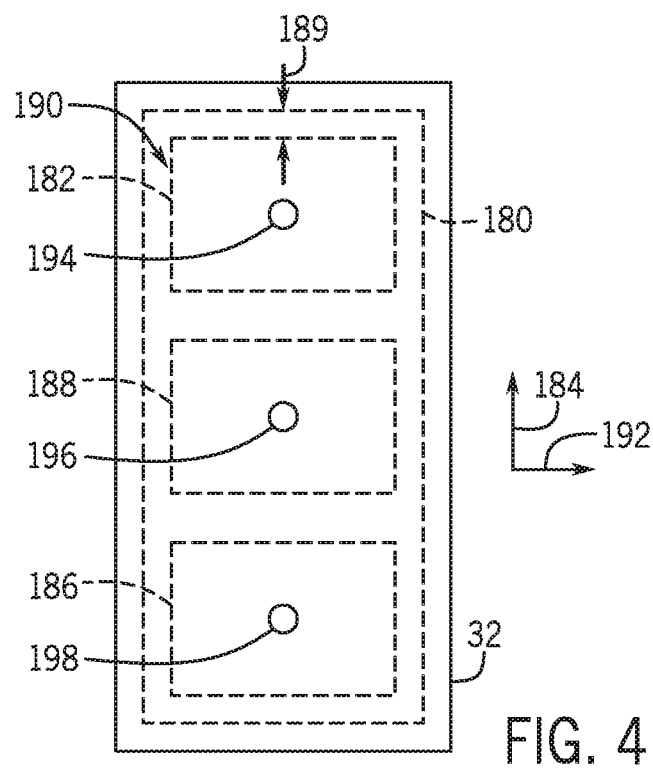
FIG. 4 is a schematic diagram of an embodiment of a storage compartment having multiple zones that may be employed within the agricultural product transportation system of FIG. 3.

FIG. 4 is a schematic diagram of an embodiment of a storage compartment 32 having multiple zones that may be employed within the agricultural product transportation system of FIG. 3. The harvester controller is configured to establish multiple zones within the bounding rectangle 180 (e.g., based on a selected number of zones, a desired arrangement of the zones, the dimensions of the bounding rectangle, etc.). In the illustrated embodiment, the zones include a first zone 182 positioned at a forward portion of the bounding rectangle 180 along a longitudinal axis 184 of the storage compartment 32. The zones also include a second zone 186 positioned at a rearward portion of the bounding rectangle 180 along the longitudinal axis 184. In addition, the zones include a third zone 188 positioned between the first zone 182 and the second zone 186 along the longitudinal axis 184. As such, the zones are arranged along the longitudinal axis 184 of the storage compartment 32. While the bounding rectangle is divided into three zones in the illustrated embodiment, in other embodiments, the bounding rectangle may be divided into more or fewer zones (e.g., 2, 3, 4, 5, 6, 7, 8, 9, 10, or mores). Furthermore, while the illustrated zones are arranged along the longitudinal axis of the storage compartment, in other embodiments, the zones may be positioned at other suitable locations within the bounding rectangle. For example, the zones may be arranged along a lateral axis of the storage compartment, or the zones may be arranged in a matrix configuration within the bounding rectangle.

In the illustrated embodiment, the zones are positioned a threshold distance 189 from the bounding rectangle 180 to establish a buffer region 190. The threshold distance 189 along the longitudinal axis 184 is equal to the threshold distance along a lateral axis 192 of the storage compartment 32 in the illustrated embodiment. However, in alternative embodiments, the threshold distance along the longitudinal axis may be different than the threshold distance along the lateral axis. Furthermore, in certain embodiments, the threshold distance may be zero, such that outer edges of the zones contact the bounding rectangle. In addition, while the zones are spaced apart from one another along the longitudinal axis 184 in the illustrated embodiment, in other embodiments, the inner edges of the zones may be in contact with one another.

As previously discussed, the harvester controller is configured to output a signal indicative of the selected zone. For example, the harvester controller may output a signal indicative of the position and dimensions of the selected zone. In the illustrated embodiment, each zone is rectangular. Accordingly, the position and dimensions of each zone may be represented by a position of a first corner of the zone relative to the storage compartment and a position of a second corner of the zone relative to the storage compartment. In further embodiments, at least one zone may have another suitable shape (e.g., hexagonal, octagonal, circular, etc.). In such embodiments, the harvester controller may output a signal indicative of data sufficient to identify the position and dimensions of the zone. Furthermore, while the zones are the same size in the illustrated embodiment, in other embodiments, at least one zone may be larger or smaller than the other zones.

In certain embodiments, the harvester controller is configured to establish an unloading point within the selected zone. For example, the harvester controller may establish a first unloading point 194 within (e.g., at the center of) the first zone 182, a second unloading point 196 within (e.g., at the center of) the second zone 188, or a third unloading point 198 within (e.g., at the center of) the third zone 186. In the illustrated embodiment, each unloading point is positioned at the lateral midpoint and the longitudinal midpoint of the respective zone, i.e., at the center of the respective zone. However, the harvester controller may be configured to establish each unloading point at another suitable location within the respective zone (e.g., laterally and/or longitudinally offset from the center).

Once the zones are established, the harvester controller is configured to select one of the zones for receiving agricultural product. The harvester controller may select the zone based on input from the user interface, feedback from the optical sensor and/or the measuring device, or feedback from the orientation sensor of the haul vehicle, for example. Upon selection of the zone, the harvester controller is configured to output a signal indicative of the selected zone (e.g., indicative of the position and dimensions of the selected zone). The haul vehicle controller may receive the signal (e.g., via the transceivers) and then determine a target position that substantially aligns the selected zone with the conveyor outlet, thereby facilitating efficient transfer of the agricultural product from the harvester to the storage compartment. In certain embodiments, the harvester controller is also configured to output a signal indicative of the unloading point within the selected zone. In such embodiments, the haul vehicle controller is configured to determine the target position that substantially aligns the unloading point within the selected zone with the conveyor outlet. As previously discussed, once the target position is established, the haul vehicle controller controls the steering control system and the speed control system of the haul vehicle to direct the storage compartment along a route to the target position, and upon reaching the target position, to substantially maintain the target position to facilitate the transfer of the agricultural product.

In certain embodiments, the harvester controller is configured to automatically engage product flow while the position of the conveyor outlet is within a target unloading area, and the harvester controller is configured to automatically disengage product flow while the position of conveyor outlet is outside of the target unloading area. Furthermore, as discussed in detail below, the harvester controller may select the target unloading area from a set of candidate target unloading areas. The target unloading areas may include a target circle having a center at the unloading point of the selected zone and a radius corresponding to a threshold range of the unloading point, the selected zone, and a bounding shape, such as the illustrated bounding rectangle 180. The harvester controller may select the target unloading area based on a signal from the user interface indicative of the target loading area. Furthermore, in certain embodiments, the harvester controller may select the target unloading area based on a previously selected target unloading area for the storage compartment, the crop type, or the size of the storage compartment, among other suitable criteria.

If the selected target unloading area is the target circle, the harvester controller is configured to engage product flow from the conveyor outlet to the storage compartment 32 while the conveyor outlet is within a threshold range of the unloading point of the selected zone (e.g., within the target circle having a center at the unloading point and a radius corresponding to the threshold range). The threshold range may be manually adjusted via the user interface of the harvester or the haul vehicle. In addition, the harvester controller may be configured to adjust a lateral position and/or a longitudinal position of the unloading point (e.g., away from the center of the respective zone) based on a signal from the user interface, from the optical sensor, from the measuring device, or a combination thereof. For example, an operator may adjust the position of the unloading point via the user interface before or during the unloading process (e.g., to facilitate substantially even distribution of the agricultural product within the selected zone). However, the controller may limit the adjustment of the unloading point to locations within the selected zone. In addition, the harvester controller may automatically adjust the position of the unloading point within the selected zone during the unloading process based on signal(s) from the optical sensor and/or the measuring device indicative of product level at the unloading point. For example, if the product level at the unloading point exceeds a threshold level, the harvester controller may adjust the position of the unloading point to a region of the selected zone with a lower product level. During the unloading process, the harvester controller may be configured to terminate product flow from the conveyor outlet to the storage compartment 32 while the position of the conveyor outlet is outside of the target circle (e.g., the distance between the conveyor outlet and the unloading point is greater than the threshold range).

If the selected target unloading area is the selected zone, the harvester controller is configured to engage product flow from the conveyor outlet to the storage compartment 32 while the conveyor outlet is positioned within the selected zone (e.g., even if the conveyor outlet is offset from the unloading point by more than the threshold range). During the unloading process, the harvester controller may be configured to terminate product flow from the conveyor outlet to the storage compartment 32 while the position of the conveyor outlet is outside of the selected zone. In certain embodiments, the harvester controller may be configured to select another zone (e.g., in response to operator input, upon detection that the product level within the previously selected zone exceeds a threshold level, etc.). For example, if the harvester controller receives a signal from the optical sensor and/or the measuring device indicative of a level of agricultural product within the previously selected zone exceeding a threshold level (e.g., approaching the top of the storage compartment), the harvester controller may select a different zone such that the conveyor outlet is positioned over a portion of the storage compartment having a lower product level. Upon selection of a different zone, a signal indicative of the selected zone (e.g., indicative of the position and dimensions of the selected zone) is transmitted to the haul vehicle control system (e.g., via the harvester transceiver). Upon receiving the signal indicative of the selected zone, the haul vehicle control system may adjust the target position such that the conveyor outlet is aligned with the newly selected zone (e.g., an unloading point within the newly selected zone). In certain embodiments, the operator of the harvester and/or the operator of the haul vehicle may also adjust the selected zone via the respective user interface (e.g., based on an image of the storage compartment displayed on the respective user interface).

In certain embodiments, the harvester controller may terminate product flow from the conveyor outlet to the storage compartment during the transition between zones. For example, the harvester controller may terminate product flow from the conveyor outlet to the storage compartment in response to the conveyor outlet moving out of the previously selected zone. The harvester controller may then engage product flow in response to the conveyor outlet entering the newly selected zone. In further embodiments, the harvester controller may terminate product flow from the conveyor outlet to the storage compartment upon selection of a new zone. The harvester controller may then engage product flow in response to the conveyor outlet entering the newly selected zone.

In certain embodiments, the harvester controller is configured to store the selected zone for subsequent determination of a selected zone during subsequent alignment of the conveyor outlet with the storage compartment or another storage compartment. For example, in certain embodiments, during subsequent alignment of the conveyor outlet with the storage compartment or another storage compartment (e.g., to transfer agricultural product into the empty storage compartment), the harvester controller may select a zone corresponding to the last selected zone of the previously filled storage compartment. In further embodiments, the harvester controller may select a different zone from the last selected zone of the previously filled storage compartment. Furthermore, in certain embodiments, the harvester controller may be configured to select zones in a selected order for each storage compartment (e.g., from front to back, from back to front, from the center outward, etc.).

If the selected target unloading area is the bounding rectangle 180, the harvester controller is configured to engage product flow from the conveyor outlet to the storage compartment 32 while the conveyor outlet is positioned within the bounding rectangle 180. During the unloading process, the harvester controller is configured to terminate product flow from the conveyor outlet to the storage compartment 32 while the position of the conveyor outlet is outside of the bounding rectangle. Automatically terminating product flow while the conveyor outlet is positioned outside the bounding rectangle may substantially reduce the amount of product expelled onto the agricultural field, thereby reducing product loss during the unloading process. Furthermore, in certain embodiments, the harvester controller and/or the haul vehicle controller may cause the agricultural harvester to undock from the storage compartment in response to the conveyor outlet being outside of the bounding rectangle. While a bounding shape used for automatic product flow control is a rectangle in the illustrated embodiment, in other embodiments, the bounding shape may be any other suitable shape, such as a hexagon, a circle, or an ellipse, among other suitable shapes.

Figure 5:
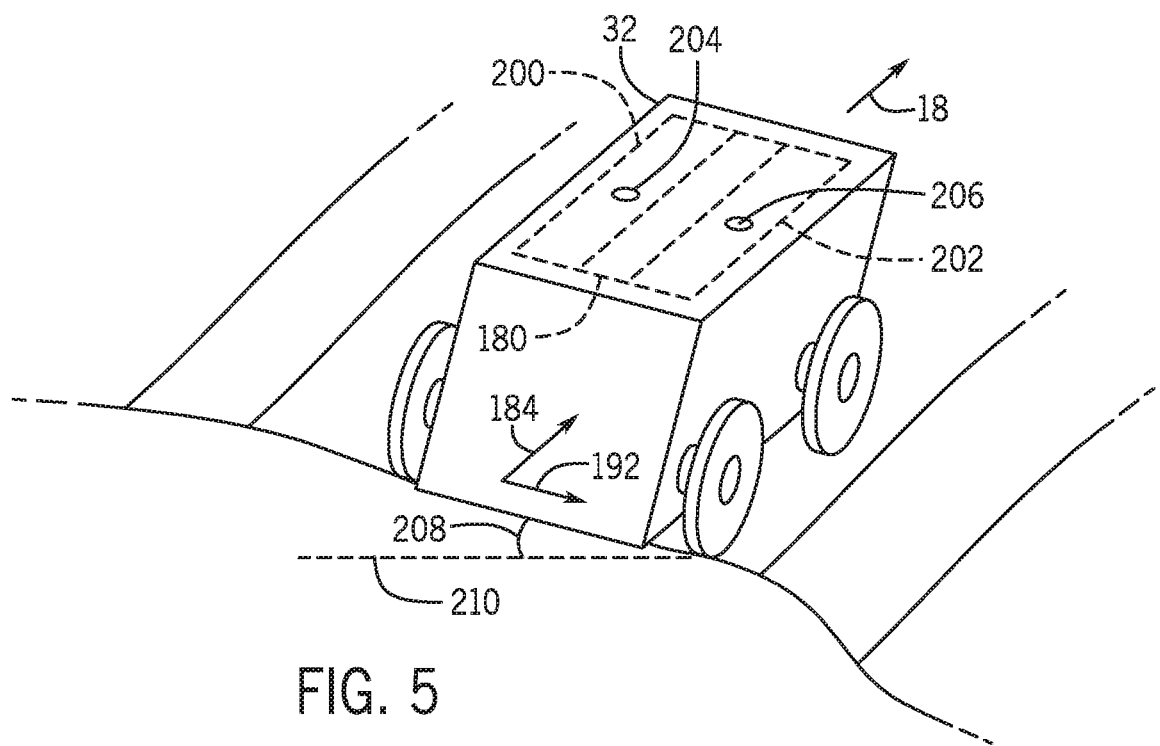
FIG. 5 is a perspective view of an embodiment of a storage compartment having multiple zones that may be employed within the agricultural product transportation system of FIG. 3.

FIG. 5 is a perspective view of an embodiment of a storage compartment 32 having multiple zones that may be employed within the agricultural product transportation system of FIG. 3. As previously discussed, the harvester controller is configured to establish multiple zones within the bounding rectangle 180 (e.g., based on a selected number of zones, a desired arrangement of zones, the dimensions of the bounding rectangle, etc.). In the illustrated embodiment, the zones include a first zone 200 positioned at a left portion of the bounding rectangle 180 along the lateral axis 192 of the storage compartment 32. In addition, the zones include a second zone 202 positioned at a right portion of the bounding rectangle 180 along the lateral axis 192. As such, the zones are arranged along the lateral axis 192 of the storage compartment 32. While the bounding rectangle is divided into two zones in the illustrated embodiment, in other embodiments, the bounding rectangle may be divided into more zones (e.g., 3, 4, 5, 6, 7, 8, 9, 10, or more). Furthermore, while the illustrated zones are arranged along the lateral axis of the storage compartment, in other embodiments, the zones may be positioned at other suitable locations within the bounding rectangle. For example, the zones may be arranged along a longitudinal axis of the storage compartment (e.g., as shown in FIG. 4), or the zones may be arranged in a matrix configuration within the bounding rectangle.

In the illustrated embodiment, the distance between the outer edges of each zone and the bounding rectangle 180 is zero. Accordingly, the outer edges of the zones contact the bounding rectangle. However, in alternative embodiments, the zones may be positioned a threshold distance from the bounding rectangle to establish a buffer region. Further, while the zones are spaced apart from one another along the lateral axis 192 in the illustrated embodiment, in other embodiments, the inner edges of the zones may be in contact with one another.

As previously discussed, the harvester controller is configured to output a signal indicative of the selected zone. For example, the signal may be indicative of the position and dimensions of the selected zone. In the illustrated embodiment, each zone is rectangular. Accordingly, the position and dimensions of each zone may be represented by a position of a first corner of the zone relative to the storage compartment and a position of a second corner of the zone relative to the storage compartment. In further embodiments, at least one zone may have another suitable shape (e.g., hexagonal, octagonal, circular, etc.). In such embodiments, the harvester controller may output a signal indicative of data sufficient to identify the position and dimensions of the zone.

In certain embodiments, the harvester controller is configured to establish an unloading point within the selected zone. For example, the harvester controller may establish a first unloading point 204 within (e.g., at the center of) the first zone 200, or the harvester controller may establish a second unloading point 206 within (e.g., at the center of) the second zone 202. In the illustrated embodiment, each unloading point is positioned at the lateral midpoint and the longitudinal midpoint of the respective zone, i.e., at the center of the respective zone. However, the harvester controller may be configured to establish each unloading point at another suitable location within the respective zone (e.g., laterally and/or longitudinally offset from the center).

Once the zones are established, the harvester controller is configured to determine an orientation of the storage compartment 32 about the longitudinal 184 and to select one of the zones for receiving agricultural product based on the orientation. For example, the orientation sensor of the haul vehicle may output a signal indicative of an orientation/ angle 208 of the haul vehicle and the storage compartment 32 relative to a ground plane 210 (e.g., a plane representative of an average profile of the field, a reference plane, etc.). The transceivers of the haul vehicle and the harvester may convey the signal to the harvester controller, and the harvester controller, in turn, may determine the orientation 208 of the storage compartment 32 based on the signal. The harvester controller may then select the zone having the highest vertical position (e.g., relative to the ground plane 210). In the illustrated embodiment, the harvester controller selects the first zone 200 because the first zone 200 is positioned higher than the second zone 202 relative to the ground plane 210. By delivering agricultural product to the zone on the higher lateral side of the storage compartment, the agricultural product may flow from the higher zone to the lower zone, thereby enhancing the usable storage capacity of the storage compartment.

Upon selection of the zone, the harvester controller is configured to output a signal indicative of the selected zone (e.g., indicative of the position and dimensions of the selected zone). The haul vehicle controller may receive the signal (e.g., via the transceivers) and then determine a target position that substantially aligns the selected zone with the conveyor outlet, thereby facilitating efficient transfer of the agricultural product from the harvester to the storage compartment. In certain embodiments, the harvester controller is also configured to output a signal indicative of the unloading point within the selected zone. In such embodiments, the haul vehicle controller is configured to determine the target position that substantially aligns the unloading point within the selected zone with the conveyor outlet. As previously discussed, once the target position is established, the haul vehicle controller controls the steering control system and the speed control system of the haul vehicle to direct the storage compartment along a route to the target position, and upon reaching the target position, to substantially maintain the target position to facilitate the transfer of the agricultural product.

In certain embodiments, the harvester controller is configured to engage product flow from the conveyor outlet to the storage compartment 32 while (e.g., only while) the conveyor outlet is within a threshold range of the unloading point of the selected zone (e.g., within a target circle having a center at the unloading point and a radius corresponding to the threshold range). The threshold range may be manually adjusted via the user interface of the harvester or the haul vehicle. In addition, the harvester controller may be configured to adjust a lateral position and/or a longitudinal position of the unloading point (e.g., away from the center of the respective zone) based on a signal from the user interface, from the optical sensor, from the measuring device, or a combination thereof. For example, an operator may adjust the position of the unloading point via the user interface during the unloading process, thereby facilitating substantially even distribution of the agricultural product within the selected zone. However, the controller may limit the adjustment of the unloading point to locations within the selected zone. In addition, the harvester controller may automatically adjust the position of the unloading point within the selected zone during the unloading process based on signal(s) from the optical sensor and/or the measuring device indicative of product level at the unloading point. For example, if the product level at the unloading point exceeds a threshold level, the harvester controller may adjust the position of the unloading point to a region of the selected zone with a lower product level.

In further embodiments, the harvester controller is configured to engage product flow from the conveyor outlet to the storage compartment 32 while (e.g., only while) the conveyor outlet is positioned within the selected zone (e.g., even if the conveyor outlet is offset from the unloading point by more than the threshold range). Furthermore, in certain embodiments, the harvester controller may be configured to select another zone (e.g., in response to a change in orientation of the storage compartment, etc.). For example, if the harvester controller determines that the second zone is positioned higher than the first zone relative to the ground plane based on the orientation of the storage compartment, the harvester controller may select the second zone. Upon selection of the second zone, a signal indicative of the second zone (e.g., indicative of the position and dimensions of the second zone) is transmitted to the haul vehicle control system (e.g., via the harvester transceiver). Upon receiving the signal indicative of the selected zone, the haul vehicle control system may adjust the target position such that the conveyor outlet is aligned with the newly selected zone (e.g., an unloading point within the newly selected zone). In certain embodiments, the operator of the harvester and/or the operator of the haul vehicle may also adjust the selected zone via the respective user interface (e.g., based on an image of the storage compartment displayed on respective the user interface).

While the harvester controller is configured to select the highest zone based on the orientation of the storage compartment about the longitudinal axis in the illustrated embodiment, in other embodiments, the harvester controller may be configured to select the highest zone based on the orientation of the storage compartment about the lateral axis or about the lateral axis and the longitudinal axis. For example, in certain embodiments, the zones may be arranged along the longitudinal axis (e.g., as shown in FIG. 4). In such embodiments, the harvester controller may select the highest zone based on the orientation of the storage compartment about the lateral axis. Furthermore, in certain embodiments, the zones may be arranged along the lateral axis and along the longitudinal axis (e.g., in a matrix pattern). In such embodiments, the harvester controller may select the highest zone based on the orientation of the storage compartment about the longitudinal and lateral axes.

Figure 6:
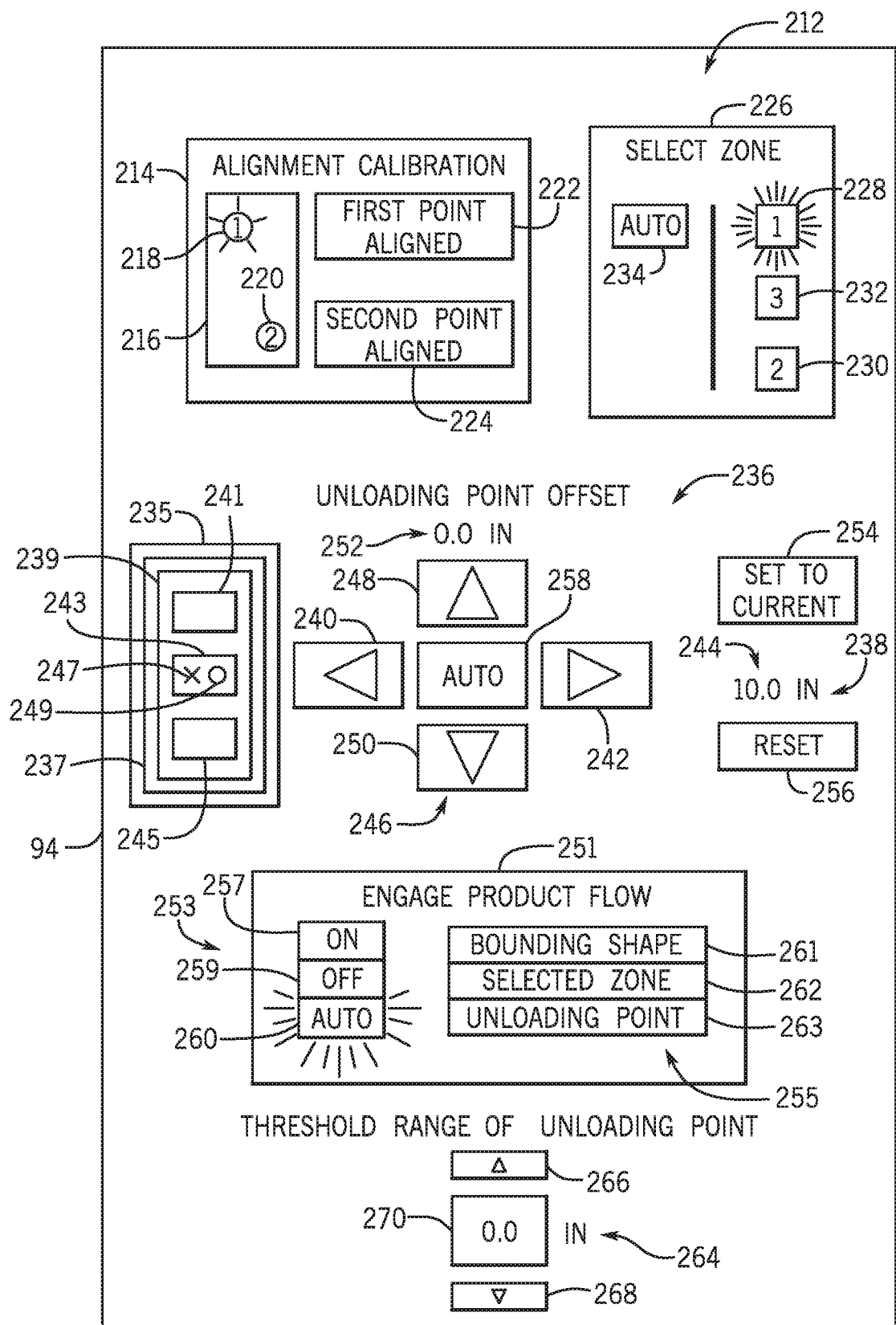
FIG. 6 is a block diagram of an embodiment of a display that may be employed within a user interface of the agricultural harvester of FIG. 3.

FIG. 6 is a block diagram of an embodiment of a display 94 that may be employed within the user interface of the harvester of FIG. 3. While the illustrated display 94 is described below with reference to the harvester, the same display or a similar display may be employed within the user interface of the haul vehicle. As illustrated, the display 94 presents a graphical representation 212 of various controls that may be utilized to facilitate calibration of the conveyor outlet/storage compartment alignment, selection of a zone, adjustment of the position of the unloading point within the selected zone, and control of the unloading process. In the illustrated embodiment, the display 94 includes an alignment calibration screen 214. The alignment calibration screen 214 includes a graphical representation 216 of the bounding rectangle, a first indicator 218 representative of the first corner of the bounding rectangle, and a second indicator 220 representative of the second corner of the bounding rectangle. The alignment calibration screen 214 also includes a "first point aligned" button 222 and a "second point aligned" button 224.

As previously discussed, data associated with each previously calibrated storage compartment (e.g., data indicative of the positions of the first and second corners of the bounding rectangle, data indicative of the position and dimensions of each zone, data indicative of the selected zone, etc.) is stored within the harvester control system. Accordingly, if a previously calibrated storage compartment is detected by the harvester control system, the alignment calibration screen 214 may be disabled (e.g., "grayed out"). However, if a new storage compartment is detected, the alignment calibration screen is enabled, thereby prompting the operator to initiate the calibration process. Once the calibration process is complete, the data associated with the new storage compartment is stored within the harvester control system for subsequent docking processes.

During the calibration process, the first indicator 218 illuminates, as illustrated, thereby prompting the operator (e.g., of the harvester or the haul vehicle) to align the conveyor outlet with the first point at the front left of the storage compartment. Once aligned, the operator depresses the "first point aligned" button 222. In certain embodiments, the operator is provided with an indication that the first point is accepted by the harvester control system (e.g., via a change in color of the first indicator 218, darkening of the first indicator 218, etc.). However, if the first point is not accepted by the harvester controller (e.g., because the distance between the haul vehicle/storage compartment and the harvester is less than a minimum threshold distance or greater than a maximum threshold distance), the user interface may indicate a fault (e.g., via displaying a text message to the operator, changing the color of the first indicator 218, etc.). The operator may then realign the conveyor outlet with the first point.

Once the harvester controller accepts the first point, the second indicator 220 illuminates, thereby prompting the operator (e.g., of the harvester or the haul vehicle) to align the conveyor outlet with the second point at the rear right of the storage compartment. Once aligned, the operator depresses the "second point aligned" button 224. In certain embodiments, the operator is provided with an indication that the second point is accepted by the harvester control system (e.g., via a change of color of the second indicator 220, darkening of the second indicator 220, etc.). However, if the second point is not accepted by the harvester controller (e.g., because the distance between the haul vehicle/storage compartment and the harvester is less than a minimum threshold distance or greater than a maximum threshold distance, or the dimensions of the bounding rectangle are larger or smaller than an expected range, etc.), the user interface may indicate a fault (e.g., via displaying a text message to the operator, changing the color of the second indicator 220, etc.). The operator may then realign the conveyor outlet with the second point or restart the calibration process.

Once the operator has aligned the conveyor outlet with the first and second points, the harvester controller may adjust the first and second points based on input from the optical sensor and/or the measuring device. The harvester controller then establishes the bounding rectangle having a first corner at the first point and a second corner at the second point. Once the bounding rectangle is established, the harvester controller establishes multiple zones within the bounding rectangle, in which the zones do not overlap one another. As previously discussed, the harvester controller may arrange the zones based on a selected number of zones, a desired arrangement of the zones, the dimensions of the bounding rectangle, other suitable factor(s), or a combination thereof. For example, the harvester controller may establish three zones arranged along the longitudinal axis of the storage compartment, as shown in FIG. 4, or the harvester controller may establish two zones arranged along the lateral axis of the storage compartment, as shown in FIG. 5.

Once the zones are established, the harvester controller selects one of the zones for receiving agricultural product. In the illustrated embodiment, the harvester controller instructs the user interface to present graphical representation of the established zones on the display 94. Accordingly, the display 94 includes a zone selection screen 226 having a zone 1 button 228 (e.g., graphical representation of the first zone), a zone 2 button 230 (e.g., graphical representation of the second zone), and a zone 3 button 232 (e.g., graphical representation of the third zone). If more or fewer zones are established, a corresponding number of zone buttons are presented within the zone selection screen. The arrangement of the zone buttons within the zone selection screen may correspond to the arrangement of zones within the storage compartment. In certain embodiments, the harvester controller may select a zone by default before receiving input from the user interface. For example, the controller may select a central zone (e.g., zone 3) by default. Accordingly, the harvester controller may instruct the user interface to cause the display 94 to illuminate the zone 3 button 232, thereby indicating that zone 3 is the selected zone. If loading agricultural product into zone 1 is desired, the operator may depress the zone 1 button. The user interface, in turn, may output a signal to the harvester controller indicative of selection of zone 1, and the harvester controller may instruct the user interface to cause the display 94 to illuminate the zone 1 button 228, as illustrated. Furthermore, if loading agricultural product into zone 2 or zone 3 is desired, the operator may depress the corresponding button. The user interface, in turn, may output a signal to the harvester controller indicative of the selected zone, and the harvester controller may instruct the user interface to cause the display 94 to illuminate the corresponding button.

In certain embodiments, the harvester controller is configured to store the selected zone as a stored zone. For example, the operator may depress the desired zone button for a threshold duration (e.g., long press) to instruct the controller to store the selected zone. During a subsequent zone selection process (e.g., during a subsequent docking with the storage compartment), the harvester controller is configured to set the selected zone to the stored zone by default. Accordingly, the selected zone may be stored zone until the harvester controller receives the signal indicative of another selected zone.

While the harvester controller is configured to instruct the user interface to illuminate the button in response to selection of the corresponding zone in the illustrated embodiment, the harvester controller may instruct the user interface to identify the graphical representation of the selected zone in another manner (e.g., by changing the color of the button, by changing the size of the button, by causing the button to blink, etc.) in response to receiving the signal indicative of the selected zone. Furthermore, while the zones are graphically represented as buttons in the illustrated embodiment, in other embodiments, the zones may be graphically represented by other suitable icons. In addition, while the zone is selected via interaction with the touch screen display in the illustrated embodiment, in other embodiments, the zone is selected by another suitable user interface control (e.g., a button, a switch, a keyboard, a mouse, etc.).

In the illustrated embodiment, the zone selection screen 226 also includes an "auto" button 234. Depressing the "auto" button 234 causes the display 94 to output a signal to the harvester controller indicative of instructions to automatically select a zone. For example, if automatic zone selection is enabled, the harvester controller may determine an orientation of the storage compartment about the longitudinal axis of the storage compartment. The harvester controller may then select a zone based on the orientation, such that the selected zone has the highest vertical position of the zones. By delivering agricultural product to the highest zone of the storage compartment, the agricultural product may flow from the highest zone to the lower zone(s), thereby enhancing the usable storage capacity of the storage compartment. In certain embodiments, while automatic zone selection is enabled, the harvester controller may be configured to select another zone in response to a change in orientation of the storage compartment. In addition, the harvester controller may be configured to select another zone upon detecting and/or determining that the product level within the previously selected zone exceeds a threshold level. In further embodiments, the harvester controller may be configured to select another zone based on a zone loading order (e.g., load zone 3 first, load zone 1 second, and load zone 2 third, etc.). In such embodiments, the controller may be configured to skip a zone in the zone loading order if a product level within the zone exceeds a threshold level. Furthermore, in certain embodiments, the harvester controller may be configured to select zones based on a plan. The plan may include a route of the agricultural harvester through a field. The plan may also include a zone loading order for the storage compartment, or the harvester controller may determine the zone loading order based on the route of the agricultural harvester through the field and/or other information associated with the plan.

While automatic zone selection is enable, the "auto" button 234 may be illuminated, and the button corresponding to the automatically selected zone may be illuminated. If manual zone selection is desired, the operator may depress the button corresponding to a desired zone. The button corresponding to the selected zone may illuminate and the "auto" button may darken. In certain embodiments and/or operating conditions, automatic zone selection may not be available. In such embodiments, the "auto" button may be disabled (e.g., "grayed out") or omitted from the zone selection screen.

In certain embodiments, the zone selection screen or another screen within the display may include controls (e.g., buttons, sliders, etc.) for establishing the zones. For example, the display may include a control (e.g., field, slider, knob, etc.) configured to enable the operator to input the number of zones. In addition, the display may include a control (e.g., graphical representation of the zones, pull-down menu, etc.) configured to enable the operator to input the arrangement of the zones. Furthermore, the display may include a control (e.g., field, slider, knob, etc.) configured to enable the operator to input the threshold distance between the bounding rectangle and the zones to establish the buffer region and/or to input the spacing between zones. In embodiments that include one or more zone establishment controls, the harvester controller may establish the zones based on the input from the operator.

In certain embodiments, once a zone is selected, the harvester controller establishes an unloading point within (e.g., at the center of) the selected zone. In such embodiments, the position of the unloading point may be adjusted based on operator input. In the illustrated embodiment, the display 94 includes an unloading point offset screen 236 having controls configured to adjust the position of the unloading point (e.g., away from the center of the selected zone). As illustrated, the unloading point offset screen 236 includes a lateral position adjustment section 238 having a left arrow button 240, a right arrow button 242, and a numerical display 244 (e.g., the harvester controller is configured to instruct the user interface to present the left arrow button 240, the right arrow button 242, and the numerical display 244). Depressing the left arrow button 240 induces the display 244 to indicate movement of the unloading point to the left (e.g., in inches or centimeters relative to the original unloading point). In addition, depressing the right arrow button 242 induces the display 244 to indicate movement of the unloading point to the right (e.g., in inches or centimeters relative to the original unloading point).

The unloading point offset screen 236 also includes a longitudinal position adjustment section 246 having a forward arrow button 248, a rearward arrow button 250, and a numerical display 252 (e.g., the harvester controller is configured to instruct the user interface to present the forward arrow button 248, the rearward arrow button 250, and the numerical display 252). Depressing the forward arrow button 248 induces the display 252 to indicate movement of the unloading point in the forward direction (e.g., in inches relative to the original unloading point). In addition, depressing the rearward arrow button 250 induces the display 252 to indicate movement of the unloading point in the rearward direction (e.g., in inches relative to the original unloading point). While the illustrated displays 244 and 252 are configured to present the offset distances in inches, in alternative embodiments the offset distances may be expressed in terms of a percentage of the lateral and/or longitudinal extent of the bounding rectangle and/or the selected zone.

In addition, the harvester controller is configured to instruct the user interface to present a graphical representation of the unloading point and a current position of the conveyor outlet relative to the storage compartment (e.g., on the unloading point offset screen 236 of the display 94). As illustrated, the unloading point offset screen 236 includes an offset display region 235 that includes a graphical representation of the storage compartment 237, a graphical representation of the bounding shape 239 (e.g., the bounding rectangle), a graphical representation of the first zone 241 (e.g., zone 1), a graphical representation of the second zone 243 (e.g., zone 2), and a graphical representation of the third zone 245 (e.g., zone 3). In certain embodiments, the graphical representation of each zone may be labeled with the zone number. Furthermore, the offset display region 235 includes a graphical representation of the current position of the conveyor outlet 247 and a graphical representation of the unloading point 249. As illustrated, the graphical representation of the target unloading point 249 is positioned to the right of the graphical representation of the position of the conveyor outlet 247, which corresponds to the 10.0 inch offset presented on the numerical display 244 of the lateral position adjustment section 238. The operator may utilize feedback from the offset display region 235 and/or the numerical displays to move the unloading point to a desired position using the arrow buttons.

While the unloading point offset screen includes arrow buttons to control the position of the unloading point in the illustrated embodiment, in other embodiments, the unloading point offset screen may include other and/or additional controls to control the position of the unloading point. For example, in certain embodiments, the display may be a touch screen display and the operator may move the unloading point by depressing a desired position on the offset display region. Alternatively, the operator may depress the graphical representation of the unloading point and "drag" the unloading point to the desired position. Furthermore, in the illustrated embodiment, movement of the unloading point is limited to the selected zone. However, in other embodiments, the unloading point offset screen may enable the operator to move the unloading point to another zone. In such embodiments, the display may output a signal to the harvester controller indicative of the selected zone. Furthermore, while the offset display region includes the entire storage compartment in the illustrated embodiment, in other embodiments, the offset display region may only include the selected zone.

Once the desired position of the unloading point is selected, the operator may depress the "set to current" button 254. Depressing the button 254 induces the user interface to output a signal to the harvester controller indicative to instructions to adjust the lateral and/or longitudinal position of the unloading point. By way of example, the operator may periodically adjust the position of the unloading point during the unloading process to establish a substantially even distribution of agricultural product within the selected zone. While the user interface is configured to output the signal indicative of instructions to adjust the position of the unloading point in response to depression of the button 254, in certain embodiments, the user interface is configured to output a signal to the harvester controller indicative of selection of one of the arrow button. In such embodiments, the harvester controller may move the unloading point (e.g., within the selected zone) based on the selected arrow button. Furthermore, in certain embodiments, the unload point may be adjusted by another suitable user interface control (e.g., a hand controller (e.g., joystick), button(s), switch(es), a keyboard, a mouse, etc.).

The operator may reset the unloading point to the original or default position by depressing the reset button 256. For example, the harvester controller may instruct the user interface to cause the display 94 to present the reset button 256 (e.g., a graphical representation of a reset button). In addition, the harvester controller may move the unloading point to the original or default position in response to receiving a signal from the user interface indicative of selection of the reset button. In certain embodiments, each adjustment of the unloading point may be relative to the original or default position of the unloading point. Alternatively, each adjustment to the unloading point may be relative to the previously selected unloading point position.

In certain embodiments, the lateral and/or longitudinal position of the established unloading point (e.g., the unloading point established by the alignment calibration process) may be adjusted. For example, an operator may adjust the position of the established unloading point (e.g., relative to the selected zone) via the unloading point offset controls or additional controls provided on the display 94. Once the position of the established unloading point is adjusted, the updated position is stored within the harvester control system for subsequent docking processes. For example, the operator may depress the graphical representation of the unloading point for a threshold duration (e.g., long press) to instruct the harvester control system to store the established unloading point. With a stored unloading point, at least a first adjustment of the unloading point via the unloading point offset controls is relative to the position of the stored unloading point. In further embodiments, the positions of the first and second corners of the established bounding rectangle may be adjusted (e.g., via controls provided on the display 94) to create a bounding rectangle having a desired size and/or position. In addition, in certain embodiments, the positions and/or dimensions of the established zones may be adjusted (e.g., via controls provided on the display 94) to establish zones having the desired positions and/or dimensions.

In the illustrated embodiment, the unloading point offset screen 236 includes an "auto" button 258. Depressing the "auto" button 258 induces the user interface to output a signal to the harvester controller indicative of instructions to automatically adjust the position of the unloading point. Upon activation of automatic unloading point control, the harvester controller may automatically adjust the position of the unloading point based on input from the optical sensor and/or the measuring device. For example, if the harvester controller receives a signal from the optical sensor and/or the measuring device indicative of a large quantity of agricultural product positioned beneath the conveyor outlet (e.g., approaching the top of the storage compartment), the controller may adjust the position of the unloading point (e.g., laterally and/or longitudinally) such that the conveyor outlet is positioned over a portion of the selected zone having a lower product level. As a result, a substantially even distribution of agricultural product may be established within the selected zone. In certain embodiments, the unloading point and the position of the conveyor outlet are presented on the offset display region 235.

In further embodiments, the unloading point offset screen may include buttons indicative of predetermined unloading point offsets. For example, the unloading point offset screen may include a "forward" button, a "center" button, and a "rearward" button (e.g., in embodiments in which the zones are arranged along the lateral axis, such as in FIG. 5). Depressing the "forward" button induces the user interface to send a signal to the harvester controller that instructs the controller to adjust the position of the unloading point to a predetermined forward position within the selected zone. In addition, depressing the "rearward" button induces the user interface to send a signal to the harvester controller that instructs the controller to adjust the position of the unloading point to a predetermined rearward position. Additional buttons indicative of other predetermined unloading point offsets (e.g., lateral offsets, etc.) may be included in further embodiments. Furthermore, in certain embodiments, the unloading point offset screen 236 may be omitted. In such embodiments, the position of the unloading point within the selected zone may be automatically selected, or the unloading point may be positioned at a default location within the selected zone.

While the illustrated unloading point offset screen 236 includes a lateral position adjustment section 238 and a longitudinal position adjustment section 246, in certain embodiments, one of the sections may be omitted or disabled (e.g., "grayed out"). For example, the lateral position adjustment section 238 of the unloading point offset screen 236 presented on the display 94 of the agricultural harvester user interface may be omitted or disabled. Accordingly, the operator of the agricultural harvester may only be able to control the longitudinal position of the unloading point (e.g., the agricultural harvester may temporarily increase or decrease speed in response to the signal indicative of the longitudinal unloading point offset from the agricultural harvester user interface, such that the unloading point moves to the adjusted unloading point). In addition, the lateral position adjustment section 238 may be presented on the display of the haul vehicle user interface, and in certain embodiments, the longitudinal position adjustment section 246 may be omitted or disabled (e.g., "grayed out") on the display of the haul vehicle user interface. Accordingly, the operator of the haul vehicle may be able to control the lateral position of the unloading point (e.g., the haul vehicle may steer left or right in response to the single indicative of the lateral unloading point offset from the haul vehicle user interface, such that the unloading point moves to the adjusted unloading point).

In the illustrated embodiment, the display 94 includes an "engage product flow" screen 251 having a mode selector 253 and a target unloading area selector 255. The selectors of the "engage product flow" screen 251 are configured to enable an operator to control the product flow from the conveyor outlet to the storage compartment. The mode selector 253 includes an "on" button 257, an "off" button 259, and an "auto" button 260. Depressing the "on" button 257 outputs a signal to the harvester controller indicative of instructions to engage product flow from the conveyor outlet to the storage compartment. In addition, depressing the "off" button 259 outputs a signal to the harvester controller indicative of instructions to terminate product flow from the conveyor outlet to the storage compartment. Furthermore, depressing the "auto" button 260 outputs a signal to the harvester controller indicative of instructions to automatically control product flow from the conveyor outlet to the storage compartment.

If automatic control of product flow is engaged (e.g., by depressing the "auto" button 260), buttons of the target unloading area selector 255 may be enabled. In addition, while the "on" button 257 or the "off" button 259 is selected, the buttons of the target unloading area selector 255 may be disabled (e.g., "grayed out"). In the illustrated embodiment, the target unloading area selector 255 includes a "bounding shape" button 261, a "selected zone" button 262, and an "unloading point" button 263. Depressing the "bounding shape" button 261 causes the user interface to output a signal to the harvester controller indicative of instructions to engage product flow from the conveyor outlet to the storage compartment while the position of the conveyor outlet is within the bounding shape (e.g., bounding rectangle) and to terminate product flow from the conveyor outlet to the storage compartment while the position of the conveyor outlet is outside of the bounding shape (e.g., bounding rectangle). In addition, depressing the "selected zone" button 262 causes the user interface to output a signal to the harvester controller indicative of instructions to engage product flow from the conveyor outlet to the storage compartment while the position of the conveyor outlet is within the selected zone and to terminate product flow from the conveyor outlet to the storage compartment while the position of the conveyor outlet is outside of the selected zone. Furthermore, depressing the "unloading point" button 263 outputs a signal to the harvester controller indicative of instructions to engage product flow from the conveyor outlet to the storage compartment while the position of the conveyor outlet is within a threshold range of the unloading point (e.g., within the target circle having a center at the unloading point and a radius corresponding to the threshold range from the unloading point) and to terminate product flow from the conveyor outlet to the storage compartment while the position of the conveyor outlet is outside of the threshold range from the unloading point (e.g., outside of the target circle).

In certain embodiments, the "on" button 257 and the "off" button 259 may be used to override automatic control of the product flow. For example, while the "selected zone" button 262 is selected and the position of the conveyor outlet is outside of the selected zone, the harvester controller may automatically terminate product flow from the conveyor outlet. However, depressing the "on" button may cause the user interface to output a signal indicative of product flow engagement to the harvester controller. Upon receiving the signal, the harvester controller may instruct the product delivery system to engage product flow from the conveyor outlet to the storage compartment even through the position of the conveyor outlet is outside of the selected zone. By way of further example, while the "unloading point" button 262 is selected and the position of the conveyor outlet is within the threshold distance of the unloading point (e.g., within the target circle), the harvester controller may automatically engage product flow from the conveyor outlet. However, depressing the "off" button may cause the user interface to output a signal indicative of product flow termination to the harvester controller. Upon receiving the signal, the harvester controller may instruct the product delivery system to terminate product flow from the conveyor outlet even though the position of the conveyor outlet is within the threshold distance of the unloading point (e.g., within the target circle). Furthermore, in certain situations and/or embodiments, automatic product flow control may be disabled or unavailable (e.g., the "auto" button may be disable). In such situations/embodiments, the display may present an indication regarding whether the conveyor outlet is within the target unloading area (e.g., the bounding shape, the selected zone, or the target circle), and the operator may manually control the product flow (e.g., using the "on" and "off" buttons) based on the indication. While the mode selector 253 and the target unloading area selector 255 each include respective buttons in the illustrated embodiment, in other embodiments, at least one selector may include other suitable control(s) for inputting the mode/target unloading area (e.g., a slider, a knob, etc.). Furthermore, in certain embodiments, the mode selector and/or the target unloading area selector may be physical control(s) (e.g., knob(s), one or more switches, etc.) within the user interface.

In the illustrated embodiment, the threshold range (e.g., the radius of the target circle) may be adjusted by a "threshold range of unloading point" section 264 of the display 94. As illustrated, the section 264 includes a first arrow button 266 configured to increase the threshold range, a second arrow button 268 configured to decrease the threshold range, and a numeric display 270 configured to display the threshold range. In certain embodiments, the display may also present a target circle graphical representation on the offset display region 235, in which the target circle graphical representation has a center at the unloading point graphical representation 249 and a radius representative of the threshold range from the unloading point (e.g., the radius may equal the threshold range multiplied by a scale factor for the size of the offset display region 235). Once the threshold range is input and the button 262 is depressed, product flows to the storage compartment while the conveyor outlet is within the threshold range of the unloading point. Furthermore, in certain embodiments, the harvester controller may terminate product flow while the conveyor outlet is positioned outside of the threshold range from the unloading point. In certain embodiments, the "threshold range of unloading point" section 264 may be disabled (e.g., "grayed out") while the "unloading point" button 263 is not selected. While the "threshold range of unloading point" section includes buttons and a numeric display in the illustrated embodiment, in other embodiments, the "threshold range of unloading point" section may include any other suitable control(s) for inputting the threshold range and/or displaying the threshold range (e.g., a slider, a knob, etc.). Furthermore, while each of the controls disclosed above is provided on the display 94, in other embodiments, at least one control may be a physical control (e.g., button, switch, knob, etc.) within the user interface.

As previously discussed, the harvester control system may include an optical sensor and/or a measuring device directed toward the storage compartment. In certain embodiments, the display is configured to present an image of an interior of the storage compartment and/or a graphical representation of the agricultural product level within the storage compartment. For example, the display may present an image of the storage compartment with a graphical overlay that outlines each zone. By way of further example, the display may present a graph that shows the level of agricultural product within each zone. Accordingly, the operator may manually select the zone based on the level of agricultural product within each zone. Furthermore, in certain embodiments, while the auto button of the zone selection screen is selected (e.g., depressed), the harvester controller may determine the level of agricultural product within each zone and automatically select the zone based on the agricultural product level (e.g., to maintain a substantially even level across the storage compartment, to limit the level of agricultural product within each zone, etc.).

In certain embodiments, automatically engaging and terminating product flow based on the position of the conveyor outlet relative to the unloading point may be disabled or unavailable. In such embodiments, the unloading point offset screen, the "unloading point" button, and the "threshold range of unloading point" section may be disabled (e.g., "grayed out") or not provided on the display 94. Accordingly, engaging and terminating product flow may be based on the position of the conveyor outlet relative to the bounding shape or the selected zone. Furthermore, in certain embodiments, automatically engaging and terminating product flow based on the position of the conveyor outlet relative to the unloading point and the selected zone may be disable or unavailable. In such embodiments, the zone selection screen, the "selected zone" button, the unloading point offset screen, the "unloading point" button, and the "threshold range of unloading point" section may be disabled (e.g., "grayed out") or not provided on the display 94. In addition, the "bounding shape" button may also be disabled or not provided due to the absence of the selected zone and unloading point options. Accordingly, engaging and terminating product flow may be based on the position of the conveyor outlet relative to the bounding shape.

Figure 7B:
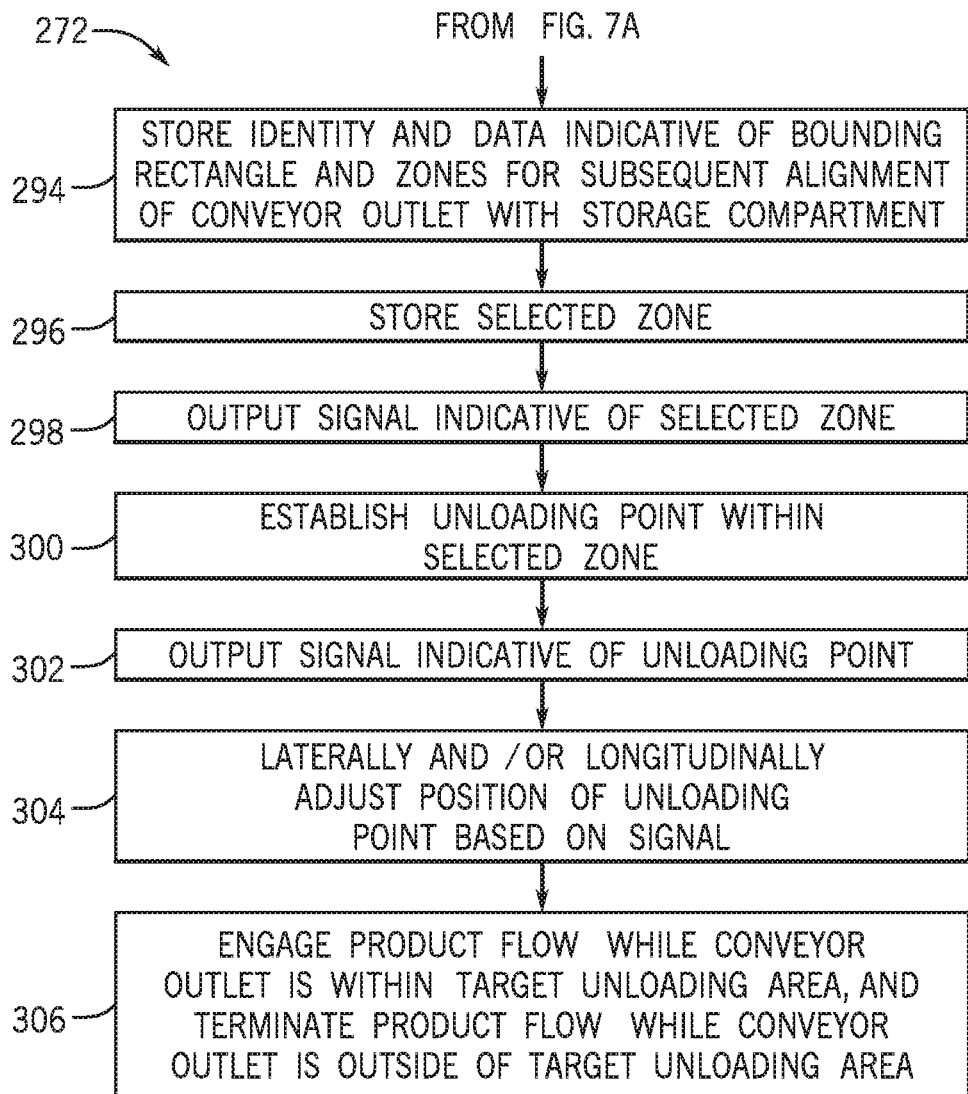

FIGS. 7A and 7B are flow diagrams of an embodiment of a method 272 for calibrating alignment of a conveyor outlet of an agricultural harvester with a storage compartment of an agricultural product transportation system. In certain embodiments, before the alignment calibration process is initiated, the identity of the storage compartment may be compared to a database of stored storage compartment information. If the identity of the storage compartment matches the identity of a storage compartment within the database, data indicative of the bounding rectangle (e.g., the positions of the first and second corners of the bounding rectangle) and the zones (e.g., the position and dimensions of each zone) may be retrieved from the database. Accordingly, the docking of the storage compartment with the agricultural harvester may be initiated without performing the alignment calibration process described below (e.g., the process associated with blocks 274-286). In certain embodiments, the selected zone associated with the identified storage compartment may also be retrieved from the database. The harvester controller may select a zone corresponding to the last selected zone of the storage compartment, or the harvester controller may select a different zone from the last selected zone.

If the identity of the storage compartment does not match the identity of a storage compartment within the database or recalibration of the storage compartment is desired, the alignment calibration process described herein may be performed. First, a first signal indicative of alignment of the conveyor outlet with a first point on the storage compartment is received from a user interface, as represented by block 274. For example, when the conveyor outlet is aligned with the first point on the storage compartment, an operator may depress a graphical representation of a "first point aligned" button on a display of the user interface. The user interface, in turn, may output the first signal. Upon receiving the first signal, a first position of the storage compartment relative to the agricultural harvester (e.g., work vehicle) is determined, as represented by block 276.

Next, as represented by block 278, a second signal indicative of alignment of the conveyor outlet with a second point on the storage compartment, diagonally opposite the first point, is received from the user interface. For example, when the conveyor outlet is aligned with the second point on the storage compartment, an operator may depress a graphical representation of a "second point aligned" button on a display of the user interface. The user interface, in turn, may output the second signal. Upon receiving the second signal, a second position of the storage compartment relative to the agricultural harvester is determined, as represented by block 280. In certain embodiments, as represented by block 282, the first and second points and the first and second positions of the storage compartment relative to the agricultural harvester are adjusted based on input from the measuring device and/or the optical sensor. This step may enhance the accuracy of the alignment calibration process by positioning the points closer to the corners of the storage compartment.

Once the first and second positions of the storage compartment relative to the agricultural harvester are determined, a bounding rectangle is established, as represented by block 284. The bounding rectangle has a first corner at the first point and a second corner at the second point. Once the bounding rectangle is established, multiple zones are established within the bounding rectangle, as represented by block 286. As previously discussed, the zones are established such that the zones do not overlap one another. In certain embodiments, the zones are positioned a threshold distance from a periphery of the bounding rectangle to establish a buffer region. Furthermore, in certain embodiments, the zones may be arranged along a longitudinal axis and/or a lateral axis of the storage compartment.

Next, as represented by block 288, one of the zones is selected. As previously discussed, the selected zone may be determined based on a signal from a user interface indicative of selection of the zone. In addition, the selected zone may be determined based on an orientation of the storage compartment. For example, the orientation of the storage compartment about a longitudinal axis of the storage compartment and/or about a lateral axis of the storage compartment may be determined. A zone may then be selected based on the orientation, such that the selected zone has the highest vertical position relative to a ground plane. By delivering agricultural product to the highest zone of the storage compartment, the agricultural product may flow from the highest zone to the lower zone(s), thereby enhancing the usable storage capacity of the storage compartment. Upon selection of the zone, the alignment calibration process is complete.

In certain embodiments, a signal (e.g., fourth signal) indicative of an identity of the storage compartment is received (e.g., from the haul vehicle control system), as represented by block 290. In such embodiments, the identity is associated with the bounding rectangle and the zones, as represented by block 292. The identity of the storage compartment and data indicative of the bounding rectangle (e.g., the positions of the first and second corners of the bounding rectangle) and the zones (e.g., the position and dimensions of each zone) are stored for subsequent alignment of the conveyor outlet with the storage compartment, as represented by block 294. Accordingly, once the calibration process is complete, subsequent docking of the storage compartment with the agricultural harvester may be initiated without performing additional calibration procedures. In certain embodiments, the selected zone is also stored (e.g., and associated with the identity of the storage compartment) for subsequent determination of the selected zone during subsequent alignment of the conveyor outlet with the storage compartment or another storage compartment, as represented by block 296. For example, in certain embodiments, during subsequent alignment of the conveyor outlet with the storage compartment or another storage compartment (e.g., to transfer agricultural product into the empty storage compartment), the harvester controller may select a zone corresponding to the last selected zone of the previously filled storage compartment. In further embodiments, the harvester controller may select a different zone from the last selected zone of the previously filled storage compartment.

A signal (e.g., zone signal) indicative of the selected zone is output, as represented by block 298. In certain embodiments, the selected zone is rectangular, and the zone signal is indicative of the position and dimensions of the selected zone. In such embodiments, the position and dimensions of the selected zone may be represented by a third position of a first corner of the selected zone relative to the storage compartment, and a fourth position of a second corner of the selected zone relative to the storage compartment. As previously discussed, the zone signal may be transmitted to the haul vehicle, thereby enabling the haul vehicle controller to determine a target position that aligns the selected zone with the conveyor outlet.

In certain embodiments, an unloading point is established within (e.g., at the center of) the selected zone, as represented by block 300. For example, the unloading point may be positioned at the lateral midpoint and/or at the longitudinal midpoint of the selected zone. As represented by block 302, a signal (e.g., third signal) indicative of the position of the unloading point is output. The third signal may be transmitted to the haul vehicle control system, thereby enabling the haul vehicle controller to determine a target position that aligns the unloading point with the conveyor outlet.

In certain embodiments, the position of the unloading point may be laterally and/or longitudinally adjusted based on a signal (e.g., from the user interface, from the optical sensor, from the measuring device, or a combination thereof), as represented by block 304. As previously discussed, the user interface may include a display having an "unloading point offset" screen. This screen enables an operator to adjust the position of the unloading point via graphical representations of indicator arrows. In addition, the harvester controller may automatically adjust the position of the unloading point based on input from the optical sensor and/or the measuring device. Once the position of the unloading point is adjusted, the new unloading point position may be transmitted to the haul vehicle control system, thereby facilitating alignment of the conveyor outlet with the new unloading point. By adjusting the unloading point during the unloading operation, agricultural product may be substantially evenly distributed throughout the selected zone. In addition, the user interface may enable the operator to reset the unloading point to the initiation position, e.g., centered within the selected zone. As discussed in detail below, product flow from the conveyor outlet to the storage compartment may be automatically engaged while the conveyor outlet is within the a target unloading area, and product flow from the conveyor outlet to the storage compartment may be automatically disengaged while the conveyor outlet is outside of the target unloading area, as represented by block 306.

As previously discussed, the harvester controller is configured to receive a first signal indicative of alignment of the conveyor outlet with a first point on the storage compartment and to receive a second signal indicative of alignment of the conveyor outlet with a second point on the storage compartment. However, in alternative embodiments, the positions of the first and second points may be manually entered. For example, an operator or a technician may manually enter a first offset distance between the spatial locating device of the haul vehicle and the first point on the storage compartment, and a second offset distance between the spatial locating device of the haul vehicle and the second point on the storage compartment. The harvester controller may utilize the first offset distance, the second offset distance, and a third offset distance between the conveyor outlet and the spatial locating device of the harvester to establish the bounding rectangle and the zones.

Furthermore, in certain embodiments, dimensions of the haul vehicle, dimensions of the storage compartment, and dimensions of the harvester may be manually entered, and the bounding rectangle and the zones may be automatically established based on the dimensions. The dimensions may include a width of the header of the harvester, a distance between the header and the spatial locating device of the harvester, a distance between the conveyor outlet and the spatial locating device of the harvester, a width of the haul vehicle, a length of the storage compartment, a width of the storage compartment, a distance between the storage compartment (e.g., the center of the storage compartment) and the spatial locating device of the haul vehicle, and a length of the hitch between the haul vehicle and the storage compartment, among other dimensions. The dimensions may be stored within the haul vehicle controller and/or the harvester controller. A default distance between the bounding shape and the periphery of the storage compartment opening may also be stored in the haul vehicle controller and/or the harvester controller. Accordingly, the bounding shape (e.g., bounding rectangle) and the zones may be determined (e.g., at least initially) without operator input.

While the alignment calibration process described above utilizes two points to establish the bounding shape (e.g., bounding rectangle), in other embodiments, the alignment calibration process may utilize more or fewer points to establish the bounding shape. For example, in certain embodiments, the bounding shape may be triangular. In such embodiments, first, second, and third points on the storage compartment may be manually entered, or the harvester controller may receive signals indicative of alignment of the conveyor outlet with the first, second, and third points on the storage compartment. The harvester controller may then establish a triangular bounding shape based on the first, second, and third points. Furthermore, in certain embodiments, the bounding shape may be rectangular, and the alignment calibration process may utilize three points to establish the bounding rectangle. For example, the first point may correspond to a first corner of the bounding rectangle, the second point may correspond to a second corner of the bounding rectangle, and the third point may correspond to a center of the bounding rectangle. In addition, in certain embodiments, the alignment calibration process may utilize one point to establish the bounding shape (e.g., bounding rectangle, bounding circle, etc.). For example, the harvester controller may determine the bounding shape based on a signal indicative of alignment of the conveyor outlet with a center point of the storage compartment or manual entry of the location of the center point, and dimensions of the storage compartment (e.g., manually entered or stored within the controller).

While the alignment calibration process is described above with regard to calibrating alignment of a conveyor outlet with a single storage compartment of an agricultural product transportation system, in alternative embodiments, the alignment calibration process may include calibrating alignment of the conveyor outlet with multiple storage compartments of the agricultural product transportation system. For example, in certain embodiments, multiple storage compartments (e.g., 2, 3, 4, 5, 6, or more) may be arranged in tandem behind a haul vehicle. In such embodiments, the alignment calibration process described above may be performed for each storage compartment in sequence. Accordingly, the conveyor may efficiently transfer agricultural product to each storage compartment (e.g., in a sequential pattern) during operation of the harvester. Furthermore, the order of loading the storage compartments may be selected or determined to facilitate the efficient transfer of agricultural product to the storage compartments. For example, a forward storage compartment and a rearward storage compartment may be loaded before a middle storage compartment. In addition, the process of manually entering the positions of the first and second points may be utilized within the alignment calibration process for one or more of the multiple storage compartments.

While the first determined position and the first determined velocity of the harvester, and the second determined position and the second determined velocity of the haul vehicle are determined with respect to a fixed coordinate system in the embodiments described herein, in alternative embodiments the first determined position, the first determined velocity, the second determined position, the second determined velocity, or a combination thereof may be determined with respect to a moving coordinate system. For example, in certain embodiments, the first determined position and the first determined velocity of the harvester may be determined relative to the haul vehicle, thereby establishing a moving coordinate system having an origin at the haul vehicle. In further embodiments, the second determined position and the second determined velocity of the haul vehicle may be determined relative to the harvester, thereby establishing a moving coordinate system having an origin at the harvester.

Figure 8:
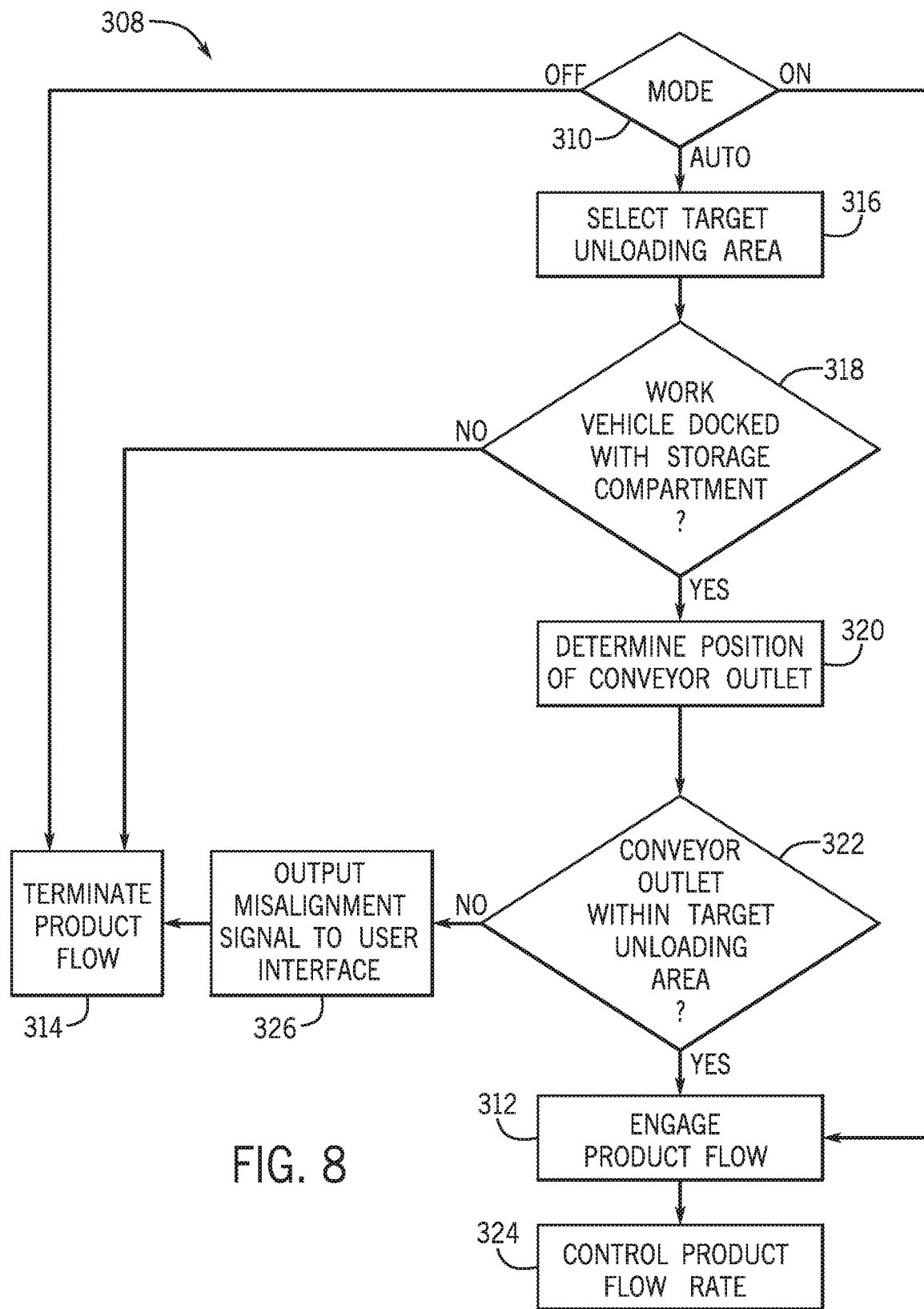
FIG. 8 is a flow diagram of an embodiment of a method for controlling product flow from a conveyor outlet of an agricultural harvester to a storage compartment of an agricultural product transportation system.

FIG. 8 is a flow diagram of an embodiment of a method 308 for controlling product flow from a conveyor outlet of an agricultural harvester to a storage compartment of an agricultural product transportation system. First, as represented by block 310, a mode of operation is selected. For example, the mode of operation may be selected from a user interface having a mode selector with buttons representing each mode. In the illustrated embodiment, the modes include an "on" mode, an "off" mode, and an "auto" mode. If the "on" mode is selected, product flow from the conveyor outlet to the storage compartment is engaged, as represented by block 312. In addition, if the "off" mode is selected, product flow from the conveyor outlet to the storage compartment is terminated, as represented by block 314. Furthermore, in the illustrated embodiment, if the "auto" mode is selected, a target unloading area may be selected, as represented by block 316.

As previously discussed, the target unloading area may be selected from a set of candidate target unload areas. In certain embodiments, the set of candidate target unloading areas may include a target circle having a center at an unloading point and a radius corresponding to a threshold range from the unloading point, a bounding shape (e.g., a bounding rectangle) within the storage compartment, and a selected zone of a set of non-overlapping zones within the bounding shape. The target unloading area may be selected from a user interface having a target unloading area selector with buttons representing the target circle, the selected zone, and the bounding shape. An operator may depress a desired button to select the corresponding target unloading area. In addition, the target unloading area may be selected to correspond to a default target unloading area. For example, the default target unloading area may be stored in a controller (e.g., the harvester controller) and correspond to a suitable target unloading area for the storage compartment. Additionally or alternatively, the default target unloading area may correspond to a previously selected target unloading area of the storage compartment or a previously filled storage compartment.

After selection of the target unloading area, a determination regarding whether the agricultural harvester (e.g., work vehicle) is docked with the storage compartment is made, as represented by block 318. As previously discussed, the agricultural harvester is docked with the haul vehicle/storage compartment while the haul vehicle is substantially in the target position. While the agricultural harvester is docked with the haul vehicle/storage compartment, the haul vehicle controller controls the steering control system and the speed control system of the haul vehicle to substantially maintain the target position and the target velocity, thereby facilitating transfer of agricultural product from the agricultural harvester to the storage compartment. If the agricultural harvester is not docked with the storage compartment, product flow from the conveyor outlet to the storage compartment is terminated, as represented by block 314.

If the agricultural harvester is docked with the storage compartment, a position of the conveyor outlet relative to the storage compartment is determined, as represented by block 320. A determination is then made regarding whether the position of the conveyor outlet is within the target unloading area, as represented by block 322. For example, a determine may be made regarding whether the position of the conveyor outlet is within the target circle, within the selected zone, or within the bounding shape (e.g., based on the selection from block 318). If the position of the conveyor outlet is within the target unloading area, product flow from the conveyor outlet to the storage compartment is engaged, as represented by block 312. For example, if the selected zone is selected as the target unloading area, product flow from the conveyor outlet to the storage compartment may be engaged while the conveyor outlet is within the selected zone. In such embodiments, the agricultural product may continue to flow even as movement of the harvester relative to the storage compartment (e.g., due to variations in the terrain) varies the position of the conveyor outlet within the selected zone. Furthermore, if the target circle is selected as the target unloading area, product flow from the conveyor outlet to the storage compartment may be engaged while the conveyor outlet is within a threshold range of the unloading point. As previously discussed, the threshold range is adjustable via the user interface (e.g., based on expected movement of the agricultural harvester relative to the storage compartment). In addition, if the bounding shape is selected as the target unloading area, product flow from the conveyor outlet to the storage compartment may be engaged while the conveyor outlet is within the bounding shape (e.g., the bounding rectangle).

In certain embodiments, the product flow from the conveyor outlet to the storage compartment may only be engaged while the conveyor outlet is within the target unloading area (e.g., the bounding shape, the selected zone, or the target circle) for a threshold duration. For example, the threshold duration may be about 1 second, about 3 seconds, about 5 seconds, or about 10 seconds. By way of further example, the threshold duration may be between about 1 second and about 10 seconds, between about 2 seconds and about 8 seconds, between about 3 seconds and about 7 seconds, or between about 4 seconds and about 6 seconds. Waiting the threshold duration before engaging product flow may substantially reduce or eliminate the possibility of product being delivered outside of the target unloading area (e.g., onto the soil surface) during periods when the convey outlet is rapidly moving in and out of the target unloading area as the agricultural harvester and the agricultural product transportation system move relative to one another during the unloading process (e.g., while the agricultural harvester and the agricultural product transportation system are traversing rough terrain).

Furthermore, in certain embodiments, the rate of product flow from the conveyor outlet to the storage compartment may be controlled based at least in part on the position of the conveyor outlet relative to the storage compartment, as represented by block 324. For example, a target product flow rate may be associated with each zone in the bounding shape (e.g., bounding rectangle). By way of example, the target product flow rate of a central zone may be greater than the target product flow rate of outer zones (e.g., to enable product to flow from the central zone to the outer zones during the unloading process). While the conveyor outlet is within the central zone, the product delivery system may be instructed to increase the product flow rate, and while the conveyor outlet is within each outer zone, the product delivery system may be instructed to decrease the product flow rate. In further embodiments, a target product flow rate may be established for any suitable region/area within the storage compartment, and the flow rate from the product delivery system may be adjusted to match the target product flow rate of the area in which the conveyor outlet is positioned.

In certain embodiments, if the position of the conveyor outlet is outside of the target unloading area (e.g., the bounding shape, the selected zone, or the target circle), an operator is informed of the misalignment between the conveyor outlet and the target unloading area. For example, as represented by block 326, a signal may be output to a user interface indicative of conveyor outlet misalignment in response to the position of the conveyor outlet moving outside of the target unloading area. The user interface, in turn, may provide the operator with a visual and/or auditory indication of the misalignment between the conveyor outlet and the target unloading area. In addition, if the position of the conveyor outlet is outside of the target unloading area, the product flow from the conveyor outlet to the storage compartment is terminated, as represented by block 314. Automatically controlling engagement and termination of the product flow may enable an operator of the work vehicle to focus on other tasks associated with agricultural operations. In addition, the quantity of product delivered to an undesirable area (e.g., the agricultural field, a different zone, etc.) may be substantially reduced.

The method 308 for controlling product flow from the conveyor outlet to the storage compartment may be performed within step 306 of the method 272 of FIG. 7. Furthermore, the steps of the method 308 may be performed in the order disclosed herein or in any suitable order. In addition, the method 308 may be performed by the controller of the agricultural harvester, any other suitable controller of the control system, or any combination of controllers of the control system.

Figure 9:
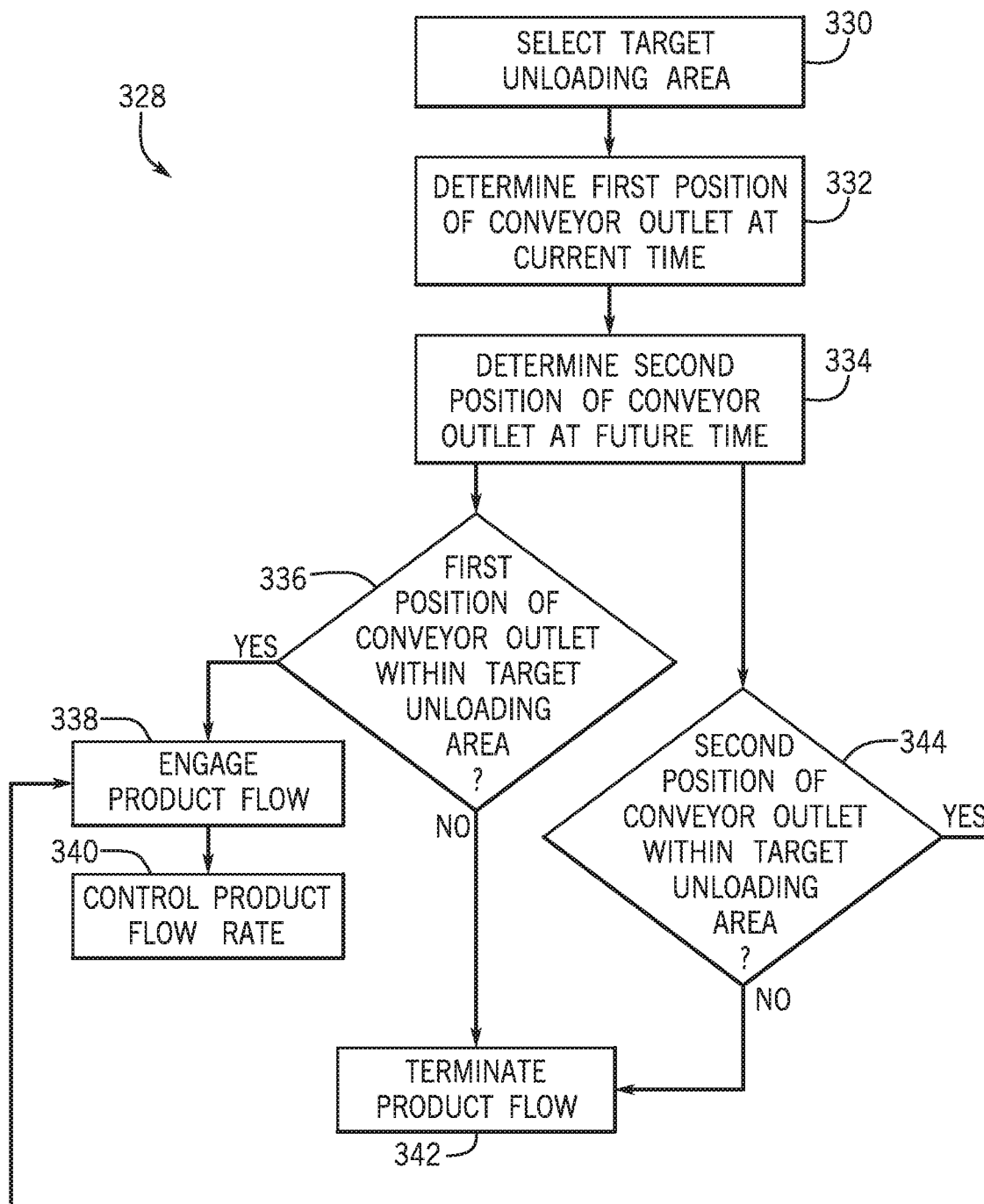
FIG. 9 is a flow diagram of another embodiment of a method for controlling product flow from a conveyor outlet of an agricultural harvester to a storage compartment of an agricultural product transportation system.

FIG. 9 is a flow diagram of another embodiment of a method 328 for controlling product flow from a conveyor outlet of an agricultural harvester to a storage compartment of an agricultural product transportation system. First, as represented by block 330, the target unloading area may be selected from a set of candidate target unload areas. As previously discussed, the set of candidate target unloading areas may include a target circle having a center at an unloading point and a radius corresponding to a threshold range from the unloading point, a bounding shape (e.g., a bounding rectangle) within the storage compartment, and a selected zone of a set of non-overlapping zones within the bounding shape. The target unloading area may be selected from a user interface having a target unloading area selector with buttons representing the target circle, the selected zone, and the bounding shape. An operator may depress a desired button to select the corresponding target unloading area.

Next, as represented by block 332, a first position of the conveyor outlet relative to the storage compartment at the current time is determined. A second position of the conveyor outlet relative to the storage compartment at a future time is then determined, as represented by block 334. In certain embodiments, the future time corresponds to the current time plus a duration sufficient to terminate product flow into the storage compartment after the product delivery system receives instructions to terminate product flow. For example, upon receiving instructions to terminate product flow, the product delivery system may deactivate conveyor(s) and/or auger(s) configured to transfer the product from the internal storage compartment to the conveyor outlet. The duration sufficient to terminate product flow may include a lag within the control system, the time associated with stopping the conveyor(s)/auger(s), the time associated with product flow from the conveyor outlet under the influence of gravity, other delays associated with terminating product flow, or a combination thereof.

A determination is then made regarding whether the first position of the conveyor outlet (e.g., the position of the conveyor outlet at the current time) is within the target unloading area, as represented by block 336. For example, a determination may be made regarding whether the first position of the conveyor outlet is within the target circle, within the selected zone, or within the bounding shape (e.g., based on the selection from block 330). If the first position of the conveyor outlet is within the target unloading area, product flow from the conveyor outlet to the storage compartment is engaged, as represented by block 338. For example, if the selected zone is selected as the target unloading area, product flow from the conveyor outlet to the storage compartment may be engaged while the first position of the conveyor outlet is within the selected zone. Accordingly, the agricultural product may continue to flow even as movement of the agricultural harvester relative to the storage compartment (e.g., due to variations in the terrain) varies the first position of the conveyor outlet within the selected zone. Furthermore, if the target circle is selected as the target unloading area, product flow from the conveyor outlet to the storage compartment may be engaged while the first position of the conveyor outlet is within a threshold range of the unloading point. As previously discussed, the threshold range is adjustable via the user interface (e.g., based on expected movement of the agricultural harvester relative to the storage compartment). In addition, if the bounding shape is selected as the target unloading area, product flow from the conveyor outlet to the storage compartment may be engaged while the first position of the conveyor outlet is within the bounding shape (e.g., the bounding rectangle).

In certain embodiments, the product flow from the conveyor outlet to the storage compartment may only be engaged while the conveyor outlet is within the target unloading area (e.g., the bounding shape, the selected zone, or the target circle) for a threshold duration. For example, the threshold duration may be about 1 second, about 3 seconds, about 5 seconds, or about 10 seconds. By way of further example, the threshold duration may be between about 1 second and about 10 seconds, between about 2 seconds and about 8 seconds, between about 3 seconds and about 7 seconds, or between about 4 seconds and about 6 seconds. Waiting the threshold duration before engaging product flow may substantially reduce or eliminate the possibility of product being delivered outside of the target unloading area (e.g., onto the soil surface) during periods when the convey outlet is rapidly moving in and out of the target unloading area as the agricultural harvester and the agricultural product transportation system move relative to one another during the unloading process (e.g., while the agricultural harvester and the agricultural product transportation system are traversing rough terrain).

Furthermore, in certain embodiments, the rate of product flow from the conveyor outlet to the storage compartment may be controlled based at least in part on the position of the conveyor outlet relative to the storage compartment, as represented by block 340. For example, a target product flow rate may be associated with each zone in the bounding shape (e.g., bounding rectangle). By way of example, the target product flow rate of a central zone may be greater than the target product flow rate of outer zones (e.g., to enable product to flow from the central zone to the outer zones during the unloading process). While the conveyor outlet is within the central zone, the product delivery system may be instructed to increase the product flow rate, and while the conveyor outlet is within each outer zone, the product delivery system may be instructed to decrease the product flow rate. In further embodiments, a target product flow rate may be established for any suitable region/area within the storage compartment, and the flow rate from the product delivery system may be adjusted to match the target product flow rate of the area in which the conveyor outlet is positioned.

If the first position of the conveyor outlet is outside of the target unloading area, the product flow from the conveyor outlet to the storage compartment is terminated, as represented by block 342. Automatically controlling engagement and termination of the product flow may enable an operator of the work vehicle to focus on other tasks associated with agricultural operations. In addition, the quantity of product delivered to an undesirable area (e.g., the agricultural field, a different zone, etc.) may be substantially reduced.

In the illustrated embodiment, a determination is made regarding whether the second position of the conveyor outlet (e.g., the position of the conveyor outlet at the future time) is within the target unloading area, as represented by block 344. If the second position of the conveyor outlet is outside of the target unloading area, the product flow from the conveyor outlet to the storage compartment is terminated, as represented by block 342. For example, the product flow may be terminated by outputting a signal to the product delivery system indicative of instructions to terminate the product flow. By outputting the signal at a time sufficient to terminate product flow into the storage compartment before the conveyor outlet moves outside of the target unloading area, the possibility of product being delivered to an undesirable area (e.g., the agricultural field, a different zone, etc.) may be substantially reduced or eliminated. The determination that the second position of the conveyor outlet is outside of the target unloading area overrides the determination that the first position of the conveyor outlet is within the target unloading area. Accordingly, if the first position of the conveyor outlet is within the target unloading area and the second position of the conveyor outlet is outside of the target unloading area, product flow from the conveyor outlet to the storage compartment is terminated or not engaged.

In certain embodiments, the future time used for determining the second position of the conveyor outlet (e.g., at block 334) may correspond to the current time plus a duration sufficient to initiate product flow into the storage compartment after the product delivery system receives instructions to initiate product flow. For example, upon receiving instructions to initiate product flow, the product delivery system may activate conveyor(s) and/or auger(s) configured to transfer the product from the internal storage compartment to the conveyor outlet. The duration sufficient to initiate product flow may include a lag within the control system, the time associated with starting the conveyor(s)/auger(s), the time associated with product flow from the conveyor outlet reaching the storage compartment (e.g., due to the influence of gravity), other delays associated with initiating product flow, or a combination thereof.

In certain embodiments (e.g., embodiments in which the future time corresponds to the current time plus a duration sufficient to initiate product flow into the storage compartment after the product delivery system receives instructions to initiate product flow), product flow from the conveyor outlet to the storage compartment is engaged, as represented by block 338, if the second position of the conveyor outlet is within the target unloading area. For example, if the selected zone is selected as the target unloading area, product flow from the conveyor outlet to the storage compartment may be engaged while the second position of the conveyor outlet is within the selected zone. Furthermore, if the target circle is selected as the target unloading area, product flow from the conveyor outlet to the storage compartment may be engaged while the second position of the conveyor outlet is within a threshold range of the unloading point. In addition, if the bounding shape is selected as the target unloading area, product flow from the conveyor outlet to the storage compartment may be engaged while the second position of the conveyor outlet is within the bounding shape (e.g., the bounding rectangle).

In certain embodiments, the product flow may be initiated by outputting a signal to the product delivery system indicative of instructions to initiate the product flow. By outputting the signal at a time sufficient to initiate product flow into the storage compartment before the conveyor outlet moves within the target unloading area, the lag associated within initiating product flow may be substantially reduced, thereby enhancing the efficiency of the product transfer process. The determination that the second position of the conveyor outlet is within the target unloading area overrides the determination that the first position of the conveyor outlet is outside of the target unloading area. Accordingly, if the second position of the conveyor outlet is within the target unloading area and the first position of the conveyor outlet is outside of the target unloading area, product flow from the conveyor outlet to the storage compartment is initiated or not terminated.

As discussed above, the future time may correspond to the current time plus a duration sufficient to initiate product flow into the storage compartment after the product delivery system receives instructions to initiate product flow, or to the current time plus a duration sufficient to terminate product flow into the storage compartment after the product delivery system receives instructions to terminate product flow. In certain embodiments, a first future time may be determined for initiating product flow, and a second future time may be determine for terminating product flow. However, in other embodiments, a single future time may be determined based on the current time and a duration that substantially corresponds to both the initiating delay and the termination delay. For example, the duration sufficient to initiate product flow and the duration sufficient to terminate product flow may both be about 1 second, about 2 seconds, about 3 seconds, about 4 seconds, or about 5 seconds. By way of further example, the durations may be between about 0.5 seconds and about 10 seconds, between about 1 second and about 8 seconds, between about 2 seconds and about 6 seconds, or between about 3 seconds and about 5 seconds.

The method 328 for controlling product flow from the conveyor outlet to the storage compartment may be performed within step 306 of the method 272 of FIG. 7. Furthermore, the steps of the method 328 may be performed in the order disclosed herein or in any suitable order. In addition, the method 328 may be performed by the controller of the agricultural harvester, any other suitable controller of the control system, or any combination of controllers of the control system.

Figure 10:
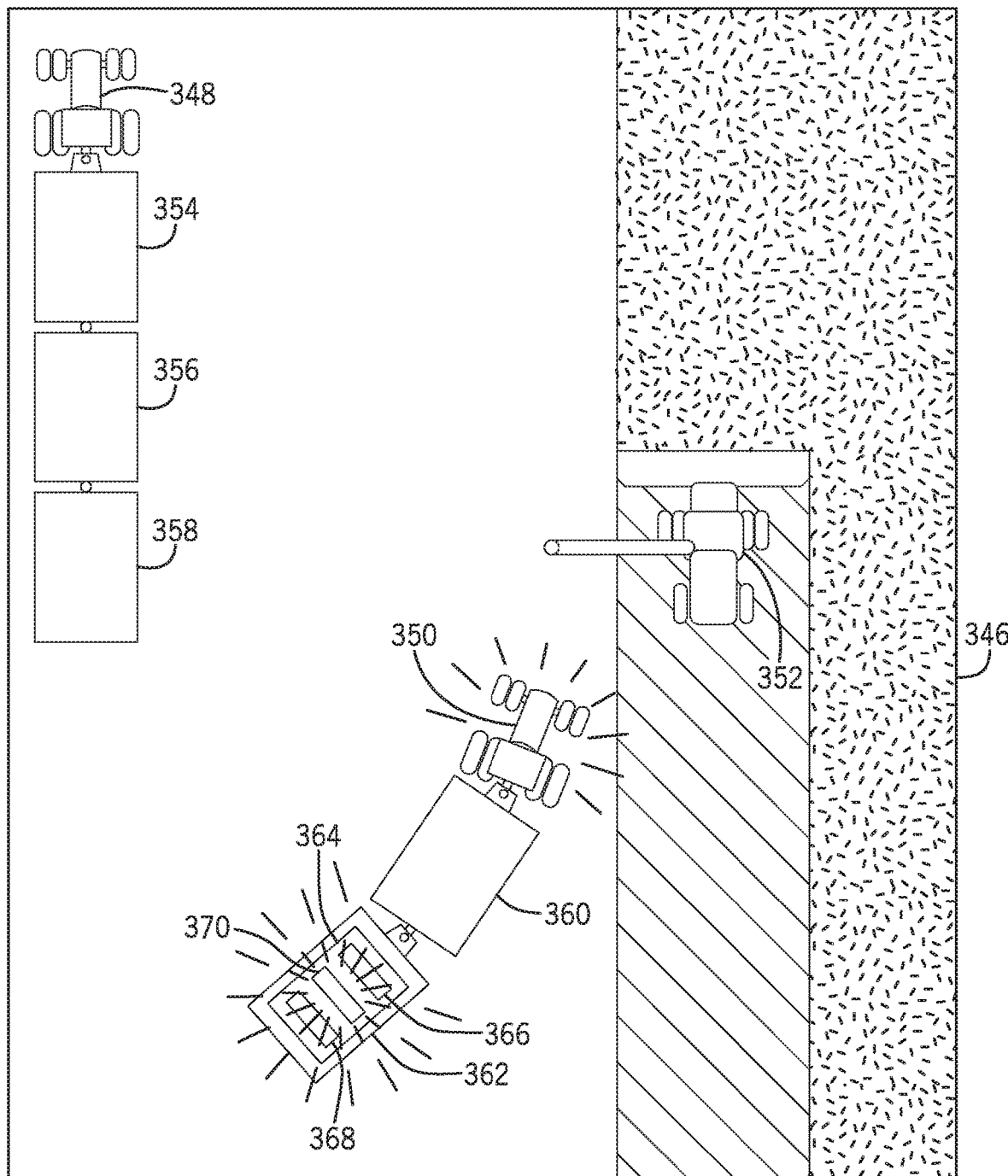
FIG. 10 is a schematic diagram of an embodiment of a display that may be employed within a user interface of the agricultural harvester of FIG. 3.

FIG. 10 is a schematic diagram of an embodiment of a display 346 that may be employed within the user interface of the agricultural harvester of FIG. 3. While the illustrated display 346 is described below with reference to the harvester, the same display or a similar display may be employed within the user interface of a haul vehicle. In the illustrated embodiment, the harvester controller is configured to instruct the user interface to present a graphical representation of each haul vehicle on the display 346. As illustrated, the display 346 includes a graphical representation of a first haul vehicle 348 and a graphical representation of a second haul vehicle 350. In certain embodiments, the graphical representations may be selected based on the type of haul vehicle (e.g., corresponding to the make and model of the haul vehicle). In addition, a generic graphical representation may be utilized if the harvester controller is unable to determine the type of haul vehicle. Furthermore, in other embodiments, a generic graphical representation may be utilized for each haul vehicle. In the illustrated embodiment, the display 346 also includes a graphical representation of the agricultural harvester 352, and the graphical representation of each haul vehicle is positioned in a location relative to the graphical representation of the agricultural harvester 352 corresponding to the location of each respective haul vehicle relative to the agricultural harvester in the field. Furthermore, the orientation of each haul vehicle graphical representation corresponds to the orientation of each respective haul vehicle in the field. However, in other embodiments, the position and/or the orientation of each haul vehicle may not be displayed (e.g., each haul vehicle graphical representation may be positioned at a fixed location, and/or each haul vehicle graphical representation may be oriented at a fixed angle). While two haul vehicle graphical representations are presented on the display 346 in the illustrated embodment, in other embodiments, more or fewer haul vehicle graphical representations may be presented (e.g., based on the number of haul vehicles within the field, based on the number of haul vehicles within the region of communication, based on the number of haul vehicles having suitable storage compartment capacity, etc.).

In the illustrated embodiment, the harvester controller is configured to instruct the user interface to present graphical(s) representations of one or more storage compartments coupled to each haul vehicle. As illustrated, the display 346 includes a graphical representation of a first storage compartment 354 coupled to the first haul vehicle graphical representation 348, a graphical representation of a second storage compartment 356 coupled to the first haul vehicle graphical representation 348, and a graphical representation of a third storage compartment 358 coupled to the first haul vehicle graphical representation 348. In addition, the display 346 includes a graphical representation of a first storage compartment 360 coupled to the second haul vehicle graphical representation 350 and a graphical representation of a second storage compartment 362 coupled to the second haul vehicle graphical representation 350. While three storage compartment graphical representations are coupled to the first haul vehicle graphical representation, and two storage compartment graphical representations are coupled to the second haul vehicle graphical representation in the illustrated embodiment, in other embodiments, more or fewer storage compartment graphical representations (e.g., 1, 2, 3, 4, 5, 6, or more) may be coupled to at least one of the haul vehicle graphical representations (e.g., based on the number of storage compartments coupled to the respective haul vehicle).

In the illustrated embodiment, the position and orientation of each storage compartment graphical representation corresponds to an expected position and orientation of each respective storage compartment in the field. The expected position and orientation may be based on the position of the haul vehicle, the orientation of the haul vehicle, the speed of the haul vehicle, the terrain within the field, other suitable parameters, or a combination thereof. However, in other embodiments, the position and orientation of each storage compartment graphical representation may not be displayed (e.g., each storage compartment graphical representation may be positioned at a fixed location relative to the respective haul vehicle graphical representation, and/or each storage compartment graphical representation may be oriented at a fixed angle relative to the respective haul vehicle graphical representation). Furthermore, in certain embodiments, the graphical representation(s) of the storage compartment(s) may not be presented on the display until a haul vehicle is selected. Upon selection of the haul vehicle, the storage compartment graphical representation(s) coupled to the selected haul vehicle may be presented.

In the illustrated embodiment, the harvester controller is configured to receive a signal from the user interface indicative of a selected haul vehicle from the haul vehicles presented on the display 346. In certain embodiments, the display 346 is a touch screen display configured to receive operator input via interaction with the display. In such embodiments, the operator may depress a graphical representation of a desired haul vehicle, and the display 346 may output the signal indicative of the selected haul vehicle to the harvester controller. In further embodiments, the operator may select the desired haul vehicle using another control of the user interface, such as a button, a switch, a mouse, or a keyboard, among other suitable controls. In certain embodiments, the harvester controller is configured to instruct the user interface to identify the graphical representation of the selected haul vehicle. For example, in the illustrated embodiment, the second haul vehicle is selected. Accordingly, the harvester controller instructs the user interface to identify the graphical representation of the second haul vehicle 350 by increasing the brightness of the second haul vehicle graphical representation. However, in other embodiments, the graphical representation of the selected haul vehicle may be identified in another suitable manner (e.g., by changing the color of the graphical representation, by changing the size of the graphical representation, by causing the graphical representation to blink, etc.). In further embodiments, the graphical representation of the selected haul vehicle may not be identified.

In the illustrated embodiment, the harvester controller is configured to receive a signal from the user interface indicative of a selected storage compartment of the storage compartments coupled to the selected haul vehicle. As illustrated, the second haul vehicle is selected. Accordingly, the harvester controller may enable the operator to select one of the first storage compartment and the second storage compartment coupled to the second haul vehicle. In certain embodiments, the display 346 is a touch screen display configured to receive operator input via interaction with the display. In such embodiments, the operator may depress a graphical representation of a desired storage compartment, and the display 346 may output the signal indicative of the selected storage compartment to the harvester controller. In further embodiments, the operator may select the desired storage compartment using another control of the user interface, such as a button, a switch, a mouse, or a keyboard, among other suitable controls. In certain embodiments, the harvester controller is configured to instruct the user interface to identify the graphical representation of the selected storage compartment. For example, in the illustrated embodiment, the second storage compartment coupled to the second haul vehicle is selected. Accordingly, the harvester controller instructs the user interface to identify the graphical representation of the second storage compartment 362 coupled to the second haul vehicle graphical representation 352 by increasing the brightness of the second storage compartment graphical representation 362. However, in other embodiments, the graphical representation of the selected storage compartment may be identified in another suitable manner (e.g., by changing the color of the graphical representation, by changing the size of the graphical representation, by causing the graphical representation to blink, etc.). In further embodiments, the graphical representation of the selected storage compartment may not be identified. Furthermore, in certain embodiments, if a single storage compartment is being towed by the haul vehicle, the single storage compartment may be automatically selected.

In certain embodiments, the harvester controller may store the selected storage compartment for subsequent harvesting/unloading operations. For example, during a subsequent harvester/unloading operation (e.g., with the same selected haul vehicle), the controller may select the last stored storage compartment by default. The operator may then select a different storage compartment if desired. Alternatively, or if no previously selected storage compartment is stored, the harvester controller may automatically select a default storage compartment (e.g., the first storage compartment, a middle storage compartment, etc.).

Upon selection of the desired storage compartment, the harvester controller may instruct the user interface to present graphical representations of the zones within the graphical representation of the selected storage compartment. As illustrated, the second storage compartment coupled to the second haul vehicle is selected. Accordingly, a graphical representation of the bounding shape 364 (e.g., bounding rectangle), a graphical representation of a first zone 366 (e.g., zone 1), a graphical representation of a second zone 368 (e.g., zone 2), and a graphical representation of a third zone 370 (e.g., zone 3) are displayed within the graphical representation of the second storage compartment 362 coupled to the graphical representation of the second haul vehicle 350. In the illustrated embodiment, the harvester controller is configured to receive a signal from the user interface indicative of a selected zone of the multiple zones displayed within the selected storage compartment. As such, the harvester controller may enable the operator to select one of the first zone, the second zone, and the third zone. In certain embodiments, the display 346 is a touch screen display configured to receive operator input via interaction with the display. In such embodiments, the operator may depress a graphical representation of a desired zone within the selected storage compartment graphical representation, and the display 346 may output the signal indicative of the selected zone to the harvester controller. In further embodiments, the operator may select the desired zone using another control of the user interface, such as a button, a switch, a mouse, or a keyboard, among other suitable controls. In certain embodiments, the harvester controller is configured to instruct the user interface to identify the graphical representation of the selected zone. For example, in the illustrated embodiment, the third zone of the second storage compartment coupled to the second haul vehicle is selected. Accordingly, the harvester controller instructs the user interface to identify the graphical representation of the third zone by increasing the brightness of the third zone graphical representation. However, in other embodiments, the graphical representation of the selected zone may be identified in another suitable manner (e.g., by changing the color of the graphical representation, by changing the size of the graphical representation, by causing the graphical representation to blink, etc.). In further embodiments, the graphical representation of the selected zone may not be identified. Furthermore, in certain embodiments, if the selected storage compartment is not divided into zones, no zone are presented to the operator for selection.

In certain embodiments, the harvester controller may store the selected zone for subsequent harvesting/unloading operations. For example, during a subsequent harvester/unloading operation (e.g., with the same selected haul vehicle and the same selected storage compartment), the controller may select the last stored zone by default. The operator may then select a different zone if desired. Alternatively, or if no previously selected zone is stored, the harvester controller may automatically select a default zone (e.g., the middle storage zone, etc.).

While the zone graphical representations are displayed only within the selected storage compartment graphical representation in the illustrated embodiment, in other embodiments, the zone graphical representations may be displayed within all or a portion of the storage compartment graphical representations for storage compartments that are divided into zones. Furthermore, while the haul vehicle, storage compartment, and zone are selected on a common display in the illustrated embodiment, in other embodiments, at least one of the items may be selected on another display (e.g., on another monitor, in another window, on another screen, etc.). For example, the haul vehicle and the storage compartment may be selected on the display 346, as discussed above, and the zone may be selected on the display disclosed above with reference to FIG. 6. After selection of the zone (e.g., either via the display 346 or the display disclosed above with reference to FIG. 6), the position of an unloading point may be adjusted via the display disclosed above with reference to FIG. 6 (e.g., using the arrow buttons). For example, as previously discussed, the user interface may present a graphical representation of the unloading point and a graphical representation of the current position of the conveyor outlet relative to the selected storage compartment.

Upon selection of the storage compartment, the zone, the unloading point, or a combination thereof, the harvester controller may determine a target position for the respective haul vehicle that substantially aligns the conveyor outlet with the selected storage compartment, the selected zone, the unloading point, or a combination thereof. The harvester controller may then output the target position to the controller of the respective haul vehicle. The haul vehicle controller, in turn, may direct the haul vehicle to the target position, thereby substantially aligning the conveyor outlet with the selected storage compartment, the selected zone, the unloading point, or a combination thereof.

In addition, the controls of the "engage product flow" screen of the display discussed above with reference to FIG. 6 may be used to enable an operator to control the product flow from the conveyor outlet to the storage compartment. For example, an operator may depress the "bounding shape" button to cause the user interface to output a signal to the harvester controller indicative of instructions to engage product flow from the conveyor outlet to the storage compartment while the position of the conveyor outlet is within the bounding shape (e.g., bounding rectangle) and to terminate product flow from the conveyor outlet to the storage compartment while the position of the conveyor outlet is outside of the bounding shape (e.g., bounding rectangle). In addition, an operator may depress the "selected zone" button to cause the user interface to output a signal to the harvester controller indicative of instructions to engage product flow from the conveyor outlet to the storage compartment while the position of the conveyor outlet is within the selected zone and to terminate product flow from the conveyor outlet to the storage compartment while the position of the conveyor outlet is outside of the selected zone. Furthermore, an operator may depress the "unloading point" button to cause the user interface to output a signal to the harvester controller indicative of instructions to engage product flow from the conveyor outlet to the storage compartment while the position of the conveyor outlet is within a threshold range of the unloading point and to terminate product flow from the conveyor outlet to the storage compartment while the position of the conveyor outlet is outside of the threshold range from the unloading point.

While the selection process disclosed above may be performed before the haul vehicle/storage compartment is docked with the agricultural harvester, in certain embodiments, the harvester controller may enable an operator to change the selected storage compartment and/or the selected zone after docking (e.g., during harvesting operations). For example, if one storage compartment is selected, the operator may select a different storage compartment (e.g., via the display 346), and the user interface, in turn, may output a signal to the harvester controller indicative of selection of the different storage compartment. In addition, if one zone is selected, the operator may select a different zone (e.g., via the display 346), and the user interface, in turn, may output a signal to the harvester controller indicative of selection of the different zone. In certain embodiments, the harvester controller may automatically select a different storage compartment in response to detecting and/or determining that the current storage compartment is substantially full (e.g., the quantity of agricultural product within the storage compartment exceeds a threshold level). In addition, the harvester controller may automatically select a different zone in response to detecting and/or determining that the current zone is substantially full (e.g., the quantity of agricultural product within the selected zone exceeds a threshold level). The process of detecting and/or determining that the storage compartment/selected zone is substantially full may include receiving feedback from one or more sensors (e.g., coupled to the storage compartment), receiving feedback from a product flow sensor, receiving feedback from another suitable sensor, or a combination thereof. Furthermore, the harvester controller may be configured to automatically select a storage compartment based on a storage compartment loading order (e.g., load first storage compartment, load second storage compartment, load third storage compartment, etc.). In such embodiments, the controller may be configured to skip a storage compartment in the storage compartment loading order if a product level within the storage compartment exceeds a threshold level.

In certain embodiments, the harvester control system may include optical sensor(s) and/or measuring device(s) directed toward the storage compartments. In such embodiments, the display may be configured to present an image of an interior of each storage compartment and/or a graphical representation of the agricultural product level within each storage compartment. For example, the display may present a graph that shows the level of agricultural product within each storage compartment, and/or the color of each storage compartment graphical representation may be adjusted based on the level of agricultural product within the respective storage compartment. Accordingly, the operator may manually select the storage compartment based on the level of agricultural product within each storage compartment. Furthermore, in certain embodiments, the harvester controller may determine the level of agricultural product within each storage compartment and automatically select the storage compartment based on the agricultural product level (e.g., to maintain a substantially even level across the storage compartments, to limit the level of agricultural product within each storage compartment, etc.).

In certain embodiments, the harvester controller may terminate product flow from the conveyor outlet to the storage compartment in response to selection of the different storage compartment (e.g., in response to selection of a zone of a different storage compartment). The harvester controller may then instruct the haul vehicle controller to move the haul vehicle to a position in which the different storage compartment is aligned with the conveyor outlet (e.g., in which the selected zone of the different storage compartment is aligned with the conveyor outlet). In response to the conveyor outlet being positioned within the target unloading area (e.g., the bounding shape, the selected zone, or a target circle having a center at the unloading point and a radius corresponding to the threshold range from the unloading point), the harvester controller may reengage product flow from the conveyor outlet to the storage compartment. Furthermore, in certain embodiments, the harvester controller may terminate product flow from the conveyor outlet to the storage compartment in response to selection of the different zone. The harvester controller may then instruct the haul vehicle controller to move the haul vehicle to a position in which the different zone is aligned with the conveyor outlet. In response to the conveyor outlet being positioned within the target unloading area (e.g., the selected zone or a target circle having a center at the unloading point and a radius corresponding to the threshold range from the unloading point), the harvester controller may reengage product flow from the conveyor outlet to the storage compartment.

Figure 11:
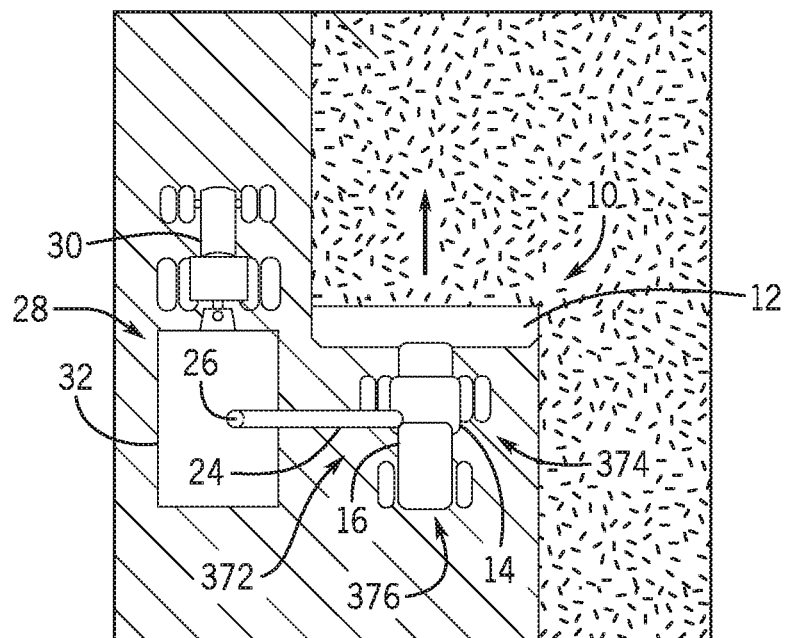
FIG. 11 is a top view of an embodiment of an agricultural harvester and an agricultural product transportation system, in which the agricultural product transportation system is docked with the agricultural harvester and positioned on the left side of the agricultural harvester.

FIG. 11 is a top view of an embodiment of an agricultural harvester 10 and an agricultural product transportation system 28, in which the agricultural product transportation system 28 is docked with the agricultural harvester 10 and positioned on the left side 372 of the agricultural harvester 10 (e.g., on the left side of the chassis 14 and/or the internal storage compartment 16 of the agricultural harvester 10). In certain embodiments, the conveyor 24 is movable between a first position on the left side 372 of the agricultural harvester 10, a second position on the right side 374 of the agricultural harvester 10, and a third position on a rearward side 376 of the agricultural harvester 10. For example, as previously discussed, an actuator may drive the conveyor 24 to move between the first, second, and third positions. While harvesting certain crop (e.g., sugar cane, forage crops, etc.), it may be desirable to position the agricultural product transportation system 28 within a region of the field that has already been harvested, thereby substantially reducing or eliminating the possibility of the agricultural product transportation system 28 interfering with the unharvested crops. In the illustrated embodiment, unharvested crops 20 are positioned on the right side 374 of the agricultural harvester 10, and the region of the field on the left side 372 of the agricultural harvester 10 has already been harvested. Accordingly, positioning the agricultural product transportation system 28 on the left side 372 of the agricultural harvester 10 during the unloading process substantially reduces or eliminates the possibility of the agricultural product transportation 28 system interfering with the unharvested crops.

Figure 12:
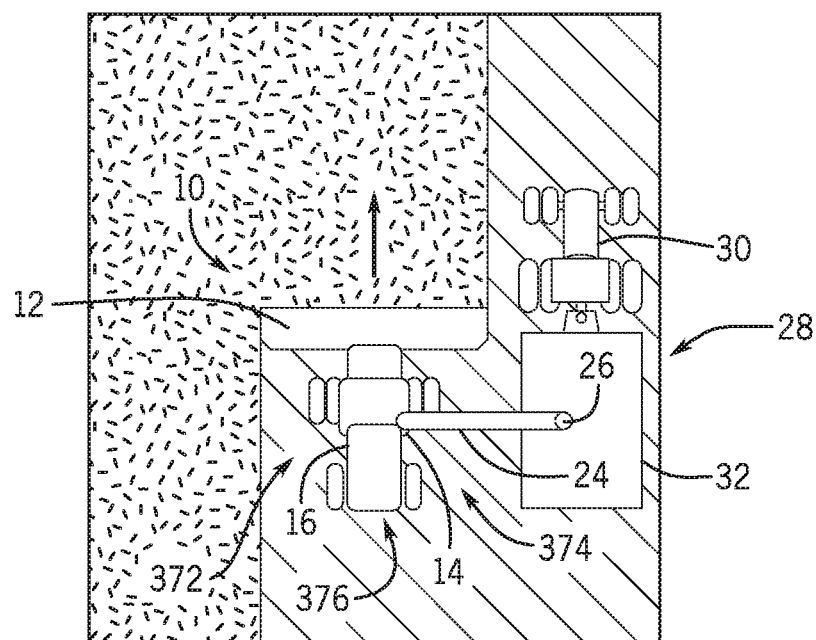
FIG. 12 is a top view of the agricultural harvester and the agricultural product transportation system of FIG. 11, in which the agricultural product transportation system is docked with the agricultural harvester and positioned on the right side of the agricultural harvester.

FIG. 12 is a top view of the agricultural harvester 10 and the agricultural product transportation system 28 of FIG. 11, in which the agricultural product transportation system 28 is docked with the agricultural harvester 10 and positioned on the right side 374 of the agricultural harvester 10 (e.g., on the right side of the chassis 14 and/or the internal storage compartment 16 of the agricultural harvester 10). In the illustrated embodiment, unharvested crops 20 are positioned on the left side 372 of the agricultural harvester 10, and the region of the field on the right side 374 of the agricultural harvester 10 has already been harvested. Accordingly, the actuator may drive the conveyor 24 to move to the second position, as illustrated. Accordingly, the conveyor outlet 26 may be aligned with the storage compartment 32 of the agricultural product transportation system 28 while the agricultural product transportation system 28 is positioned on the right side 374 of the agricultural harvester 10. Positioning the agricultural product transportation system 28 on the right side 374 of the agricultural harvester 10 during the unloading process substantially reduces or eliminates the possibility of the agricultural product transportation system 28 interfering with the unharvested crops.

Figure 13:
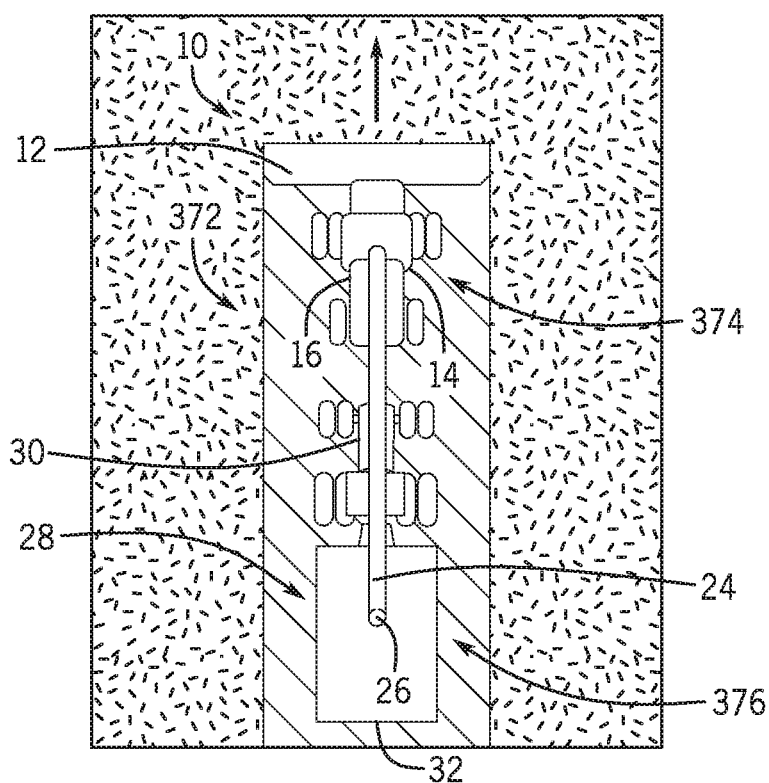
FIG. 13 is a top view of the agricultural harvester and the agricultural product transportation system of FIG. 11, in which the agricultural product transportation system is docked with the agricultural harvester and positioned on a rearward side of the agricultural harvester.

FIG. 13 is a top view of the agricultural harvester 10 and the agricultural product transportation system 28 of FIG. 11, in which the agricultural product transportation system 28 is docked with the agricultural harvester 10 and positioned on the rearward side 376 of the agricultural harvester 10 (e.g., on the rearward side of the internal storage compartment 16 of the agricultural harvester 10). In the illustrated embodiment, unharvested crops 20 are positioned on both the left side 372 and the right side 374 of the agricultural harvester 10, and the region of the field on the rearward side 376 of the agricultural harvester 10 has already been harvested. Accordingly, the actuator may drive the conveyor 24 to move to the third position, as illustrated. Accordingly, the conveyor outlet 26 may be aligned with the storage compartment 32 of the agricultural product transportation system 28 while the agricultural product transportation system 28 is positioned on the rearward side 376 of the agricultural harvester 10. Positioning the agricultural product transportation system 28 on the rearward side 376 of the agricultural harvester 10 during the unloading process substantially reduces or eliminates the possibility of the agricultural product transportation system 28 interfering with the unharvested crops.

In certain embodiments, the storage compartment may be positioned farther from a base of the conveyor (e.g., the joint between the conveyor and a body of the agricultural harvester) while the agricultural product transportation system is positioned on the rearward side of the agricultural harvester. Accordingly, in such embodiments, the conveyor may include a telescoping mechanism configured to enable the distance from the conveyor base to the conveyor outlet to vary based on the distance between the storage compartment and the conveyor base. For example, an actuator may drive the conveyor to expand and retract based on the distance between the conveyor base and the storage compartment, thereby facilitating alignment between the conveyor outlet and the storage compartment. In further embodiments, the conveyor may have sufficient length to facilitate alignment between the conveyor outlet and the storage compartment while the storage compartment is in each unloading position (e.g., on the left side of the agricultural harvester, on the right side of the agricultural harvester, and on the rearward side of the agricultural harvester). Furthermore, in certain embodiments, the conveyor may not extend to the storage compartment while the agricultural product transportation system is positioned on the rearward side of the agricultural harvester. In such embodiments, the convey may be configured to expel the agricultural product with sufficient speed for the expelled agricultural product to bridge the distance between the conveyor outlet and the storage compartment.

In certain embodiments, the position of the agricultural product transportation system relative to the agricultural harvester may be adjusted during the harvesting process. For example, as the agricultural harvester enters a field of unharvested crops, the agricultural product transportation system may be positioned on the rearward side of the agricultural harvester, such that the agricultural product transportation system does not engage the unharvested crops. As the agricultural harvester harvests the crops within the field, a harvested region is established. The agricultural harvester may then harvest crops in a region directly adjacent to the harvested region. Accordingly, the agricultural product transportation system may be positioned within the harvested region as the agricultural harvester harvests the directly adjacent crops. For example, the harvested region may be on the left side of the directly adjacent crops. As such, the actuator may move the conveyor outlet to the left side of the agricultural harvester (e.g., move the conveyor to the first position), and the agricultural product transportation system may be positioned on the left side of the agricultural harvester. By way of further example, the harvested region may be on the right side of the directly adjacent crops. As such, the actuator may move the conveyor outlet to the right side of the agricultural harvester (e.g., move the conveyor to the second position), and the agricultural product transportation system may be positioned on the right side of the agricultural harvester. As discussed in detail below, the position of the conveyor outlet may be automatically controlled based on a plan and/or an indication of the position of the agricultural product transportation system.

FIG. 14 is a flow diagram of an embodiment of a method 378 for controlling product flow from a conveyor outlet of an agricultural harvester to a storage compartment of an agricultural product transportation system by automatically or manually selected an unloading side. First, as represented by block 380, a target unloading side is selected from a list of candidate unloading sides based on a plan. In certain embodiments, the list of candidate unloading sides may include the left side of the agricultural harvester, the right side of the agricultural harvester, and the rearward side of the agricultural harvester. However, in other embodiments, the list of candidate unloading sides may only include the left side of the agricultural harvester and the right side of the agricultural harvester. In further embodiments, the list of candidate unloading sides may include other and/or additional unloading sides (e.g., a front left side, a rear left side, a front right side, and rear right side).

In certain embodiments, the plan includes a route of the agricultural harvester through the field. Furthermore, in embodiments in which multiple agricultural harvesters are operating within a field, the plan may include the route of each agricultural harvester through the field. The target unloading side may be selected such that the agricultural product transportation system is positioned within a previously harvested region of the field during the entire harvesting process. For example, the plan may include a route that directs the agricultural harvester to engage an unharvested field. Accordingly, the rearward side of the agricultural harvester may be selected as the initial target unloading side to substantially reduce or eliminate the possibility of the agricultural product transportation system interfering with the unharvested crops. In further embodiments, the plan may include a target unloading side schedule, and the target unloading side may be selected based on the target unloading side schedule.

In alternative embodiments, a signal indicative of selection of the target unloading side may be received, as represented by block 382. For example, an operator of the agricultural harvester may provide an input indicative of selection of the target unloading side to a user interface of the agricultural harvester. The agricultural harvester user interface, in turn, may output the signal indicative of selection of the target unloading side. By way of further example, an operator of the haul vehicle may provide an input indicative of selection of the target unloading side to a user interface of the haul vehicle. The haul vehicle user interface, in turn, may output the signal indicative of selection of the target unloading side. Accordingly, the operator of the haul vehicle and/or the operator of the agricultural harvester may select the target unloading side. In addition, in certain embodiments, the operator of the haul vehicle and/or the operator of the agricultural harvester may override the target unloading side selection based on the plan (e.g., if a different target unloading side is desired).

Furthermore, in certain embodiments, the target unloading side may be selected based on a previous unloading side, an assigned unloading side, or a calibrated side. For example, during previous harvesting operations within the field, a target unloading side may have been selected. Accordingly, in certain embodiments, the target unloading side may be selected to correspond to the target unload side from the previous harvesting operations. In such embodiments, the target unloading side may be changed in response to receiving the signal indicative of selection of the target unloading side. Furthermore, an assigned unloading side may be stored within the harvester controller or the haul vehicle controller. In such embodiments, the target unloading side may be selected to correspond to the assigned unloading side. The target unloading side may be changed in response to receiving the signal indicative of selection of the target unloading side. In addition, in certain embodiments, a bounding shape may only be established within the storage compartment for a single unloading side. In such embodiments, the target unloading side may be selected to correspond to the calibrated unloading side. The target unloading side may be change in response to receiving the signal indicative of selection of the target unloading side and establishment of a bounding shape within the storage compartment for the newly selected target unloading side.

In response to selection of the target unloading side, an actuator may be instructed to move the conveyor outlet to the target unload side, as represented by block 384. For example, if the target unload side is the left side of the agricultural harvester, the actuator may be instructed to move the conveyor to the first position, and if the target unloading side is the rearward side of the agricultural harvester, the actuator may be instructed to move the conveyor to the third position. As previously discussed, in certain embodiments, the conveyor may include a telescoping mechanism configured to enable the distance from the conveyor base to the conveyor outlet to vary based on the distance between the storage compartment and the conveyor base. In such embodiments, another actuator may be configured to extend or retract the conveyor based on the distance between the storage compartment and the conveyor base. Furthermore, if the conveyor outlet is already positioned on the target unloading side, the step associated with block 384 (i.e., instructing the actuator to move the conveyor outlet to the target unloading side) may be omitted.

Next, as represented by block 386, a signal indicative of instructions to position the storage compartment on the target unloading side of the agricultural harvester may be output. For example, if the target unloading side is the left side of the agricultural harvester, a signal indicative of instructions to position the storage compartment on the left side of the agricultural harvester may be output to the haul vehicle controller. The haul vehicle controller, in turn, may automatically direct the storage compartment along a route to a target position on the left side of the agricultural harvester. For example, the haul vehicle controller may automatically control the haul vehicle during a docking process, thereby positioning the storage compartment in a location that facilitates transfer of the agricultural product flow from the agricultural harvester to the storage compartment. As previously discussed, the haul vehicle controller may control the steering control system and the speed control system to direct the haul vehicle toward the target position. Once the haul vehicle substantially reaches the target position, the haul vehicle controller may control the steering control system and the speed control system to substantially maintain the target position and the target velocity.

In certain embodiments, a bounding shape is established within the storage compartment for each unloading side on the list of candidate unloading sides, as represented by block 388. For example, a first bounding shape may be established within the storage compartment for the left side of the agricultural harvester, a second bounding shape may be established within the storage compartment for the right side of the agricultural harvester, and a third bounding shape may be established within the storage compartment for the rearward side of the agricultural harvester. In certain embodiments, the first bounding shape may be established by the method disclosed above with reference to FIG. 7. In further embodiments, the first bounding shape may be established based on input indicative of the first bounding shape (e.g., received from a user interface). The second bounding shape may then be established by mirroring the first bounding shape along the lateral centerline of the agricultural harvester. Alternatively, the second bounding shape may be stablished via the method disclosed above with reference to FIG. 7 or receiving an input indicative of the second bounding shape (e.g., from a user interface). The third bounding shape may be established by translating the first bounding shape to the rearward side of the agricultural harvester (e.g., based on an expected or input position of the storage compartment on the rearward side of the agricultural harvester). Alternatively, the third bounding shape may be established via the method disclosed above with reference to FIG. 7 or receiving an input indicative of the third bounding shape (e.g., from a user interface). While each bounding shape is established after the side selection and control process (e.g., described above with reference to blocks 380 through 386) in the illustrated embodiment, in other embodiments, the bounding shape may be established before the side selection and control process. For example, the each bounding shape may be established during a pairing process between the agricultural harvester and the haul vehicle, or each bounding shape may be established during previous agricultural operations within the field.

As represented by block 390, a determination is made regarding whether the storage compartment is positioned on the target unloading side of the agricultural harvester and the conveyor outlet is positioned within the respective bounding shape (e.g., the bounding shape corresponding to the side on which the storage compartment is positioned). In response to the storage compartment being positioned on the target unloading side of the agricultural harvester and the conveyor outlet being positioned within the respective bounding shape, product flow from the conveyor outlet to the storage compartment is automatically engaged, as represented by block 392. Furthermore, as discussed above, multiple zones may be established within the bounding shape and product flow from the conveyor outlet to the storage compartment may only be engaged while the conveyor outlet is within a selected zone of the multiple zones. In addition, as discussed above, a target unloading point may be stablished within the bounding shape or within the selected zone and product flow from the conveyor outlet to the storage compartment may only be engaged while the conveyor outlet is within a threshold range of the target unloading point.

Furthermore, in certain embodiments, the list of candidate unloading sides may include a single unloading side (e.g., the left side of the agricultural harvester). In such embodiments, the target unloading side may automatically be selected to correspond to the single candidate unloading side. For example, the conveyor may be fixed in the first position, and the list of candidate unloading sides may only include the left side of the agricultural harvester. As such, the left side of the agricultural harvester may automatically be selected as the target unloading side. In embodiments in which the conveyor is fixed in a single position, the steps of selecting the target unloading side based on a plan, receiving a signal indicative of selection of the target unloading side, and instructing the actuator to move the conveyor outlet to the target unloading side may be omitted. Accordingly, product flow from the conveyor outlet of the agricultural harvester to the storage compartment of the agricultural product transportation system may be controlled by establishing the bounding shape within the storage compartment for the target/single unloading side, outputting the signal indicative of instructions to position the storage compartment on the target/single unloading side, and engaging product flow from the conveyor outlet to the storage compartment in response to the storage compartment being positioned on the target/single unloading side and the conveyor outlet being within the bounding shape/the selected zone/target circle.

In certain embodiments, the list of candidate unloading sides may be determined based on the agricultural harvester type. For example, a combine may have a conveyor that is fixed in a single position (e.g., the first portion). Accordingly, if the harvester is a combine, the list of candidate unloading sides may only include a single unloading side (e.g., the left side of the combine). However, a sugar cane harvester or a forage crop harvester may have a conveyor that is movable (e.g., between the first, second, and third positions). Accordingly, if the harvester is a sugar cane harvester or a forage crop harvester, the list of candidate unloading sides may include multiple unloading sides (e.g., the left side of the agricultural harvester, the right side of the agricultural harvester, and the rearward side of the agricultural harvester).

In addition, in certain embodiments, the current position of the conveyor may be detected (e.g., via one or more sensors on the agricultural harvester, via one or more sensors on the haul vehicle, via output from the harvester controller, etc.). In such embodiments, the target unloading side may automatically be selected to correspond to the current unloading side of the conveyor outlet. For example, the conveyor may be in the first portion. As such, the left side of the agricultural harvester may automatically be selected as the target unloading side. In embodiments in which the current position of the conveyor is detected, the steps of selecting the target unloading side based on a plan, receiving a signal indicative of selection of the target unloading side, and instructing the actuator to move the conveyor outlet to the target unloading side may be omitted. Accordingly, product flow from the conveyor outlet of the agricultural harvester to the storage compartment of the agricultural product transportation system may be controlled by establishing a bounding shape within the storage compartment for each unloading side, outputting the signal indicative of instructions to position the storage compartment on the target/current unloading side, and engaging product flow from the conveyor outlet to the storage compartment in response to the storage compartment being positioned on the target/current unloading side and the conveyor outlet being within the bounding shape/selected zone/target circle.

One or more of the steps of the method 378 may be performed in conjunction with or as an alternative to any suitable combination of steps disclosed above with reference to FIGS. 7-9. Furthermore, the steps of the method 378 may be performed in the order disclosed herein or in any suitable order. For example, in certain embodiments, the steps associated with blocks 384 and 386 may be performed concurrently. In such embodiments, the actuator may be instructed to move the conveyor outlet to the target unloading side concurrently with outputting the signal indicative of instructions to position the storage compartment on the target unloading side of the agricultural harvester. In addition, the method 378 may be performed by the controller of the agricultural harvester, any other suitable controller of the control system, or any combination of controllers of the control system.

FIG. 15 is a flow diagram of another embodiment of a method 394 for controlling product flow from a conveyor outlet of an agricultural harvester to a storage compartment of an agricultural product transportation system by mirroring a bounding shape of a calibrated unloading side on an uncalibrated unloading side. First, as represented by block 396, a first bounding shape is established within a storage compartment, in which the first bounding shape is completely surrounded by an inlet of the storage compartment while the storage compartment is positioned on a first lateral side (e.g., the left side) of the agricultural harvester. In certain embodiments, the bounding shape is a bounding rectangle. In such embodiments, the first bounding shape may be established by the method disclosed above with reference to FIG. 7. For example, the bounding rectangle may be established by: (1) receiving a first signal from a user interface indicative of alignment of the conveyor outlet with a first point on the storage compartment (e.g., while the storage compartment is on the left side of the agricultural harvester), (2) determining a first position of the storage compartment relative to the agricultural harvester upon receiving the first signal, (3) receiving a second signal from the user interface indicative of alignment of the conveyor outlet with a second point on the storage compartment, diagonally opposite the first point, (4) determining a second position of the storage compartment relative to the agricultural harvester upon receiving the second signal, and (5) establishing the bounding rectangle having a first corner at the first point and a second corner at the second point based on the first position and the second position. In further embodiments, the first bounding shape may be established based on input indicative of the first bounding shape (e.g., received from the user interface). In certain embodiments, the input indicative of the first bounding shape includes a size of the first bounding shape, dimensions of the first bounding shape, a position of the first bounding shape relative to the storage compartment (e.g., a reference point on the storage compartment), positions of points along a periphery of the first bounding shape, a length of a linkage between the haul vehicle and the storage compartment, or a combination thereof.

Once the first bounding shape is established, a second bounding shape is established by mirroring the first bounding shape along a lateral centerline of the agricultural harvester, as represented by block 398. The second bounding shape is established such that the second bounding shape is completely surrounded by the inlet of the storage compartment while the storage compartment is positioned on a second lateral side (e.g., the right side) of the agricultural harvester, opposite the lateral first side. Establishing the second bounding shape by mirroring the first bounding shape along the lateral centerline of the agricultural harvester may substantially reduce the time associated with establishing the second bounding shape (e.g., as compared to performing the method disclosed above with reference to FIG. 7). However, in alternative embodiments, the second bounding shape may be established by the method disclosed above with reference to FIG. 7. In further embodiments, the second bounding shape may be established based on input indicative of the second bounding shape (e.g., received from the user interface). In certain embodiments, the input indicative of the second bounding shape includes a size of the second bounding shape, dimensions of the second bounding shape, a position of the second bounding shape relative to the storage compartment (e.g., a reference point on the storage compartment), positions of points along a periphery of the second bounding shape, or a combination thereof.

Next, as represented by block 400, a determination is made regarding whether the storage compartment is positioned on the first lateral side (e.g., the left side) of the agricultural harvester. In response to determining that the storage compartment is positioned on the first lateral side of the agricultural harvester, instructions are output to the conveyor actuator to move the conveyor outlet to the first lateral side (e.g., the left side) of the agricultural harvester, as represented by block 402. For example, the actuator may move the conveyor to the first position, as discussed above with reference to FIG. 11. As represented by block 404, a determination is made regarding whether the conveyor outlet is positioned within the first bounding shape. In response to determining that the conveyor outlet is positioned within the first bounding shape, agricultural product flow from the conveyor outlet to the storage compartment is automatically engaged, as represented by block 406. In further embodiments, as discussed above, multiple zones may be established within the bounding shape and product flow from the conveyor outlet to the storage compartment may only be engaged while the conveyor outlet is within a selected zone of the multiple zones. In addition, as discussed above, a target unloading point may be stablished within the bounding shape or within the selected zone and product flow from the conveyor outlet to the storage compartment may only be engaged while the conveyor outlet is within a threshold range of the target unloading point.

If the storage compartment is not positioned on the first lateral side of the agricultural harvester, a determination is made regarding whether the storage compartment is positioned on the second lateral side (e.g., the right side) of the agricultural harvester, as represented by block 408. In response to determining that the storage compartment is positioned on the second lateral side of the work vehicle, instructions are output to the conveyor actuator to move the conveyor outlet to the second lateral side (e.g., the right side) of the agricultural harvester, as represented by block 410. For example, the actuator may move the conveyor to the second position, as discussed above with reference to FIG. 12. As represented by block 412, a determination is made regarding whether the conveyor outlet is positioned within the second bounding shape. In response to determining that the conveyor outlet is positioned within the second bounding shape, agricultural product flow from the conveyor outlet to the storage compartment is automatically engaged, as represented by block 406. In further embodiments, as discussed above, multiple zones may be established within the bounding shape and product flow from the conveyor outlet to the storage compartment may only be engaged while the conveyor outlet is within a selected zone of the multiple zones. In addition, as discussed above, a target unloading point may be stablished within the bounding shape or within the selected zone and product flow from the conveyor outlet to the storage compartment may only be engaged while the conveyor outlet is within a threshold range of the target unloading point.

One or more of the steps of the method 394 may be performed in conjunction with or as an alternative to any suitable combination of steps disclosed above with reference to FIGS. 7-9 and 14. Furthermore, the steps of the method 394 may be performed in the order disclosed herein or in any suitable order. For example, in certain embodiments, the second bounding shape may only be determined after the storage compartment is positioned on the second lateral side, or instructions are received and/or a decision is made regarding positioning the storage compartment on the second lateral side. By way of example, if the storage compartment is positioned on the first lateral side, or instructions are received and/or a decision is made regarding positioning the storage compartment on the first lateral side, the second bounding shape may not be established. However, in response to the storage compartment being positioned on the second lateral side, or instructions being received and/or a decision being made regarding positioning the storage compartment on the second lateral side, the second bonding shape is established by mirroring the first bounding shape. The conveyor outlet is then moved to the second lateral side, and product flow from the conveyor outlet to the storage compartment is engaged (e.g., in response to the conveyor outlet being within the second bounding shape). The method 394 may be performed by the controller of the agricultural harvester, any other suitable controller of the control system, or any combination of controllers of the control system.

While the methods 378 and 394 for controlling product flow from a conveyor outlet of an agricultural harvester to a storage compartment of an agricultural product transportation system are described above with regard to a single storage compartment of the agricultural product transportation system, in certain embodiments, the product flow control processes may be utilized for agricultural product transportation systems having multiple storage compartments. For example, in certain embodiments, multiple storage compartments (e.g., 2, 3, 4, 5, 6, or more) may be arranged in tandem behind a haul vehicle. In such embodiments, a bounding shape may be established for each storage compartment and for each unloading side of the storage compartment (e.g., for each unloading side of the list of candidate unloading sides). For example, a bounding shape may be established within a first storage compartment for each unloading side of the list of candidate unloading sides. In addition, a bounding shape may be established within each subsequent storage compartment (e.g., a second storage compartment, a third storage compartment, etc.) for each unloading side of the list of candidate unloading sides. By way of example, a first bounding shape may be established within the first storage compartment for the left side of the agricultural harvester, a second bounding shape may be established within the first storage compartment for the right side of the agricultural harvester, a third bounding shape may be established within the first storage compartment for the rearward side of the agricultural harvester, a fourth bounding shape may be established within the second storage compartment for the left side of the agricultural harvester, a fifth bounding shape may be stablished within the second storage compartment for the right side of the agricultural harvester, a sixth bounding shape may be established within the second storage compartment for the rearward side of the agricultural harvester, and so on. The bounding shapes for the multiple storage compartments may be used within the methods 378 and 394 described above with reference to FIGS. 14 and 15.

While the control systems and methods are described herein with reference to an agricultural harvester and a mobile storage compartment (e.g., towed by a haul vehicle), the control systems and methods may be utilized for other agricultural and/or non-agricultural applications. For example, the alignment calibration process described herein may be utilized to facilitate automatic alignment of a harvester with a stationary storage compartment. In addition, the automatic control systems and methods described herein may be employed to automatically dock the mobile storage compartment with an on-road transport vehicle, such as a commercial truck, thereby facilitating efficient transfer of the agricultural product to the transport vehicle. Moreover, the automatic control systems and methods described herein may be utilized to automatically dock a haul vehicle (e.g., dump truck) with a mining vehicle, thereby enabling the mining vehicle to efficiency unload ore or other materials. Furthermore, the steps of the methods described above may be used in any suitable combination, and the elements of the systems described above may be used in any suitable combination.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system for a work vehicle comprising a controller having a memory and a processor, wherein the controller is configured to:
   determine a position of a conveyor outlet relative to a storage compartment;
   select a target unloading area from a plurality of candidate target unloading areas, wherein the plurality of candidate target unloading areas comprises a target circle having a center at an unloading point and a radius corresponding to a threshold range from the unloading point, a bounding shape within the storage compartment, and a selected zone of a plurality of non-overlapping zones within the bounding shape;
   engage product flow from the conveyor outlet to the storage compartment while the position of the conveyor outlet is within the target unloading area; and
   terminate product flow from the conveyor outlet to the storage compartment while the position of the conveyor outlet is outside of the target unloading area.

2. The control system of claim 1, wherein the controller is configured to select the target unloading area to correspond to a default target unloading area.

3. The control system of claim 1, comprising a use interface, wherein the controller is configured to select the target unloading area based on a first signal from the user interface indicative of the target unloading area, the controller is configured to select the selected zone from the plurality of non-overlapping zones based on a second signal from the user interface indicative of the selected zone, or a combination thereof.

4. The control system of claim 1, comprising a user interface, wherein the controller is configured to engage product flow from the conveyor outlet to the storage compartment in response to receiving a third signal from the user interface indicative of product flow engagement, and the controller is configured to terminate product flow from the conveyor outlet to the storage compartment in response to receiving a fourth signal from the user interface indicative of product flow termination.

5. The control system of claim 1, wherein the controller is configured to control a rate of product flow based at least in part on the position of the conveyor outlet relative to the storage compartment.

6. The control system of claim 1, comprising a user interface, wherein the controller is configured to output a fifth signal to the user interface indicative of conveyor outlet misalignment in response to the position of the conveyor outlet moving outside of the target unloading area.

7. The control system of claim 1, wherein the controller is configured to terminate product flow from the conveyor outlet to the storage compartment in response to selection of another storage compartment, in response to selection of another zone of the plurality of non-overlapping zones, or a combination thereof.

8. The control system of claim 1, wherein the controller is configured to engage product flow from the conveyor outlet to the storage compartment only while the conveyor outlet is within the target unloading area for a threshold duration.

9. The control system of claim 1, wherein the controller is configured to select the selected zone from the plurality of non-overlapping zones based on a zone loading order.

10. The control system of claim 1, wherein the controller is configured to determine an orientation of the storage compartment relative to a ground plane, and the controller is configured to select the selected zone from the plurality of non-overlapping zones based on the orientation, such that the selected zone has the highest vertical position of the plurality of non-overlapping zones relative to the ground plane.

11. A control system for a work vehicle comprising a controller having a memory and a processor, wherein the controller is configured to:
  determine a position of a conveyor outlet relative to a storage compartment;
  select a target unloading area from a plurality of candidate target unloading areas, wherein the plurality of candidate target unloading areas comprises a target circle having a center at an unloading point and a radius corresponding to a threshold range from the unloading point, a bounding shape within the storage compartment, and a selected zone of a plurality of non-overlapping zones within the bounding shape;
  engage product flow from the conveyor outlet to the storage compartment while the work vehicle is docked with the storage compartment and the position of the conveyor outlet is within the target unloading area;
  terminate product flow from the conveyor outlet to the storage compartment while the work vehicle is undocked from the storage compartment; and
  terminate product flow from the conveyor outlet to the storage compartment while the work vehicle is docked with the storage compartment and the position of the conveyor outlet is outside of the target unloading area.

12. The control system of claim 11, comprising a user interface, wherein the controller is configured to select the target unloading area based on a first signal from the user interface indicative of the target unloading area.

13. The control system of claim 11, comprising a user interface, wherein the controller is configured to engage product flow from the conveyor outlet to the storage compartment in response to receiving a second signal indicative of product flow engagement, and the controller is configured to terminate product flow from the conveyor outlet to the storage compartment in response to receiving a third signal indicative of product flow termination.

14. The control system of claim 11, comprising a user interface, wherein the controller is configured to output a fourth signal to the user interface indicative of conveyor outlet misalignment while the work vehicle is docked with the storage compartment and the conveyor outlet is outside of the target unloading area.

15. The control system of claim 11, wherein the controller is configured to select the selected zone from the plurality of non-overlapping zones based on a zone unloading order.

* * * * *